US008659675B2

(12) United States Patent
Takahashi et al.

(10) Patent No.: US 8,659,675 B2
(45) Date of Patent: Feb. 25, 2014

(54) IMAGE PROCESSING APPARATUS, IMAGE PROCESSING METHOD, AND PROGRAM

(75) Inventors: Hiroaki Takahashi, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/060,904

(22) PCT Filed: Jul. 7, 2010

(86) PCT No.: PCT/JP2010/061513
§ 371 (c)(1),
(2), (4) Date: Jun. 3, 2011

(87) PCT Pub. No.: WO2011/004832
PCT Pub. Date: Jan. 13, 2011

(65) Prior Publication Data
US 2012/0274798 A1 Nov. 1, 2012

(30) Foreign Application Priority Data
Jul. 7, 2009 (JP) .................................. 2009-160954

(51) Int. Cl.
*H04N 9/73* (2006.01)
*H04N 5/235* (2006.01)

(52) U.S. Cl.
USPC ..................................... 348/224.1; 348/229.1

(58) Field of Classification Search
USPC ................... 348/224.1, 371, 229.1, 255, 528,
348/E9.049, E5.115, E5.116, 180, 184,
348/189, 190, 192, 644, 645, 655, 656, 649,
348/650, 657, 678, 679; 382/270, 167, 274
See application file for complete search history.

(56) References Cited

U.S. PATENT DOCUMENTS 8,065,346 B1 * 11/2011 Hing et al. .................... 707/805

2002/0118967 A1 * 8/2002 Funston ........................ 396/155

(Continued)

FOREIGN PATENT DOCUMENTS

| JP | 2005-102116 | 4/2005 |
| JP | 2005-347935 | 12/2005 |
| JP | 2007-129622 | 5/2007 |

OTHER PUBLICATIONS

English-language International Search Report from the Japanese Patent Office in International Application No. PCT/JP2010/061513, mailed Oct. 12, 2010.

*Primary Examiner* — Nhan T Tran
*Assistant Examiner* — Chan Nguyen
(74) *Attorney, Agent, or Firm* — Finnegan, Henderson, Farabow, Garrett & Dunner, L.L.P.

(57) ABSTRACT

The present invention relates to an image processing apparatus, an image processing method, and a program that are capable of removing an influence due to illumination components from a plurality of images in which illumination environments are different and generating an image having high color reproducibility.

A demosaic processing unit 221 performs a demosaic process on a reference image held in a reference mosaic image holding unit 111. A demosaic processing unit 222 performs a demosaic process on a processing target image that is held in a processing target mosaic image holding unit 112. A white balance calculation unit 230 calculates a white-balance value for each channel with respect to the reference image. A channel gain calculation unit 250 calculates a gain for each channel for converting illumination components on the basis of RGB values of the reference image and the processing target image, and the white balance of the reference image. At the time of gain calculation, blackout condition, saturation, and the like are considered. A channel gain application unit 260 applies the gain calculated by the channel gain calculation unit 250 to each channel of the processing target image.

7 Claims, 63 Drawing Sheets

(56) References Cited

U.S. PATENT DOCUMENTS

2004/0041920 A1* 3/2004 Mizukami et al. ......... 348/222.1
2007/0145136 A1* 6/2007 Wiklof et al. ................ 235/454
2007/0165960 A1 7/2007 Yamada
2007/0236567 A1* 10/2007 Pillman et al. ................ 348/143
2008/0088858 A1* 4/2008 Marcu et al. ................... 358/1.6

* cited by examiner

FIG. 3

| G | B | G | B | G | B |
|---|---|---|---|---|---|
| R | G | R | G | R | G |
| G | B | G | B | G | B |
| R | G | R | G | R | G |
| G | B | G | B | G | B |
| R | G | R | G | R | G |

IMAGE PROCESSING APPARATUS, IMAGE PROCESSING METHOD, AND PROGRAM

TECHNICAL FIELD

The present invention relates to image processing apparatuses and, more particularly, to an image processing apparatus for generating an image having high color reproducibility from a captured image, a processing method for use with these, and a program for causing a computer to perform such a method.

BACKGROUND ART

A typical example of image processing using a plurality of images in which the illumination environment is different is a white balance process using two images, namely, a flash emission image and a non-flash emission image, for the purpose of improving color reproducibility of images by emitting a flash. In general, since flash light and ambient light differ in color temperature, when taking a using a flash, the color balance of illumination differs between a place at which the flash is emitted and other places. For this reason, the color balance of light that hits a subject changes for each area. In a gain process for performing uniform white balance on a screen as in the related art, there is a case in which breakdown occurs. With regard to this, attempts in which flash components of illumination and ambient light components are separated from two images, namely, a flash emission image and a non-flash emission image, and a white-balance gain is adjusted for each pixel, have been made (see, for example, PTL 1).

CITATION LIST

Patent Literature

PTL 1: Japanese Unexamined Patent Application Publication No. 2005-210485 (FIG. 1)

SUMMARY OF INVENTION

Technical Problem

In the technique of the related art using a plurality of images, the white balance problem has been solved by separating illumination components by calculating the difference between two images, by processing each component processed on the basis of the white balance of an image captured under a single illumination environment, and by combining the components. However, in the technique of the related art, there are two major problems as follows.

The first problem is that it is not possible to deal with changes in ambient light. In order to handle a difference between a reference image and a processing target image as a problem of single illumination, it is necessary that illumination components other than flash components are constant between two images. For this reason, in a case where a change, such as sunlight decreases, occurs at image-capturing time, it is not possible to successfully deal with such a change.

The second problem is that dealing with a moving subject is difficult. Among pixels belonging to a subject that has moved between a reference image and a processing target image, pixels having a different spectral reflectance are compared, and separation of illumination components on the basis of the difference between the images cannot be performed. For this reason, in the technique of the related art, there is a problem in that it is not possible to deal with a combination of an image in which the orientation of a camera has changed, an image in which a moving subject is included, and the like. With respect to these image processing problems for a plurality of images, solving means, such as use of a tripod, or positioning performed using a global motion vector and block matching, has been proposed. However, in the case where a tripod is used, an offset caused by a camera being moved can be compensated for, but it is not possible to deal with a moving subject. In a global motion vector and block matching, in general, motion is estimated on the basis of the difference between two images, of SAD (Sum of Absolute Differences). However, in a case where the illumination environment is different, it is not possible to determine whether the difference is caused by a change in illumination components or by a moving subject, presenting the problem that accuracy is low.

The present invention has been made in view of such circumstances, and aims to remove influences due to illumination components from a plurality of images with a different illumination environment and to generate an image having high color reproducibility.

Solution to Problem

The present invention has been achieved to solve the above-described problems. A first aspect thereof provides an image processing apparatus including: a channel gain calculation unit that calculates a gain for converting illumination components for each channel at each pixel position on the basis of a reference image and a processing target image that are captured under different illumination environments; and a channel gain application unit that applies the gain to the processing target image, an image processing method, and a program. As a result, effects of converting illumination components for each channel at each pixel position of the processing target image by using the reference image captured under a different illumination environment are brought about.

Furthermore, in the first aspect, the channel gain calculation unit may calculate a gain in such a manner that the gain of a specific channel of the processing target image is fixed and a color balance of the processing target pixel is made to match that of the reference image. Furthermore, the channel gain calculation unit may fix a luminance value of the processing target image and may calculate the gain so that a color balance of the processing target pixel matches that of the reference image.

Furthermore, in the first aspect, the channel gain calculation unit may set a predetermined upper limit value as the gain in a case where a value exceeding the upper limit value is calculated as the gain, and may set a predetermined lower limit value as the gain in a case where a value that falls below the lower limit value is calculated as the gain. As a result, effects of removing a gain that deviates from the range of the upper limit value and the lower limit value are brought about.

Furthermore, in the first aspect, the channel gain calculation unit may further include a saturation degree calculation unit that calculates a saturation degree of pixels of pixel values on the basis of the reference image, and a saturation compensation unit that performs a process for compensating for the gain in accordance with the saturation degree. As a result, effects of compensating for the gain in accordance with the saturation degree are brought about.

Furthermore, in the first aspect, the channel gain calculation unit may include a blackout condition degree calculation unit that calculates a blackout condition degree of pixels on the basis of pixel values of the reference image; and a blackout condition compensation unit that performs the process for compensating for the gain in accordance with the blackout condition degree. The channel gain calculation unit may include a blackout condition degree calculation unit that calculates a blackout condition degree of pixels on the basis of pixel values of the reference image and an inter-channel ratio of the reference image to the processing target image, and a blackout condition compensation unit that performs the process for compensating for the gain in accordance with the blackout condition degree. As a result, effects of compensating for a gain in accordance with the blackout condition degree are brought about.

Furthermore, in the first aspect, the image processing apparatus may further include an exposure compensation unit that adjusts an intensity so that exposure intensities become equal in order to compensate for a difference between image-capturing conditions of the reference image and the processing target image. As a result, effects of compensating for a difference in the image-capturing conditions are brought about.

Furthermore, in the first aspect, the channel gain application unit may include a saturation reliability calculation unit that calculates a saturation reliability of pixels on the basis of pixel values of the reference image, and a smoothing processing unit that performs spatial smoothing on the gain on the basis of the saturation reliability and then applies the gain to the processing target pixel. As a result, effects of converting illumination components by the gain at which a spatial smoothing is performed on the basis of the saturation reliability are brought about.

Furthermore, in the first aspect, the channel gain application unit may include a blackout condition reliability calculation unit that calculates a blackout condition reliability of pixels on the basis of pixel values of the reference image, and a smoothing processing unit that performs spatial smoothing on the gain on the basis of the blackout condition reliability and then applies the gain to the processing target pixel. The channel gain application unit may include a blackout condition reliability calculation unit that calculates a blackout condition reliability of pixels on the basis of pixel values of the reference image and an inter-channel ratio of the reference image to the processing target image, and a smoothing processing unit that performs spatial smoothing on the gain on the basis of the blackout condition reliability and that applies the gain to the processing target pixel. As a result, effects of converting illumination components by the gain at which a spatial smoothing is performed on the basis of the blackout condition reliability are brought about.

Furthermore, in this first aspect, the channel gain application unit may include a moving subject reliability calculation unit that determines whether or not the pixel is a subject that has moved in space on the basis of a change in characteristic values in corresponding pixels of the reference image and the processing target image and that calculates a moving subject reliability; and a smoothing processing unit that performs spatial smoothing on the gain on the basis of the moving subject reliability and then applies the gain to the processing target pixel. In this first aspect, the moving subject reliability calculation unit may include a ratio reverse degree calculation unit that calculates the moving subject reliability in accordance with whether or not a change of signal intensities of pixels of the processing target image is in reverse to the direction of a change of illumination components of the entire reference image and processing target image. As a result, effects of converting illumination components by the gain at which a spatial smoothing is performed on the basis of the moving subject reliability are brought about.

Furthermore, in the first aspect, the image processing apparatus may further include a resolution conversion unit that converts a resolution of the reference image or the processing target image and then supplies the image to the channel gain calculation unit. At that time, in the first aspect, the resolution conversion unit may perform the resolution conversion by reduction based on thinning out of pixels or may perform the resolution conversion by reduction based on an average of pixels in a block. The resolution conversion unit may perform the resolution conversion by reduction based on a central value of pixels in a block. Furthermore, the resolution conversion unit may perform the resolution conversion by an edge storage type smoothing filter process. As a result, effects of causing the size of the reference image to match the size of the processing target image are brought about.

Furthermore, in the first aspect, the image processing apparatus may further include: a frame memory for storing images that are captured continuously; an addition unit that adds the images that are captured continuously while performing weighting thereon and that generates an input image; and a control parameter determination unit that determines a control parameter used for the continuous image capturing so as to perform image-capture repetition control. As a result, effects of using an image that is combined from a plurality of images that are continuously captured as input images are brought about.

Furthermore, in the first aspect, a combination in which the reference image is an image captured without flash emission, and the processing target image is an image captured with flash emission may be used.

Furthermore, in the first aspect, the channel gain application unit may include a luminance calculation unit that calculates a luminance on the basis of pixel values of the processing target image, and a smoothing processing unit that performs spatial smoothing on the gain on the basis of the difference in the luminances between pixels and then applies the gain to the processing target pixel. In this case, the luminance calculation unit may calculate the luminance as a linear sum using a weight that is set in advance to the pixel value of the processing target image, and may calculate the luminance on the basis of multiple regression analysis in which an intensity ratio of corresponding pixels of the reference image and the processing target image is an object variate, and the pixel value of the processing target image is an explanatory variate.

Furthermore, a second aspect of the present invention provides an image processing apparatus including: a block histogram calculation unit that calculates a frequent value of pixels of a processing target image as a block histogram with regard to each of blocks such that an area is divided into a plurality of portions in a spatial axis direction and in a luminance axis direction; a block integration value calculation unit that calculates an integration value of characteristic values belonging to each of the blocks; a weighted product-sum unit that calculates a global gain value at the target pixel position on the basis of the block histogram, the block integration value, and the luminance value at the target pixel position; and a gain application unit that applies the global gain value to the processing target image. As a result, effects of obtaining a global gain value and converting the illumination components for each channel at each pixel position of the processing target image by using the reference image that is captured under a different illumination environment and by using the global gain value are brought about.

Furthermore, in the second aspect, the integration value of the characteristic value for each of the blocks may be a grand total, for each channel, of gains for converting illumination components for each channel of pixels belonging to each of the blocks, or may be a central value of the gains, for each channel, for converting illumination components of pixels belonging to each of the blocks is multiplied by a frequent value of pixels of the processing target image in the block.

Furthermore, in the second aspect, the weighted product-sum unit may include a first interpolation unit that performs an interpolation of the block histogram to the target pixel position by using a weight function in a spatial axis direction, which is defined in advance; a second interpolation unit that performs an interpolation of a characteristic value for each block to the target pixel position by using a weight function in a spatial axis direction, which is defined in advance; a first product-sum unit that calculates a load sum of the interpolated block histogram by using a weight function in a luminance axis direction, which is defined in advance; a second product-sum unit that calculates a load sum of interpolated characteristic values by using a weight function in a luminance axis direction, which is defined in advance; and a division unit that divides an output of the second product-sum unit by an output of the first product-sum unit. Furthermore, the storage and management process in the weighted product-sum unit may be performed in the order of interpolation in the luminance direction and interpolation in the space direction by interchanging the order.

Furthermore, in this second aspect, the weighted product-sum unit may include a first division unit that divides the characteristic value for each block by the value of the block histogram so as to calculate an average characteristic value at each block position; a comparison unit that compares the average characteristic value with a characteristic value regarding the target pixel position so as to calculate a weight; a first multiplication unit that multiplies the weight calculated in the comparison unit by the characteristic value for each block at a corresponding block position; a second multiplication unit that multiplies the weight calculated in the comparison unit by the value of the block histogram at a corresponding block position; a first interpolation unit that performs an interpolation of a weighted block histogram that is an output of the first multiplication unit to the target pixel position in accordance with a weight function in a spatial axis direction, which is defined in advance; a second interpolation unit that performs an interpolation of a weighted characteristic value for each block, which is an output of the second multiplication unit, to the target pixel position by using a weight function in a spatial axis direction, which is defined in advance; a first product-sum unit that calculates a load sum of the interpolated block histograms by using a weight function in a luminance axis direction, which is defined in advance; a second product-sum unit that calculates a load sum of the interpolated characteristic values by using a weight function in the luminance axis direction, which is defined in advance; and a second division unit that divides an output of the second product-sum unit by an output of the first product-sum unit.

Advantageous Effects of Invention

According to the present invention, it is possible to obtain superior advantages such that influences due to illumination components can be removed from a plurality of images whose illumination environment is different, and an image having high color reproducibility can be generated.

BRIEF DESCRIPTION OF DRAWINGS

FIG. 3 illustrates a Bayer arrangement as an example of a color arrangement of a mosaic image that is assumed in the embodiment of the present invention.

DESCRIPTION OF EMBODIMENTS

Hereinafter, modes for carrying out the present invention (hereinafter referred to as embodiments) will be described. The description will be given in the following order.
1. First Embodiment (example in which gain application is performed by multiplication)
2. Second Embodiment (example in which gain application is performed by weight smoothing)
3. Third Embodiment (example in which gain application is performed by edge preservation type smoothing using block histogram)
4. Fourth Embodiment (example in which resolution conversion is performed on input image)

5. Fifth Embodiment (example in which input images are combined by using frame memory)
6. Sixth Embodiment (example in which white balance process is performed at stage proceeding illumination component conversion process)
7. Seventh Embodiment (example in which input image on which white balance process has been performed is used)
8. Eighth Embodiment (example in which input image on which gamma correction process has been performed is used)
9. Ninth Embodiment (example in which luminance is calculated using multiple regression analysis)
10. Tenth Embodiment (example in which smoothing is performed using gain)

First Embodiment

Example of Configuration of Image-Capturing Device

Figure 1:
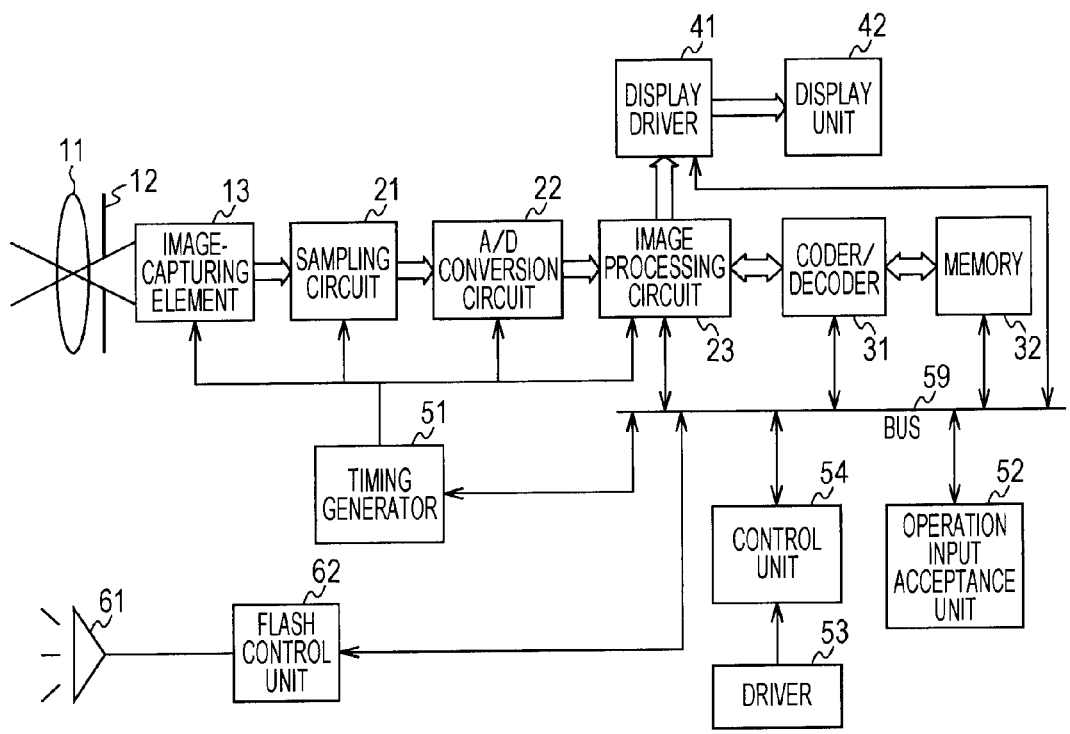
FIG. 1 illustrates an example of an image-capturing device in an embodiment of the present invention.

FIG. 1 illustrates an example of an image-capturing device in an embodiment of the present invention. This image-capturing device, when broadly classified, includes an optical system, a signal processing system, a recording system, a display system, and a control system.

The optical system includes a lens 11 for collecting light from an optical image of a subject, an aperture 12 for adjusting the amount of light of the optical image, and an image-capturing element 13 for performing photoelectric conversion on the collected optical image so as to be converted into an electrical signal. The image-capturing element 13 is realized by, for example, a CCD image sensor or a CMOS image sensor.

The signal processing system includes a sampling circuit 21, an A/D conversion circuit 22, and an image processing circuit 23. The sampling circuit 21 samples an electrical signal from the image-capturing element 13. This sampling circuit 21 is realized by, for example, a correlation double sampling circuit (CDS). As a result, noise that occurs in the image-capturing element 13 is reduced. The A/D conversion circuit 22 converts an analog signal supplied from the sampling circuit 21 into a digital signal. The image processing circuit 23 performs predetermined image processing on a digital signal input from the A/D conversion circuit 22. The image processing circuit 23 is realized by, for example, a DSP (Digital Signal Processor). Meanwhile, the details of the process performed by the image processing circuit 23 will be described later.

The recording system includes a memory 32 for storing an image signal, and a coder/decoder 31 for coding an image signal that is processed by the image processing circuit 23, recording it in the memory 32, further reading an image signal from the memory 32 and decoding it, and supplying the image signal to the image processing circuit 23. Meanwhile, the memory 32 may be a magnetic disk, an optical disc, a magneto-optical disc, a semiconductor memory, or the like.

The display system includes a display driver 41 for outputting an image signal processed by the image processing circuit 23 to the display unit 42, and a display unit 42 for displaying an image corresponding to the input image signal. The display unit 42 is realized by, for example, an LCD (Liquid Crystal Display) or the like, and has a function as a finder.

The control system includes a timing generator 51, an operation input acceptance unit 52, a driver 53, a control unit 54, a flash emitting unit 61, and a flash control unit 62. The timing generator 51 controls the operation timing of the image-capturing element 13, the sampling circuit 21, the A/D conversion circuit 22, and the image processing circuit 23. The operation input acceptance unit 52 accepts a shutter operation and other commands input by a user. The driver 53 is a driver for connecting peripheral devices. A magnetic disk, an optical disc, a magneto-optical disc, a semiconductor memory, or the like is connected to the driver 53. The control unit 54 controls the entire image-capturing device. This control unit 54 reads a controlling program stored in these through the driver 53, and performs control in accordance with the read controlling program, a command from the user, which is input from the operation input acceptance unit 52, and the like. The flash emitting unit 61 illuminates a subject at the time of image-capturing with light, and is sometimes called as a strobe. The flash control unit 62 controls the flash emitting unit 61, and causes the flash emitting unit 61 to emit light in accordance with instructions from the user, the neighboring brightness, and the like.

The image processing circuit 23, the coder/decoder 31, the memory 32, the display driver 41, the timing generator 51, the operation input acceptance unit 52, the control unit 54, and the flash control unit 62 are interconnected with one another through a bus 59.

In the image-capturing device, the optical image (incident light) of the subject enters the image-capturing element 13 through the lens 11 and the aperture 12, and is photoelectrically converted by the image-capturing element 13 so as to become an electrical signal. Noise components of the obtained electrical signal are removed by the sampling circuit 21. After the electrical signal is digitized by the A/D conversion circuit 22, it is temporarily stored in an image memory (not shown) incorporated in the image processing circuit 23.

Meanwhile, in a usual state, under the control by the timing generator 51 on the signal processing system, an image signal is constantly overwritten at a fixed frame rate in the image memory incorporated in the image processing circuit 23. The image signal of the image memory incorporated in the image processing circuit 23 is output to the display unit 42 through the display driver 41, and a corresponding image is displayed on the display unit 42.

The display unit 42 also serves as a finder for the image-capturing device. In a case where the user presses a shutter button included in the operation input acceptance unit 52, the control unit 54 controls the signal processing system so that the timing generator 51 holds the image signal immediately after the shutter button is pressed, that is, the image signal is not overwritten in the image memory of the image processing circuit 23. The image data held in the image memory of the image processing circuit 23 is coded by the coder/decoder 31 and is recorded in the memory 32. With the operation of the image-capturing device such as those described above, the acquisition of one image data is completed.

[Example of Processing Functions of Image Processing Circuit 23]

Figure 2:
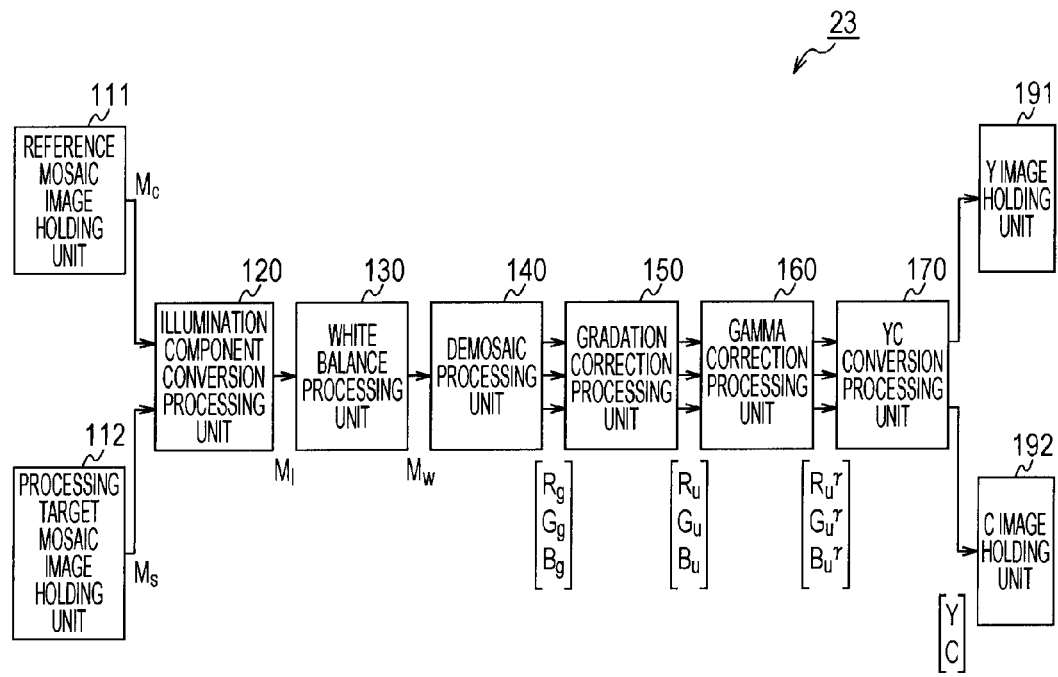
FIG. 2 illustrates an example of processing functions of an image processing circuit 23 in a first embodiment of the present invention.

FIG. 2 illustrates an example of processing functions of the image processing circuit 23 in a first embodiment of the present invention. The image processing circuit 23 includes an illumination component conversion processing unit 120, a white balance processing unit 130, a demosaic processing unit 140, a gradation correction processing unit 150, a gamma correction processing unit 160, and a YC conversion processing unit 170. The image processing circuit 23 performs image processing by using a mosaic image digitized by the A/D conversion circuit 22 as an input image. A mosaic image is such that an intensity signal corresponding to one of the colors of R, G, and B is stored in each pixel, and for the color arrangement thereof, a Bayer arrangement shown in FIG. 3 is assumed. Meanwhile, a mosaic image is sometimes called as RAW data. Furthermore, the intensity signal stored in each pixel is not limited to R, G, and B, and may be C, M, and Y or color information other than that.

The image processing circuit 23 includes, as input unit, a reference mosaic image holding unit 111 and a processing target mosaic image holding unit 112. The reference mosaic image holding unit 111 is a memory for holding a mosaic image (reference image $M_c$) serving as a reference (criterion). The processing target mosaic image holding unit 112 is a memory for holding a mosaic image (processing target image $M_s$) serving as a processing target (subject). In the embodiment of the present invention, it is assumed that the color balance of the processing target image is adjusted by using the color balance (the ratio of color) in the reference image.

The illumination component conversion processing unit 120 converts the illumination components of the processing target image by using the ratio of the colors in the reference image, and generates a mosaic image $M_l$. That is, the processing target image is multiplied by an appropriate coefficient for each channel so as to become equal to the color balance of the reference image so as to be converted into a color balance of a single light source. Meanwhile, the configuration of the illumination component conversion processing unit 120 will be described later.

The white balance processing unit 130 performs a white balance process on the mosaic image $M_l$. The white balance processing unit 130 multiplies an appropriate coefficient to the mosaic image $M_l$ in accordance with the color possessed by each pixel intensity so that the color balance of a subject area of an achromatic color becomes an achromatic color. The mosaic image $M_w$ on which the white balance process has been performed is supplied to the demosaic processing unit 140.

The demosaic processing unit 140 performs an interpolation process (demosaic process) so that the intensities of all the channels of R, G, and B are fully prepared at the pixel positions of the mosaic image $M_w$. The demosaic image $[R_g, G_g, B_g]^T$ on which this interpolation process has been performed are three images (RGB images) corresponding to three colors of R (Red), G (Green), and B (Blue), and are supplied to the gradation correction processing unit 150. Meanwhile, the matrix $A^T$ means a transposition matrix of a matrix A.

The gradation correction processing unit 150 performs a gradation correction process on each pixel in the image $[R_g, G_g, B_g]^T$ of the output of the demosaic processing unit 140. The image $[R_u, G_u, B_u]^T$ on which the gradation correction process has been performed is supplied to the gamma correction processing unit 160.

The gamma correction processing unit 160 performs a gamma correction process on the image $[R_u, G_u, B_u]^T$. The gamma correction process is a correction for reproducing a display close to the input image on the display unit 42. The output $[R_u^\gamma, G_u^\gamma, B_u^\gamma]^T$ of the gamma correction processing unit 160 is supplied to the YC conversion processing unit 170.

The YC conversion processing unit 170 performs a YC matrix process and band limitation for chroma components on the gamma-corrected 3-channel image $[R_u^\gamma, G_u^\gamma, B_u^\gamma]^T$, thereby outputting a luminance signal Y and a color-difference signal C (Cr, Cb). The luminance signal and the color-difference signal are held in the Y image holding unit 191 and the C image holding unit 192, respectively, and are supplied to the coder/decoder 31 at a subsequent stage of the image processing circuit 23.

Meanwhile, in a usual case, an RGB signal is supplied to the display driver 41. This RGB signal is such that the luminance signal and the color-difference signal, which are outputs of the YC conversion processing unit 170, are converted into an RGB signal.

[Bayer Arrangement and Bayer Set]

FIG. 3 illustrates a Bayer arrangement as an example of a color arrangement of a mosaic image that is assumed in the embodiment of the present invention. In this Bayer arrangement, pixels of the color G are arranged in a checkered pattern, pixels of the color R are arranged in the form of a regular lattice every other pixel in the horizontal direction and in the vertical direction at positions other than those of the pixels, and pixels of the color B are arranged in the form of a regular lattice every other pixel in the horizontal direction and in the vertical direction at the positions of the remaining pixels.

Figure 4:
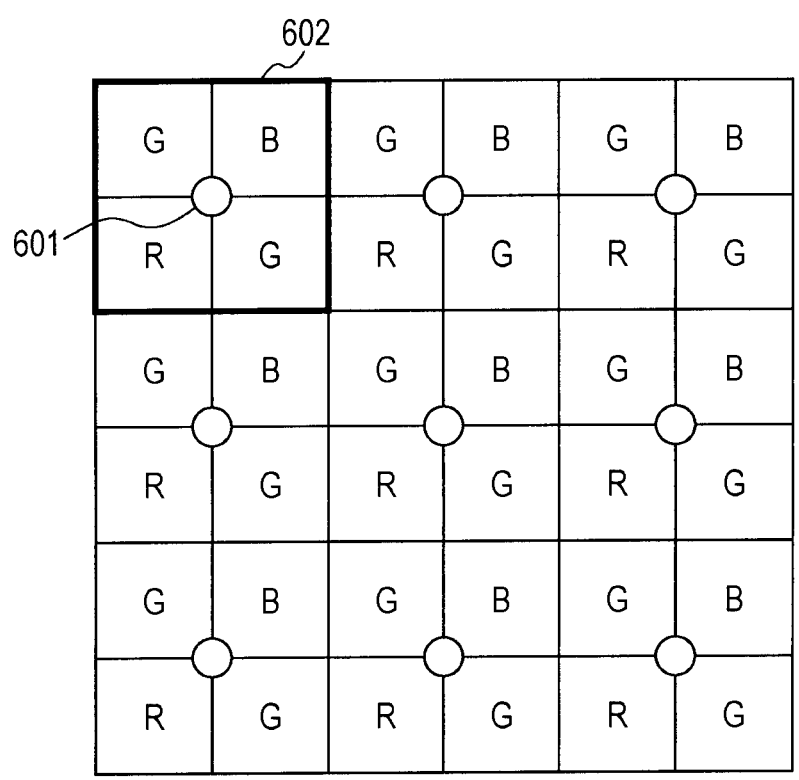
FIG. 4 illustrates a Bayer set in a Bayer arrangement as an example of a color arrangement of a mosaic image that is assumed in the embodiment of the present invention.

FIG. 4 illustrates a Bayer set in a Bayer arrangement as an example of a color arrangement of a mosaic image that is assumed in the embodiment of the present invention. In the embodiment of the present invention, during a conversion process for illumination components in the illumination component conversion processing unit 120, four pixels of horizontal two pixels×vertical two pixels of a mosaic image may be handled as a unit. A set of four pixels will be referred to as a Bayer set. Specifically, a collection of those four pixels by using a position 601 adjacent to four pixels of G, B, R, and G as the center is a Bayer set 602.

[Example of Configuration of Illumination Component Conversion Processing Unit 120]

Figure 5:
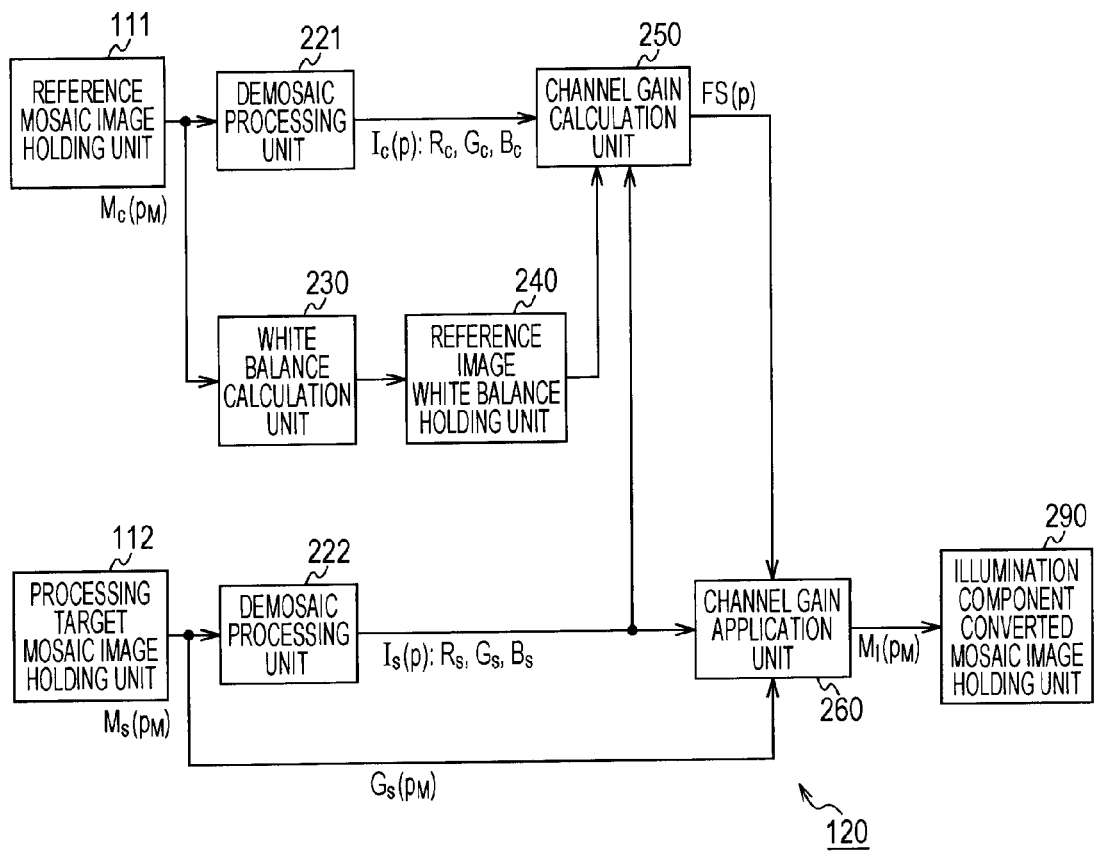
FIG. 5 illustrates an example of the configuration of an illumination component conversion processing unit 120 in the first embodiment of the present invention.

FIG. 5 illustrates an example of the configuration of an illumination component conversion processing unit 120 in the first embodiment of the present invention. The illumination component conversion processing unit 120 includes demosaic processing units 221 and 222, a white balance calculation unit 230, a reference image white balance holding unit 240, a channel gain calculation unit 250, and a channel gain application unit 260.

The demosaic processing unit 221 performs a demosaic process on a reference image held in the reference mosaic image holding unit 111, and generates a demosaic image $I_c(p)$ of the reference image in which channels necessary for obtaining an intensity and a reliability are fully prepared for each pixel. Meanwhile, p denotes each pixel position. The demosaic processing unit 222 performs a demosaic process on the processing target image held in the processing target mosaic image holding unit 112, and generates a demosaic image $I_s(p)$ of the processing target image in which channels necessary for obtaining an intensity and a reliability are fully prepared for each pixel. Meanwhile, in the first embodiment of the present invention, it is sufficient that a G channel for obtaining an intensity is obtained for each pixel.

When a demosaic process is to be performed, the demosaic processing units 221 and 222 may perform a simplified process for performing demosaicing at the position 601 by using the Bayer set 602 of FIG. 4 as a processing unit. The demosaicing method at this time may be a process in which for the pixels of the R and B channels, the pixels are used "as is", and for the pixels of the G channel, an average of two pixels is calculated. In this case, an image in which the height and width thereof is reduced by ½ and three channels are fully prepared is generated. Furthermore, the demosaic process in the demosaic processing units 221 and 222 may be performed for each pixel by referring to a wider area like the demosaic process in the demosaic processing unit 140 of FIG. 2. In this case, a reduction is not performed, and only the demosaicing is performed. Furthermore, when a demosaic process is performed for each pixel, the pixel $p_M$ before demosaicing becomes identical to the pixel p after demosaicing, and the line from the mosaic image Ms to the gain application unit becomes unnecessary.

The white balance calculation unit 230 calculates, for each channel, a white-balance gain of the reference image held in the reference mosaic image holding unit 111. As a method of calculating a white balance at this time, a gain such that the ratio of the average values of the RGB pixels of the entire screen is 1:1:1 on the basis of the gray world hypothesis may be obtained. Furthermore, as another calculation method, a white balance can be obtained as an optimization problem as described in paragraphs 0071 to 0081 of Japanese Unexamined Patent Application Publication No. 2006-67561 together with the processing target image held in the processing target mosaic image holding unit 112. In addition, the white balance may be set by a technique similar to that of the white balance processing unit 130 in FIG. 2. Furthermore, the white balance may take a form in which the white balance is set in advance before image-capturing. The setting method assumes a method in which setting is performed by an image-capturing person at an image-capturing time on the basis of the color temperature measured by another apparatus, such as a colorimeter. By setting a fluorescent lamp or a scene such as a cloudy sky, setting is possible by using a preset white balance. Alternatively, setting may also be performed by capturing an image of a white body by using a custom white balance (white set) function. The calculated white balance is stored in the reference image white balance holding unit 240.

The channel gain calculation unit 250 calculates a gain FS(p), for each channel for color balance adjustment on the basis of the R, G, and B values of the reference image and the processing target image, and the white balance of the reference image. The gain FS(p) is a gain value for each channel for converting the illumination components of the processing target image. As will be described later, this gain can be obtained by obtaining the ratio of the reference image to the processing target image by using any of the channels as a reference. For example, in a case where the G channel is used as a reference, the gain $FS_G(p)$ of the G channel is "1". The gain calculated by the channel gain calculation unit 250 is supplied to the channel gain application unit 260.

The channel gain application unit 260 applies the gain calculated by the channel gain calculation unit 250 to each channel of the processing target image. Although the details of the gain application will be described later, the simplest application form is considered such that the processing target image is multiplied by a gain. The mosaic image $M_I$ on which gain application has been performed by the channel gain application unit 260 is held in the illumination component converted mosaic image holding unit 290 and is supplied to the white balance processing unit 130 at a subsequent stage.

[Example of Configuration of Channel Gain Calculation Unit 250]

Figure 6:
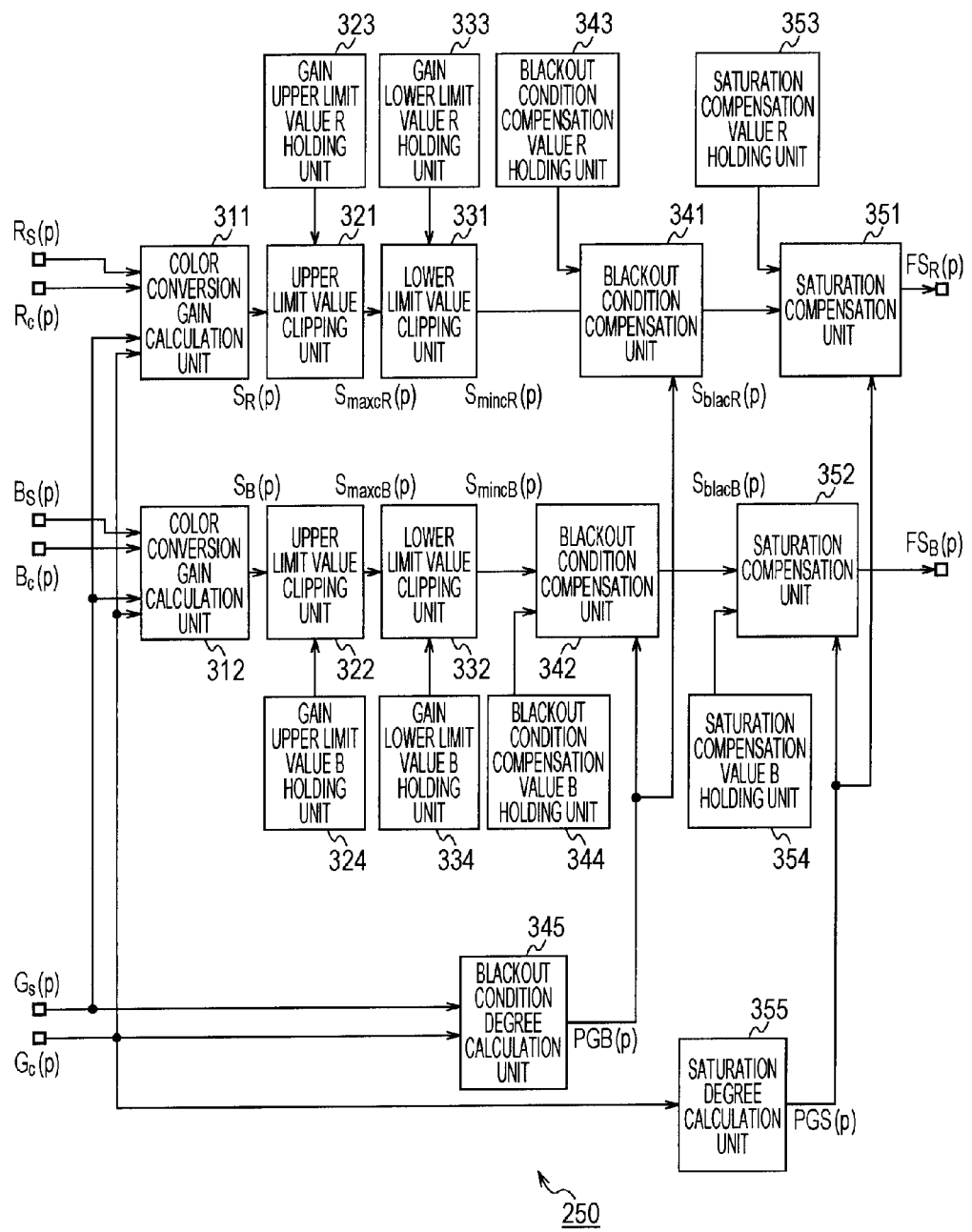
FIG. 6 illustrates an example of the configuration of a channel gain calculation unit 250 in the first embodiment of the present invention.

FIG. 6 illustrates an example of the configuration of the channel gain calculation unit 250 in the first embodiment of the present invention. The channel gain calculation unit 250 includes color conversion gain calculation units 311 and 312, and calculates a gain S(p).

In the embodiment of the present invention, a gain is obtained for each channel of each pixel by using two images (reference image and processing target image) that are captured under different illumination environments with respect to the same subject and is applied, thereby generating an image having high color reproducibility. The reference image is an image whose white balance for each pixel has already been obtained or which can be easily obtained by a technique of related art or the like. On the other hand, the processing target image is assumed to be an image in which the estimation of a white-balance gain for each pixel is difficult from the image itself, such as an image captured under a plurality of light sources having a color temperature different from that of the reference image. As a result, by obtaining the white balance of the reference image, it becomes possible to indirectly calculate the white balance of the processing target image, making it possible to solve the problem of the white balance with respect to the image captured under a plurality of light sources. As a specific combination, a combination of an image captured without causing a flash to emit light and an image captured by causing a flash to emit light is assumed. Furthermore, as another example, a combination of an image having band-shaped noise (flicker) due to an influence of a fluorescent lamp and an image not having that, a combination of images for which light sources are changed in an environment in which a plurality of light sources exist, or the like is assumed.

When the intensity measured by a sensor in each pixel is denoted as I, the illumination intensity as E, and the spectral reflectance as ρ, an approximation can be made in accordance with the relationship of the following equation.

$$I(p) = E(p) \cdot \rho(p)$$

where $$I(p) = \begin{bmatrix} R(p) \\ G(p) \\ B(p) \end{bmatrix} \quad \text{[Math 1]}$$

$$E(p) = \begin{bmatrix} E_R(p) & 0 & 0 \\ 0 & E_G(p) & 0 \\ 0 & 0 & E_B(p) \end{bmatrix}$$

$$\rho(p) = \begin{bmatrix} \rho_R(p) \\ \rho_G(p) \\ \rho_B(p) \end{bmatrix}$$

Here, when the ratio of two images is calculated by setting the intensity of the reference image as $I_c$ and the intensity of the processing target image as $I_s$, it is possible to approximately cancel the influence of the spectral reflectance ρ for each channel, and the ratio Ko of the illumination components that are not dependent on the spectral reflectance can be obtained as the following equation.

$$Ko(p) = \frac{I_s(p)}{I_c(p)} = \begin{bmatrix} \frac{R_s(p)}{R_c(p)} \\ \frac{G_s(p)}{G_c(p)} \\ \frac{B_s(p)}{B_c(p)} \end{bmatrix} = \begin{bmatrix} \frac{E_{sR}(p) \cdot \rho_R(p)}{E_{cR}(p) \cdot \rho_R(p)} \\ \frac{E_{sG}(p) \cdot \rho_G(p)}{E_{cG}(p) \cdot \rho_G(p)} \\ \frac{E_{sB}(p) \cdot \rho_B(p)}{E_{cB}(p) \cdot \rho_B(p)} \end{bmatrix} \quad \text{[Math 2]}$$

$$= \begin{bmatrix} \frac{E_{sR}(p)}{E_{cR}(p)} \\ \frac{E_{sG}(p)}{E_{cG}(p)} \\ \frac{E_{sB}(p)}{E_{cB}(p)} \end{bmatrix} = \begin{bmatrix} Ko_R(p) \\ Ko_G(p) \\ Ko_B(p) \end{bmatrix}$$

When comparing two images, by correcting the image-capturing conditions so as to make the image-capturing conditions uniform, it is possible to normalize the value Ko so as to make Ko be the ratio of a pure illumination color balance. By dividing a processing target pixel $I_s$ by the value Ko, it is possible to map the illumination components of the processing target pixel into the color balance of the illumination of the reference image. However, if the processing target pixel $I_s$ is simply divided by Ko, as well as the color balance, the signal intensities are made uniform to the intensity of the reference image and thus, improvement advantage of the intensity by flash is lost. Accordingly, in order to maintain the illumination intensity, a correction that cancels an intensity change is added, and the gain S can be represented as the following equation.

$$S(p) = \frac{KI(p)}{Ko(p)} \qquad \text{[Math 3]}$$

where KI denotes the value that is determined for each pixel according to the definition of the intensity. In the embodiment of the present invention, the following relation is used to fix the value of the G channel similarly to the gain of a typical white balance.

$$KI(p) = Ko_G(p) = G_s(p)/G_c(P)$$

that is, $$S(p) = \qquad \text{[Math 4]}$$

$$\frac{Ko_G(p)}{Ko(p)} = \begin{bmatrix} \frac{G_s(p)/G_c(p)}{R_s(p)/R_c(p)} \\ \frac{G_s(p)/G_c(p)}{G_s(p)/G_c(p)} \\ \frac{G_s(p)/G_c(p)}{B_s(p)/B_c(p)} \end{bmatrix} = \begin{bmatrix} \frac{G_s(p) \cdot R_c(p)}{G_c(p) \cdot R_s(p)} \\ 1 \\ \frac{G_s(p) \cdot B_c(p)}{G_c(p) \cdot B_s(p)} \end{bmatrix} = \begin{bmatrix} S_R(p) \\ S_G(p) \\ S_B(p) \end{bmatrix}$$

The color conversion gain calculation units 311 and 312 calculate the gain $S_R(p)$ and $S_B(p)$, respectively, in accordance with the above equation. Meanwhile, in the embodiment of the present invention, since it is presumed that the value of the G channel is fixed, the gain $S_G(p)$ always becomes "1". Meanwhile, the reason why the value of the G channel is fixed is that the signal of the G channel has the greatest number of pixels, furthermore, the sensitivity is high, and thus, the reliability is considered to be high.

Meanwhile, in the embodiment of the present invention, the gain S is calculated by the ratio Ko of the same channel between the images. The same process may be realized by changing the computation order. In general, a division process is a process in which the computation cost is high. In order to reduce the number of computations, use of a technique, such as a process based on a reciprocal look-up table or subtraction after being converted into a logarithm, is preferable. Furthermore, for the value of KI, needless to say, a ratio of other than the G channel, such as a luminance value for each pixel, can be used.

By multiplying the gain obtained in this manner to each pixel in the channel gain application unit 260, an image whose illumination intensity is equal to that of the processing target image can be obtained at the color balance of the reference image. In the technique according to the embodiment of the present invention, separation of light sources is not performed, and by viewing the combined light of the processing target image as one light source, the combined light is mapped to the color balance of the illumination of the reference image. For this reason, even if the difference of the two images is formed of plural light sources, the embodiment operates normally.

However, in the above equation, it is presumed that the color balance of the reference image is correct. In a case where the channel of each pixel is saturated or a blackout condition has occurred, the color balance itself of the reference pixel is not correct. Furthermore, in even the pixels corresponding to a moving subject, the ratio Ko is not obtained correctly, and the gain S may become a very large value or a very small value. For this reason, the illumination component conversion processing unit 120 further includes upper limit value clipping units 321 and 322 and lower limit value clipping units 331 and 332. With this arrangement, an upper limit value and a lower limit value are set in the values of the gain, and a clipping process is performed, thereby suppressing an extreme artifact. Furthermore, the illumination component conversion processing unit 120 further includes blackout condition compensation units 341 and 342, a blackout condition degree calculation unit 345, saturation compensation units 351 and 352, and a saturation degree calculation unit 355. With this arrangement, reference values for a blackout condition and saturation are given, a determination is made as to the effectiveness of the gain S, and a weighted average with a compensation value determined in a scheme unique to the time of blackout condition and saturation is set as a gain, thereby obtaining a gain at which a large breakdown does not occur.

The upper limit value clipping units 321 and 322 perform a clipping process so that the gain $S_R(p)$ or $S_B(p)$ becomes an upper limit value in a case where it exceeds the upper limit value. The lower limit value clipping units 331 and 332 perform a clipping process so that the gain $S_R(p)$ or $S_B(p)$ becomes a lower limit value in a case where it falls below the lower limit value. The gain upper limit value can be set in advance in the gain upper limit value R holding unit 323 or in the gain upper limit value B holding unit 324. Furthermore, the gain lower limit value can be set in advance in the gain lower limit value R holding unit 333 or in the gain lower limit value B holding unit 334. The gain upper limit value and the gain lower limit value may be set from the outside or may be calculated internally and then set. When calculating the gain upper limit value and the gain lower limit value, the following equation can be used.

$$\text{Gain upper limit value} = \max\left(1, \frac{WB_s}{WB_c}\right) = \begin{bmatrix} \max\left(1, \frac{WB_{sR}}{WB_{cR}}\right) \\ \max\left(1, \frac{WB_{sG}}{WB_{cG}}\right) \\ \max\left(1, \frac{WB_{sB}}{WB_{cB}}\right) \end{bmatrix} \qquad \text{[Math 5]}$$

$$\text{Gain lower limit value} = \min\left(1, \frac{WB_s}{WB_c}\right) = \begin{bmatrix} \min\left(1, \frac{WB_{sR}}{WB_{cR}}\right) \\ \min\left(1, \frac{WB_{sG}}{WB_{cG}}\right) \\ \min\left(1, \frac{WB_{sB}}{WB_{cB}}\right) \end{bmatrix} \qquad \text{[Math 6]}$$

In the above equations, $WB_c$ is a white balance for the reference image, and $WB_s$ is a white balance for the processing target image. Consequently, the gain applied to each pixel together with the gain in the white balance processing unit 130 at a subsequent stage falls below between the white balance of the reference image corresponding to the channel and the white balance of the processing target image, and a large breakdown can be prevented. Here, for $WB_c$, the value calculated by the white balance calculation unit 230 can be used. Furthermore, for $WB_s$, the white-balance value obtained by measuring the flash emitting unit 61 of FIG. 1 in advance. Furthermore, a value obtained from the processing target image by the same technique as that of $WB_c$ may be used.

The gains $S_{macR}(p)$ and $S_{macB}(p)$ on which a clipping process has been performed by the upper limit value clipping units 321 and 322 are supplied to the lower limit value clipping units 331 and 332, respectively. Furthermore, the gains $S_{mincR}(p)$ and $S_{mincB}(p)$ on which a clipping process has been performed by the lower limit value clipping units 331 and 332 are supplied to the blackout condition compensation units 341 and 342, respectively.

The blackout condition degree calculation unit 345 calculates a blackout condition degree indicating a degree to which the blackout condition has occurred on the basis of the value of a specific channel of the reference image or the processing target image. Here, for the specific channel, the G channel is assumed. In general, in an image sensor, linearity is lost in the characteristics of the sensor in a blackout condition area. In addition, regarding a channel in which a complete blackout condition occurs and the pixel value has become 0, the ratio Ko is not correctly obtained. Accordingly, for the pixel having a very small pixel value, it is necessary to calculate the gain by another method. When the target pixel of the processing target image is dark, this is inconspicuous even if an incorrect gain is calculated and a color balance is applied. However, when the target pixel has a sufficient luminance by a flash, the breakdown of the color balance is greatly conspicuous. As a result of this, it is preferable that the characteristic demanded for the blackout condition degree takes a large value when the reference image has a very small value, and shows a large value when the processing target image becomes sufficiently bright due to a flash.

Figure 7:
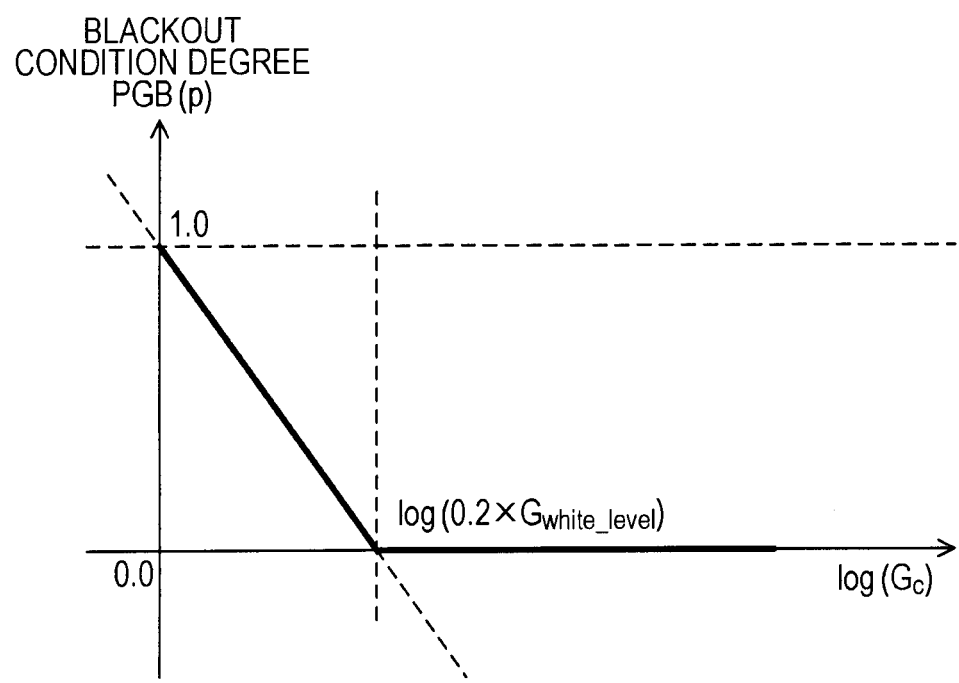
FIG. 7 illustrates an example of a blackout condition degree in the first embodiment of the present invention.

Accordingly, for the blackout condition degree PGB(p), it is effective that a value that suddenly decreases from 0 to the value of Gc serving as a certain threshold value, and that becomes 0 at and over the threshold value is used as in FIG. 7 and in the following equation.

$$PGB(p) = \begin{cases} \text{if} & (G_c(p) > 0.2 \times G_{white\_level}) \\ \text{then} & 0 \\ \text{else} & 1.0 - \dfrac{\log G_c(p)}{\log(0.2 \times G_{white\_level})} \end{cases} \quad \text{[Math 7]}$$

where $G_{white\_level}$ is an upper limit value of $G_c$. This equation is used to calculate a blackout condition degree from the pixel value of the reference image.

Figure 8:
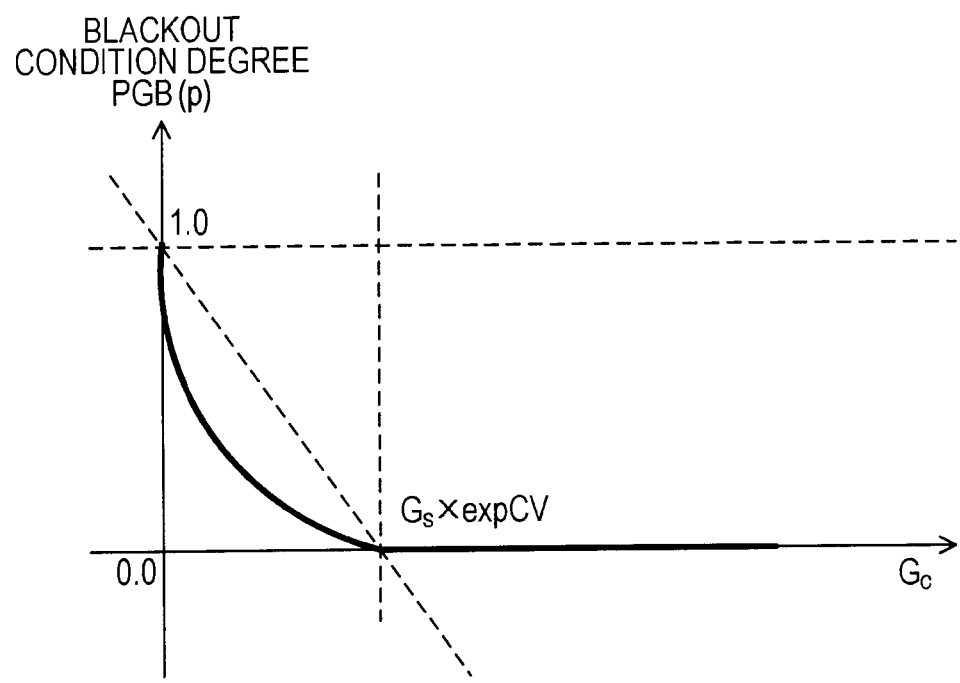
FIG. 8 illustrates another example of the blackout condition degree in the first embodiment of the present invention.

Furthermore, in order to make clear that the area has become bright as a result of a flash being hit, the blackout condition degree PGB(p) may be set in accordance with FIG. 8 and the following equation. This equation is used to calculate a blackout condition degree on the basis of the pixel value of the reference image and the inter-channel ratio of the reference image to the processing target image.

$$PGB(p) = \begin{cases} \text{if} & (G_c(p) > G_s(p) \cdot \exp CV) \\ \text{then} & 0 \\ \text{else} & \alpha \times (\log G_{white\_level} - \log G_c(p)) \times \\ & \log\left(\dfrac{G_s(p)}{G_c(p)} \cdot \exp CV\right) \end{cases} \quad \text{[Math 8]}$$

where expCV is the coefficient for correcting a difference in the exposure, which results from the difference in the aperture, the shutter speed, and the ISO sensitivity setting for the sensor, between the reference image and the processing target image. Furthermore, in a simplified form, expCV may be set in accordance with the following equation based on Exif information, where F denotes the F value indicating an aperture, t denotes the shutter speed, and ISO denotes ISO sensitivity. The respective subscripts c mean a reference image, and subscripts s mean a processing target image.

$$\exp CV = \frac{t_c \times ISO_c / F_c^2}{t_s \times ISO_s / F_s^2} \quad \text{[Math 9]}$$

The blackout condition degree of the latter suddenly decreases from 0 to the value of $G_s \cdot \exp CV$ at which exposure is adjusted, and becomes 0 at and following $G_s \cdot \exp CV$. The blackout condition degree has a large value when the intensity $G_c$ of G of the reference image is small and a blackout condition has occurred on account of monotonously decreasing characteristic. In addition, as a result of having attributes in the form of a downwardly convex from 0 to Gs·expCV, the blackout condition degree has a large value when the ratio of the reference image to the processing target image after exposure adjustment is large, that is, when the contribution rate of the flash is large. In the case of a weight having such characteristics, the weight calculation method is not limited to the above-mentioned equation.

The blackout condition compensation value R holding unit 343 and the blackout condition compensation value B holding unit 344 hold a blackout condition compensation value serving as a criterion when a blackout condition is to be compensated for. It is effective that the blackout condition compensation value is set as WBs/WBc by considering that the illumination components of the processing target pixels are almost produced by a flash. For WBc and WBs at this time, values identical to those for the white balance, which are used to calculate the upper limit value and the lower limit value, can be used. Furthermore, for WBs herein, the white-balance value obtained by double white balance correction described in Japanese Patent No. 3889017 may be used.

The blackout condition compensation units 341 and 342 perform a process that causes the gains $S_{minc}(S_{mincR}(p)$ and $S_{mincB}(p))$ to approach the blackout condition compensation values held in the blackout condition compensation value R holding unit 343 and the blackout condition compensation value B holding unit 344. Specifically, the blackout condition compensation units 341 and 342 generate gains $S_{blacR}(p)$ and $S_{blacB}(p)$ in accordance with a pro-rata process (weighted average) with $S_{minc}$ in which the blackout condition degree PGB(p) is a weight, and the blackout condition compensation value.

Figure 9:
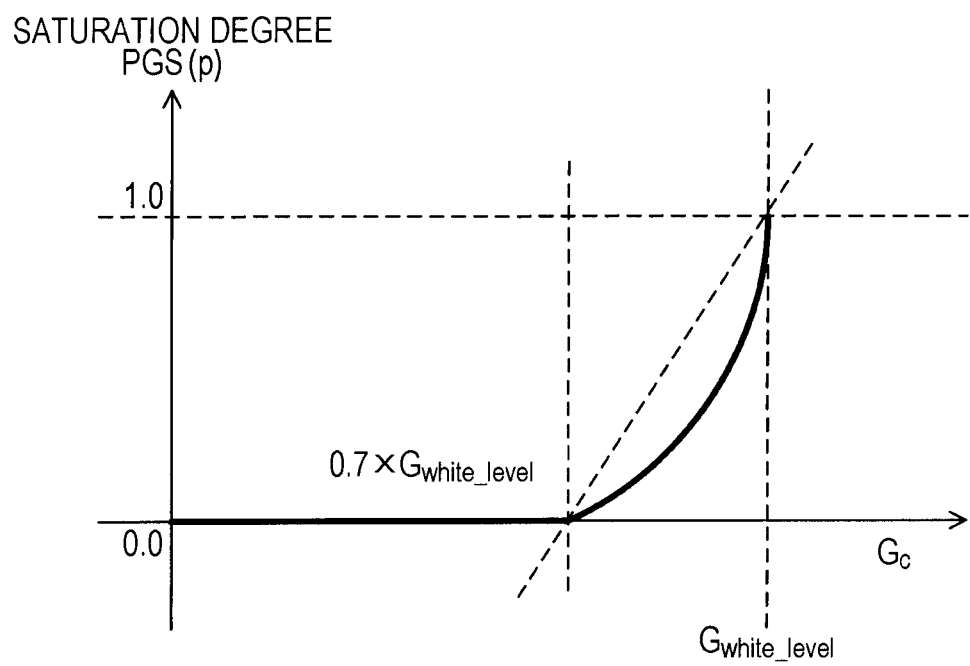
FIG. 9 illustrates an example of a saturation degree in the first embodiment of the present invention.

The saturation degree calculation unit 355 calculates a saturation degree indicating the degree to which the reference image is saturated (whiteout condition) on the basis of the value of the G channel of the reference image. In general, in the saturation area of the image sensor, the linearity is lost in the characteristics of the sensor. Then, in addition, regarding a channel in which the image is completely saturated and the value has reached the upper limit value, the ratio Ko is not correctly obtained. Accordingly, regarding a pixel whose pixel value is very large, it is necessary to calculate the gain by another method. For the saturation degree PGS(p), a value having such characteristics as those of FIG. 9 is considered to be effective. That is, the saturation degree is 0 up to a certain threshold value, and the saturation degree suddenly increases in an area in which the intensity $G_c$ of G of the reference image exceeds the threshold value. In a case where the reference pixel is saturated, it is expected that, also in the processing target pixel, ambient light components among the illumination components have a sufficient magnitude.

The saturation compensation value R holding unit 353 and the saturation compensation value B holding unit 354 hold a saturation compensation value serving as a criterion when the saturation is to be compensated for. It is considered to be effective that this saturation compensation value is set to "1".

The saturation compensation units 351 and 352 perform a process for making gains $S_{blac}(S_{blacR}(p)$ and $S_{blacB}(p))$ approach the saturation compensation value held in the saturation compensation value R holding unit 353 and the saturation compensation value B holding unit 354. Specifically, the saturation compensation units 351 and 352 generate gains $FS_R(p)$ and $FS_B(p)$ in accordance with a pro-rata process (weighted average) of the gain $S_{blac}$ in which the saturation degree PGS(p) is a weight, and the saturation compensation value.

Meanwhile, in the above-mentioned blackout condition degree calculation unit 345 and saturation degree calculation unit 355, a determination is made as to the blackout condition degree and the saturation degree by using the G channel, but this determination is not limited to the G channel. A determination using R and B channels, or a determination based on the maximum/minimum, the linear sum, and the luminance value thereof, and the like, are also effective.

In the channel gain calculation unit 250, in the intensity in the gain obtained by the color conversion gain calculation units 311 and 312, in the blackout condition degree determination by the blackout condition degree calculation unit 345, and in the saturation degree determination by the saturation degree calculation unit 355, the G channel is used. Thus, it is necessary to have a value for the G channel for each pixel in addition to the original channel in the mosaic image, but it is not necessarily necessary regarding channels other than that. Furthermore, this channel that becomes necessary for each pixel changes as the channel serving as a criterion for an intensity is changed.

[First Example of Configuration of Channel Gain Application Unit 260]

Figure 10:
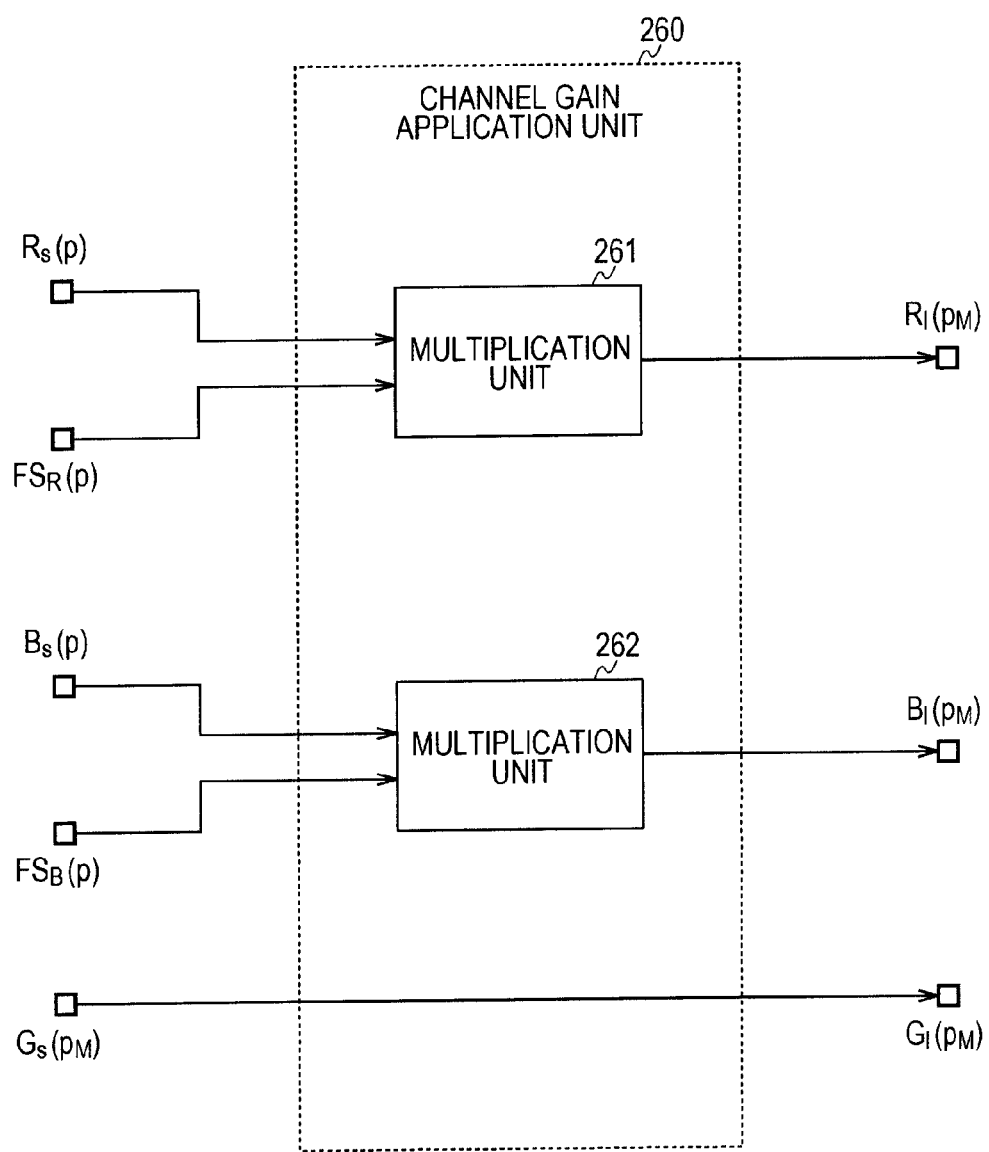
FIG. 10 illustrates an example of the configuration of a channel gain application unit 260 in the embodiment of the present invention.

FIG. 10 illustrates a first example of the configuration of a channel gain application unit 260 in the embodiment of the present invention. The first example of the configuration of the channel gain application unit 260 includes multiplication units 261 and 262. The multiplication unit 261 multiplies $R_s(p)$ of a processing target image $I_s(p)$ from the demosaic processing unit 222 by a gain $FS_R(p)$ from the channel gain calculation unit 250. The multiplication unit 262 multiplies $B_s(p)$ of the processing target image $I_s(p)$ from the demosaic processing unit 222 by a gain $FS_B(p)$ from the channel gain calculation unit 250. When the processes of them are represented by an equation, the following equation is obtained.

$$R_l(p)=FS_R(p) \times R_s(p)$$

$$B_l(p)=FS_B(p) \times B_s(p)$$

$R_l(p)$ and $B_l(p)$ form the R channel and the B channel of the mosaic image $M_l$, respectively. Furthermore, in the embodiment of the present invention, since the gain for the G channel is fixed to 1, the value for the G channel is not changed before and after the illumination component conversion process. For this reason, the respective pixels of G of the mosaic image $M_s$ of the processing target image are read as G at corresponding positions in the mosaic image $M_l$ and are stored. Depending on the intensity of the signal held when the gain is to be calculated, it becomes necessary to apply a gain for the G channel. In that case, in the channel gain calculation unit 250, the gain for the G channel is calculated conforming to the R and B channels, and the gain is applied in the channel gain application unit 260.

Meanwhile, in the first example of the configuration of the channel gain application unit 260, the input of the reference image $I_c(p)$ from the demosaic processing unit 221 becomes unnecessary.

[Example of Operation]

Figure 11:
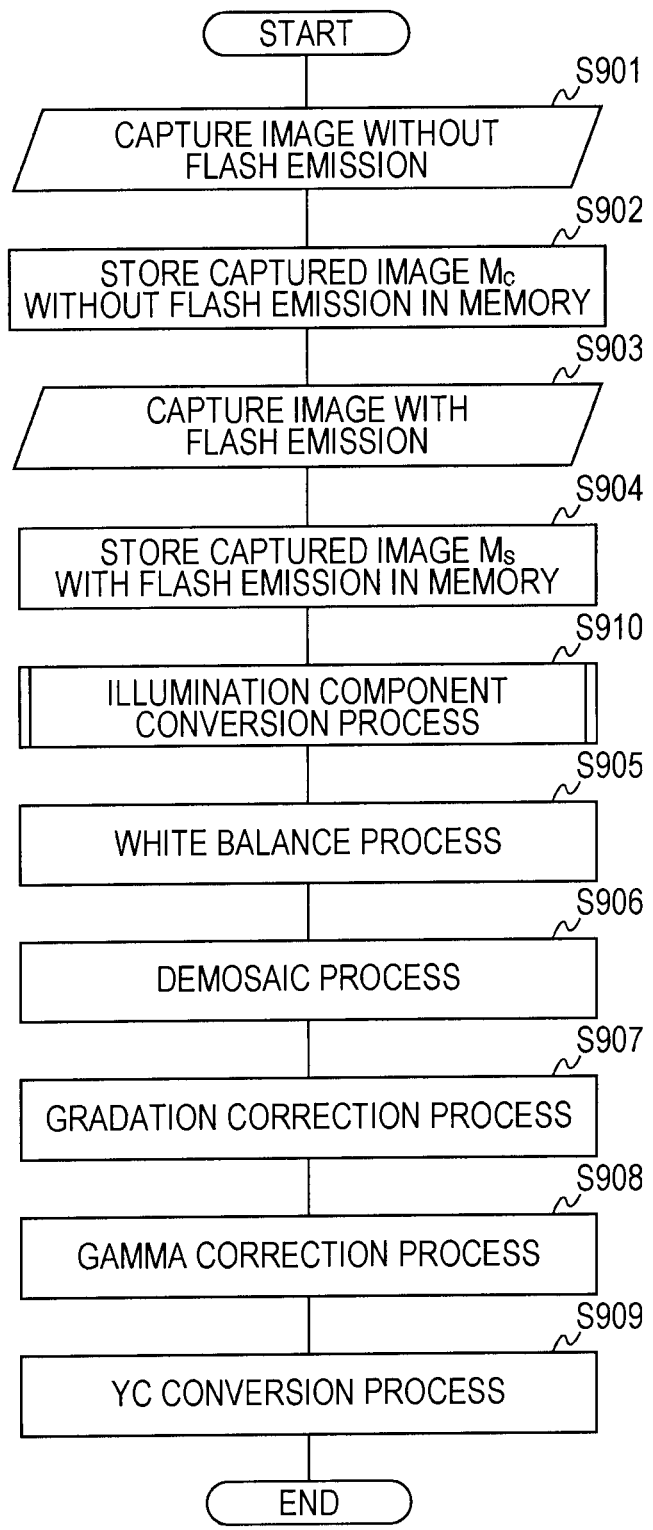
FIG. 11 illustrates an example of the operation of an image-capturing device in the embodiment of the present invention.

FIG. 11 illustrates an example of the operation of an image-capturing device in the embodiment of the present invention. First, image capturing is performed without causing the flash emitting unit 61 to emit light (step S901). The image is stored as a mosaic image $M_c$ of the reference image in the reference mosaic image holding unit 111 (step S902). Next, image capturing in which the flash emitting unit 61 is made to emit light is performed (step S903). The image is stored as a mosaic image $M_s$ of the processing target image and is stored in the processing target mosaic image holding unit 112 (step S904).

After that, the illumination component conversion processing unit 120 of the image processing circuit 23 adjusts the color balance of the processing target image on the basis of the two captured images, and converts the illumination components into the color balance of a single light source (step S910). Then, the white balance processing unit 130 adjusts the color balance of the mosaic image (step S905). Next, the demosaic processing unit 140 generates an RGB image in which the RGB information is fully prepared on each pixel from the mosaic image (step S906). Next, the gradation correction processing unit 150 performs a gradation correction process on the RGB image (step S907). Next, the gamma correction processing unit 160 performs a gamma correction process on the image that has been subjected to gradation correction (step S908). Next, the YC conversion processing unit 170 converts the gamma-corrected RGB image into a YC image (step S909). The converted YC image is output for the display on an LCD or for the storage on a recording medium. As a result of the above, the operation of the image processing unit for one frame is completed. If there is no input of the subsequent frame, the operation of the image processing unit is completed. Meanwhile, the image-capturing order may be reversed in such a manner that, regarding the presence or absence of the light emission of the flash emitting unit 61, the image with light emission is captured earlier.

Figure 12:
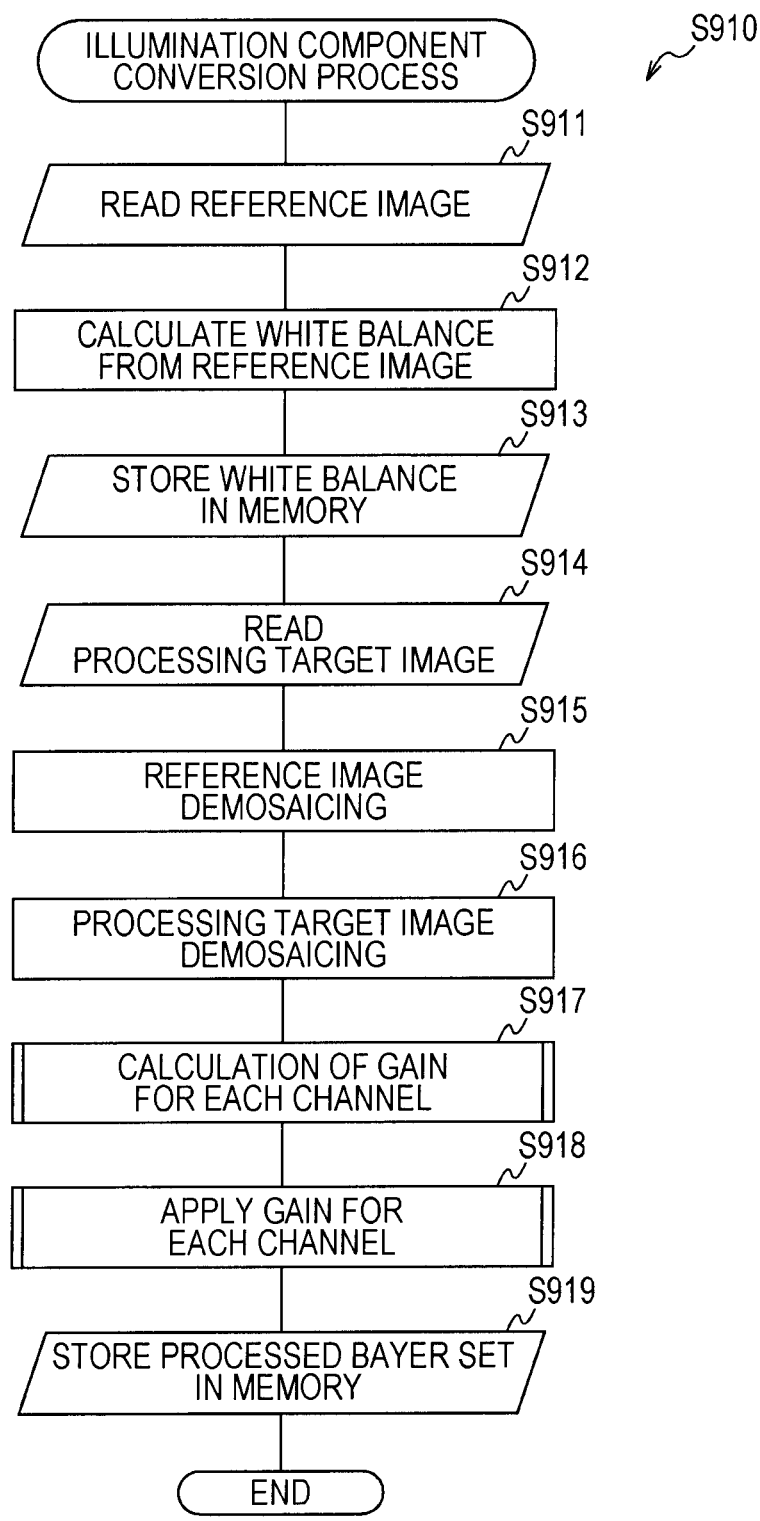
FIG. 12 illustrates an example of the operation of an illumination component conversion processing procedure in the first embodiment of the present invention.

FIG. 12 illustrates an example of the operation of an illumination component conversion processing procedure (step S910) in the first embodiment of the present invention. First, the reference image is read (step S911), and a white balance for each channel for the reference image is calculated (step S912). The calculated white balance is held in the reference image white balance holding unit 240 (step S913). Hereinafter, in the following steps, processing for each pixel is made to proceed with respect to the entire screen.

Next, the processing target image is read (step S914). The read reference image and processing target image are subjected to a demosaic process in the demosaic processing units 221 and 222, respectively (steps S915 and S916). At this time, the order of the demosaic processes does not matter. Then, in the channel gain calculation unit 250, the gain for each channel for color balance adjustment is calculated from the values of R, G, and B of the reference image and the processing target image (step S917). The calculated gain is used for each channel of the processing target image in the channel gain application unit 260 (step S918). The processing target image that is processed in this manner is held in the illumination component converted mosaic image holding unit 290 (step S919).

When the processing of steps S911 to S919 is completed, the illumination component conversion process for one frame is completed.

Figure 13:
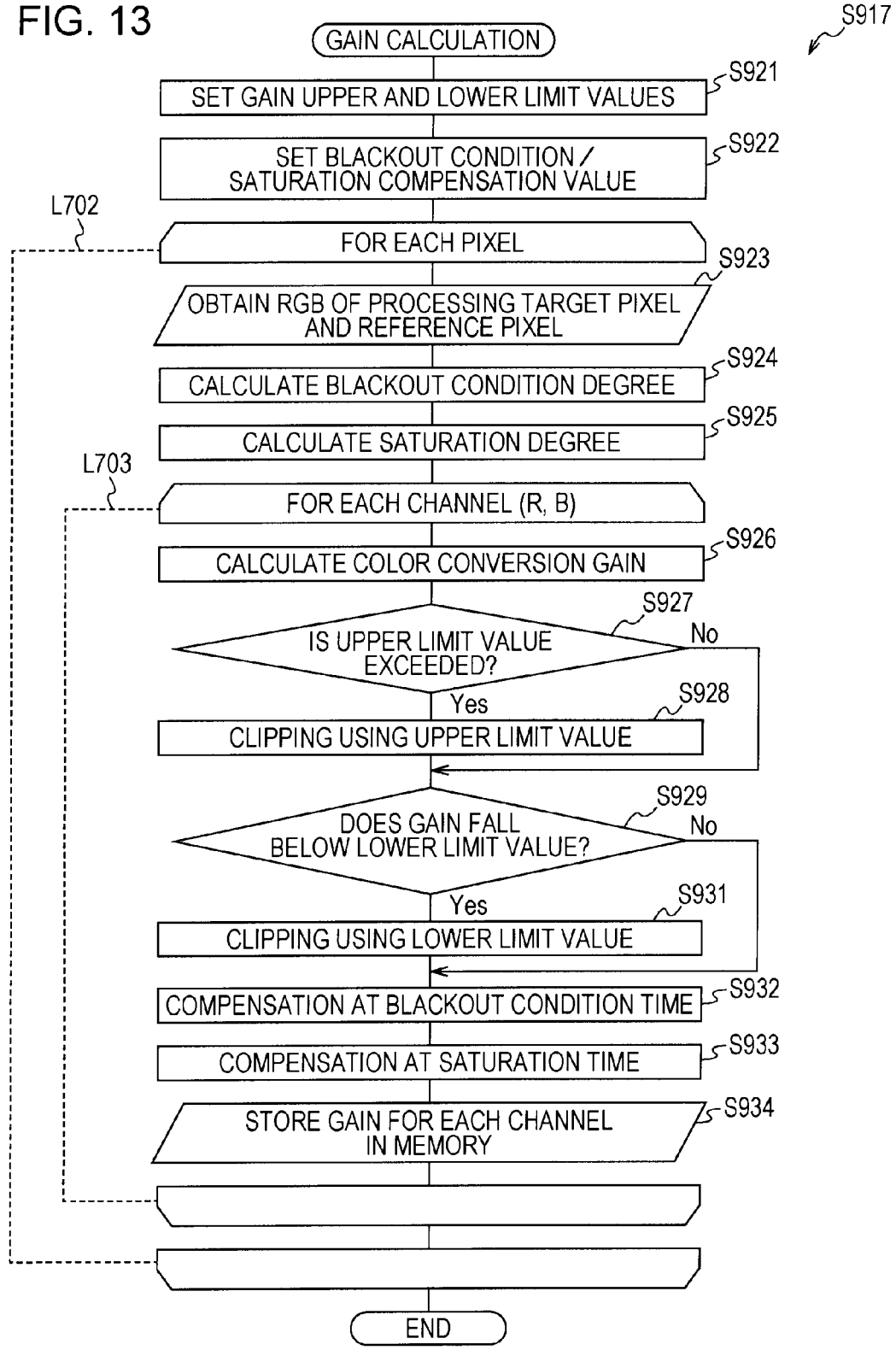
FIG. 13 illustrates an example of the operation of a channel gain calculation processing procedure in the first embodiment of the present invention.

FIG. 13 illustrates an example of the operation of a channel gain calculation processing procedure (step S917) in the first embodiment of the present invention. First, a gain upper limit value or a lower limit value is set correspondingly in the gain upper limit value R holding unit 323, the gain upper limit value B holding unit 324, the gain lower limit value R holding unit 333, and the gain lower limit value B holding unit 334 (step S921). Furthermore, a blackout condition compensation value is set in the blackout condition compensation value R holding unit 343 and the blackout condition compensation value B holding unit 344, and a saturation compensation value is set in the saturation compensation value R holding unit 353 and the saturation compensation value B holding unit 354 (step S922). Then, the following processing is repeated by using each pixel as a target.

In a loop L702, the pixel of the processing target image and the pixel of the reference image are obtained (step S923). Then, in the blackout condition degree calculation unit 345, a blackout condition degree is calculated (step S924), and in the saturation degree calculation unit 355, a saturation degree is calculated (step S925). Then, furthermore, the following processing is repeated by using each channel (the R channel and the B channel) as a target (loop L703).

In the loop L703, a color conversion gain is calculated by the color conversion gain calculation units 311 and 312 (step S926). At this time, when the gain exceeds the gain upper limit value that is held in the gain upper limit value B holding unit 324 or the gain upper limit value R holding unit 323 (step S927), a clipping process using the gain upper limit value is performed (step S928). In a case where the gain lower limit value falls below the gain lower limit value that is held in the gain lower limit value R holding unit 333 or the gain lower limit value B holding unit 334 (step S929), a clipping process using the gain lower limit value is performed (step S931). The clipping processes may be performed in the order of the lower limit value and the upper limit value. Furthermore, in the blackout condition compensation unit 341 or 342, blackout condition compensation corresponding to the blackout condition degree is performed (step S932). Furthermore, in the saturation compensation unit 351 or 352, saturation degree compensation corresponding to the saturation degree is performed (step S933). The gain that is obtained in this manner is stored in a memory (not shown) (step S934).

When the processing of steps S926 to S934 in the loop L703 is completed, the same processing is repeated with regard to the next channel. When the processing for all the channels is completed, control exits from the loop L703, and the processing for the next pixel is repeated. When the processing for all the pixels is completed, control exits from the loop L702, and the channel gain computation process for one frame is completed. Meanwhile, in the first embodiment of the present invention, it is possible that, between step S923 and step S924, the demosaic processes performed in step S915 and step S916 in FIG. 12 are inserted as processes for each pixel. As a result, the processes of steps S914 to S916 in FIG. 12 can be performed in combination in the loop L702.

Figure 14:
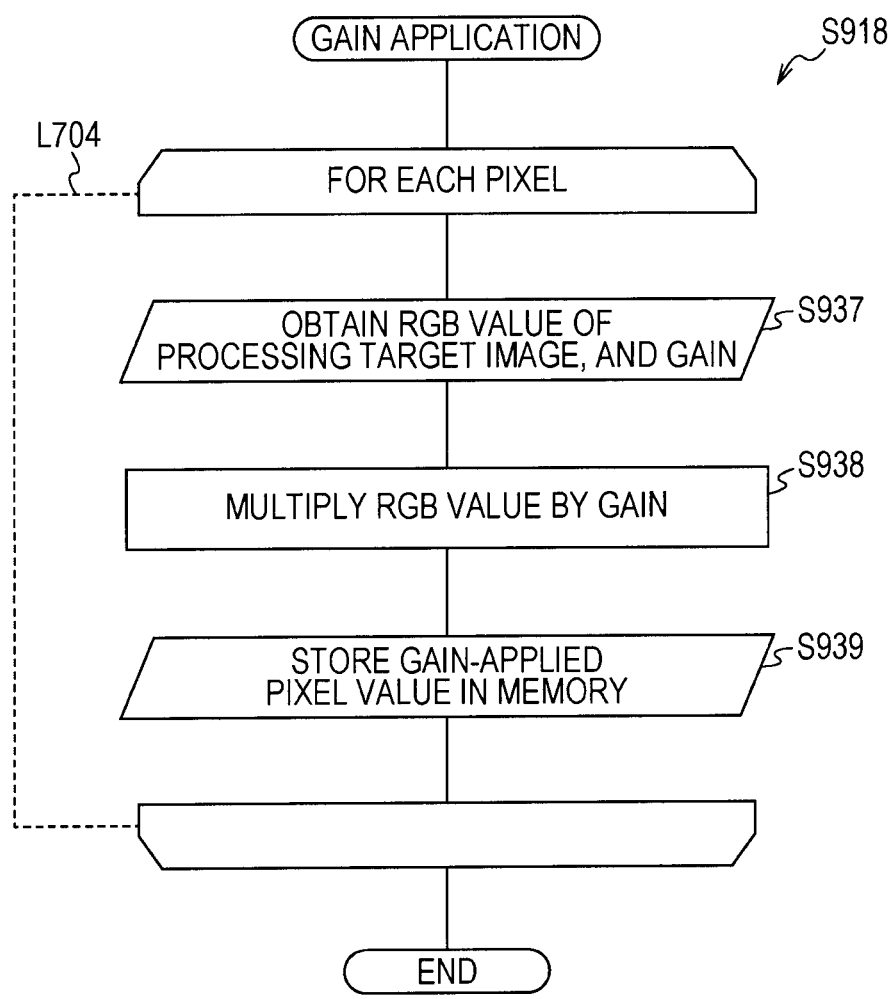
FIG. 14 illustrates an example of the operation of a channel gain application processing procedure in the first embodiment of the present invention.

FIG. 14 illustrates an example of the operation of a channel gain application processing procedure (step S918) in the first embodiment of the present invention. Here, the following processing is repeated by using each pixel as a target (loop L704).

In the loop L704, the RGB value ($R_s(p)$ and $B_s(p)$) and the gain ($FS_R(p)$ and $FS_B(p)$) of the processing target image are obtained (step S937). The RGB value and the gain are multiplied by each other for each channel by the multiplication units 261 and 262 (step S938). This multiplication result is held, as the pixel value of the gain-applied mosaic image $M_I$ for each channel, at a position appropriate for the position of the original pixel in the mosaic image $M_s$ of the processing target image of the illumination component converted mosaic image holding unit 290 (step S939). Furthermore, the process of step S939 referred to herein is step S919 in FIG. 12, and the other processing can be omitted by storing the processing result in one of them.

When the processing in all the pixels is completed, control exits from the loop L704, and the channel gain application process for one frame is completed. Meanwhile, in the first embodiment of the present invention, by inserting the processes of steps S938 to S939 immediately after step S933 in FIG. 13, the loop L703 in FIG. 13 and the loop L704 in FIG. 14 can be formed as a common loop process. Furthermore, at this time, steps S934 and S937 are omitted.

As described above, according to the first embodiment of the present invention, the gain for each pixel is obtained so as to become the color balance of the reference image, and this gain is used in each pixel of the processing target image by the multiplication units 261 and 262, thereby making it possible to generate an image having high color reproducibility. Furthermore, when the gain is to be calculated, in a case where the gain becomes outside the upper limit value or the lower limit value, by performing a clipping process in the upper limit value clipping units 321 and 322 and the lower limit value clipping units 331 and 332, it is possible to suppress an extreme artifact. Furthermore, when the gain is to be calculated, in a case where a blackout condition or saturation has occurred, a weighted average with the compensation value is set as a gain in the blackout condition compensation units 341 and 342 and the saturation compensation units 351 and 352, making it possible to obtain a gain at which a large breakdown does not occur.

Second Embodiment

In the above-described first embodiment, gain application is performed by a simple multiplication in the multiplication units 261 and 262. However, when an actual gain application is to be performed, there is a case in which the coordinate of the pixel subtly deviate, and a case can occur in which in a state as is, it is not possible to sufficiently deal with the disturbance. Accordingly, in the following, a description will be given of an example in which robust gain application is performed by performing smoothing from the neighboring pixels in accordance with the reliability of each pixel. Meanwhile, since the assumed configuration of the image-capturing device and the image processing circuit 23 is the same as that of the first embodiment, the description thereof is omitted.

[Example of Configuration of Illumination Component Conversion Processing Unit 120]

Figure 15:
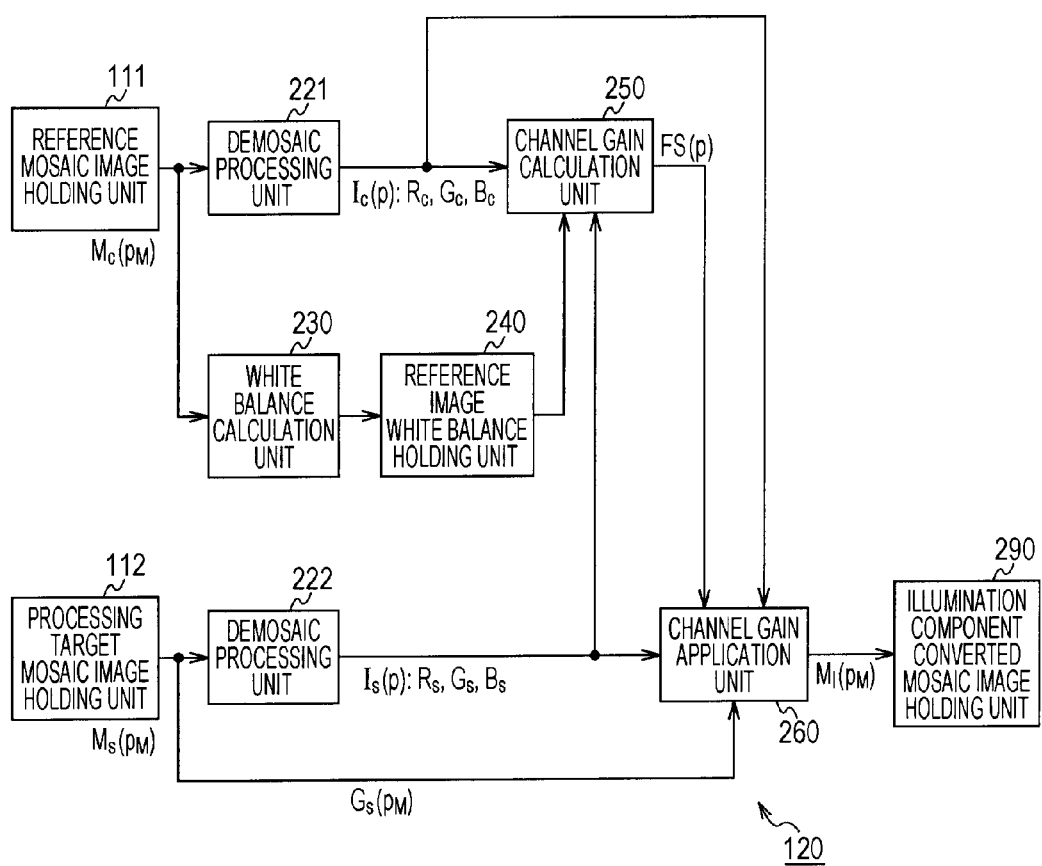
FIG. 15 illustrates an example of the configuration of the illumination component conversion processing unit 120 in a second embodiment of the present invention.

FIG. 15 illustrates an example of the configuration of the illumination component conversion processing unit 120 in a second embodiment of the present invention. The example of the configuration of the illumination component conversion processing unit 120 differs from the first example of the configuration described with reference to FIG. 5 in that the output from the demosaic processing unit 221 is input to the channel gain application unit 260, and is the same as the configuration of the first example of the configuration except for this point. Therefore, the description of the other configuration is omitted.

[Example of Configuration of Channel Gain Application Unit 260]

Figure 16:
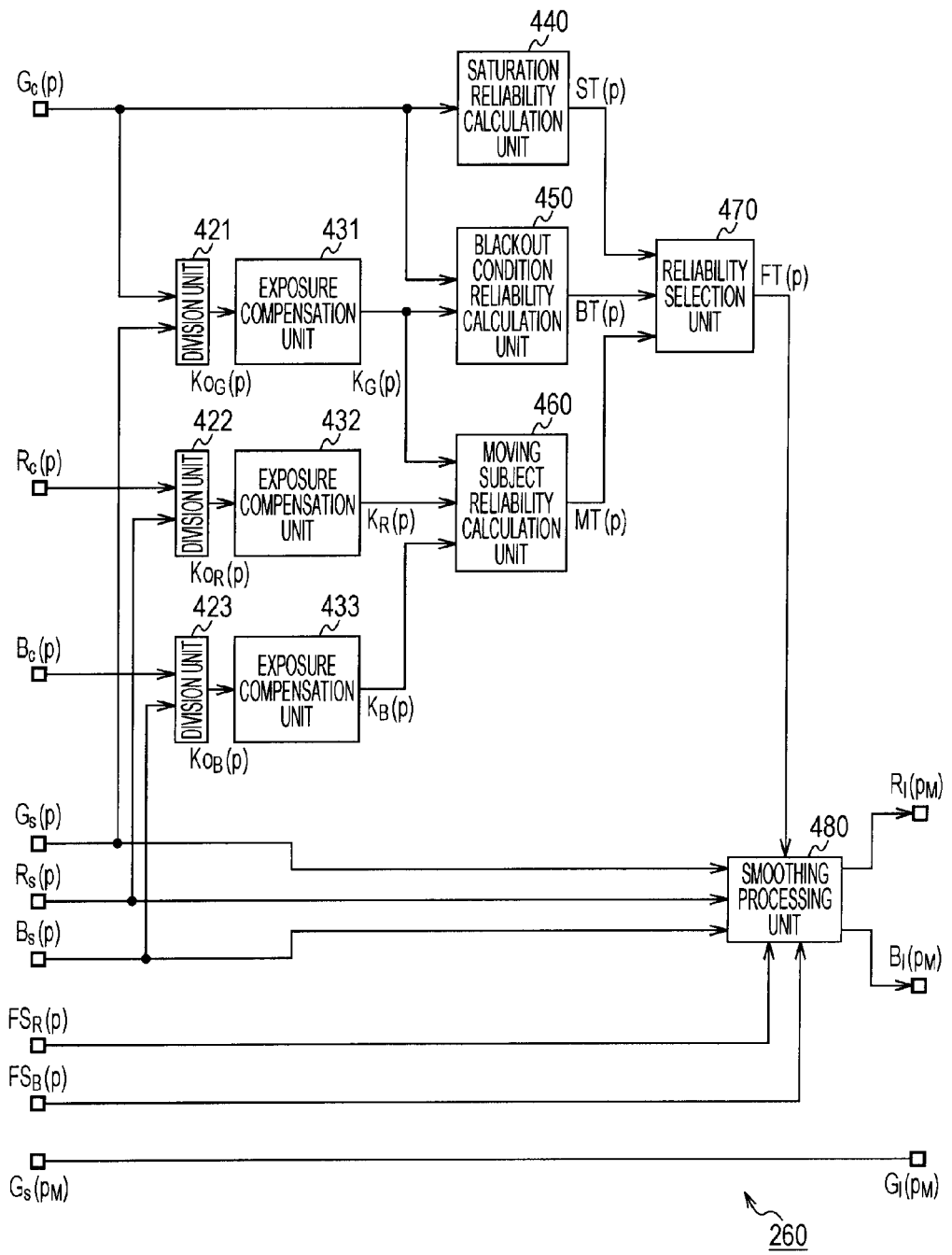
FIG. 16 illustrates an example of the configuration of a channel gain application unit 260 in the second embodiment of the present invention.

FIG. 16 illustrates an example of the configuration of the channel gain application unit 260 in the second embodiment of the present invention. The example of the configuration of the channel gain application unit 260 includes division units 421 to 423, exposure compensation units 431 to 433, a saturation reliability calculation unit 440, a blackout condition reliability calculation unit 450, a moving subject reliability calculation unit 460, a reliability selection unit 470, and a smoothing processing unit 480.

The division units 421 to 423 generate a ratio Ko for each channel of each pixel between the reference image and the processing target image. In general, a division is a process in which a computation cost is high. Therefore, this division is preferably realized by a process using a reciprocal look-up table or a technique in which a subtraction after being converted into a logarithm for the purpose of reducing the number of computations is performed.

The exposure compensation units 431 to 433 perform a process for compensating for a difference in the image-capturing conditions of two images. As a result of this exposure compensation process, the intensity is adjusted so that the exposure intensities in an area in which the illumination environments in the reference image and the processing target image are equal and stationary become equal to each other. In general, in image capturing using a digital camera, even if an image of the same subject is captured under an equal illumination environment, the signal intensity that is observed differs depending on ISO sensitivity setting for an aperture, a shutter speed, and a sensor. This exposure compensation process is a process for adjusting the gain so that a subject whose image is captured under the same conditions has the same intensity.

This exposure compensation process is, in a simplified form, realized by multiplying the exposure compensation value expCV calculated from each parameter of the Exif information by the ratio Ko. As a result, the ratio K after compensation is obtained.

$K_G(p) = Ko_G(p) \times expCV$ $K_R(p) = Ko_R(p) \times expCV$ $K_B(p) = Ko_B(p) \times expCV$ Meanwhile, this exposure compensation process can be omitted by considering an offset for the amount of the exposure compensation value in the condition determination at a subsequent stage.

Figure 17:
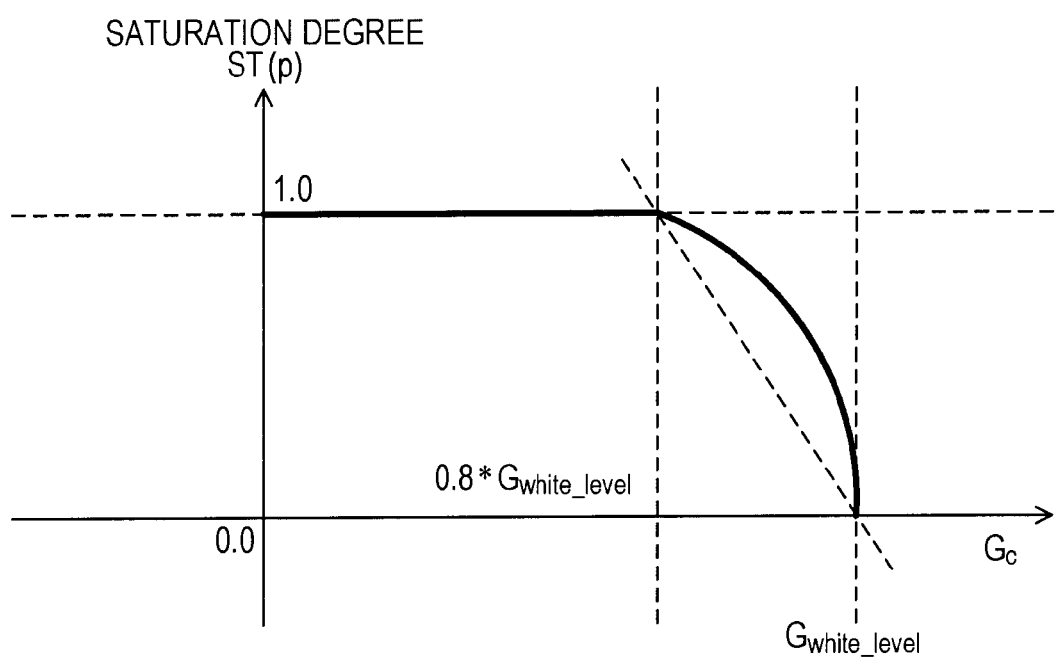
FIG. 17 illustrates an example of a saturation reliability in the second embodiment of the present invention.

The saturation reliability calculation unit 440 calculates the reliability of the reference image from the viewpoint of saturation degree. In general, in the image sensor, linear characteristics of the sensor do not hold in the saturation area. In addition, regarding a channel that is completely saturated and whose value is clipped by the upper limit value, it is difficult to correctly obtain the gain. Accordingly, during a smoothing process, it is considered to be effective that the weight of the saturated pixel is decreased and the value of the pixel is obtained using the information on the neighboring pixels having a high reliability. Therefore, for the saturation reliability ST(p), as shown in FIG. 17, characteristics in which the intensity Gc of the reference image is 1 up to the threshold value and the value suddenly decreases with an increase in the intensity after the certain threshold value is exceeded are effective. Furthermore, the present technique can also be used as a method for calculating the saturation reliability of the processing target image. In that case, Gs is used in place of Gc.

Figure 18:
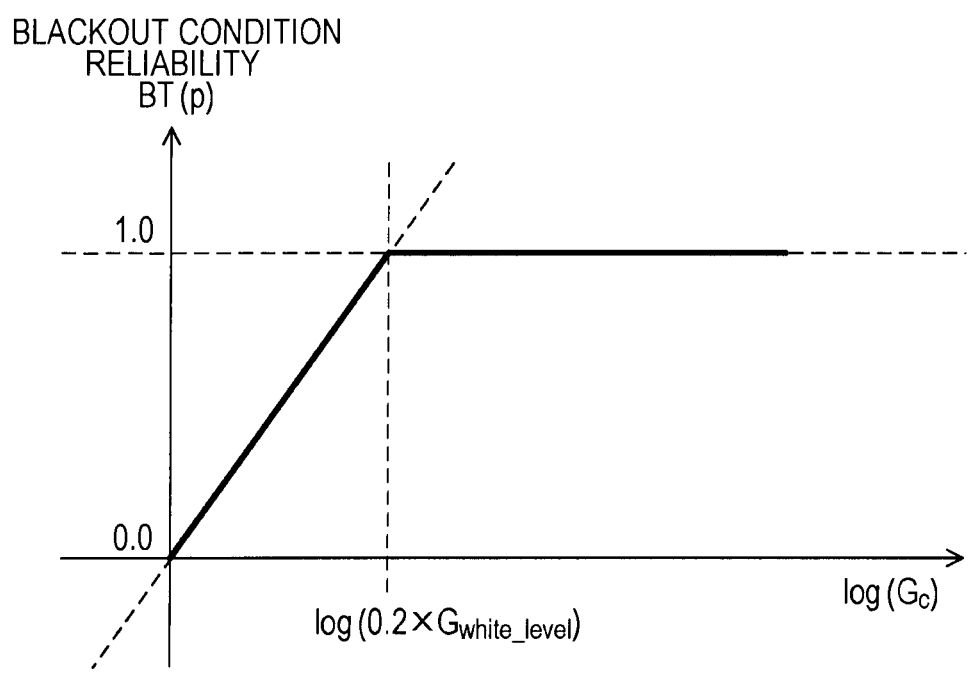
FIG. 18 illustrates an example of a blackout condition reliability in the second embodiment of the present invention.

The blackout condition reliability calculation unit 450 calculates the reliability of the reference image from the viewpoint of a blackout condition degree. In general, in the image sensor, the linearity does not hold in the characteristics of the sensor in the blackout condition area. In addition, in the channel in which a complete blackout condition occurs and the value is clipped in accordance with the lower limit value, it is difficult to correctly obtain the gain. Furthermore, such a breakdown is conspicuous when the intensity of the processing target image is great. Accordingly, it is considered to be effective that the value of the pixel is obtained by decreasing the weight during the smoothing process and by using the information on the neighboring pixels having a high reliability with respect to the pixel whose pixel value of the reference image is a very small value and whose pixel value of the processing target image is a sufficiently large value. Therefore, for the blackout condition reliability BT(p), the value having characteristics like in the following equation shown in FIG. 18 is considered to be effective. This equation calculates the blackout condition degree on the basis of the pixel value of the reference image. Furthermore, the present technique can also be used as a method of calculating the blackout condition reliability of the processing target image. In that case, Gs is used in place of Gc.

$$BT(p) = \begin{cases} \text{if} & (G_c(p) > 0.2 \times G_{white\_level}) \\ \text{then} & 1 \\ \text{else} & \dfrac{\log G_c(p)}{\log(0.2 \times G_{white\_level})} \end{cases} \quad \text{[Math 10]}$$

Figure 19:
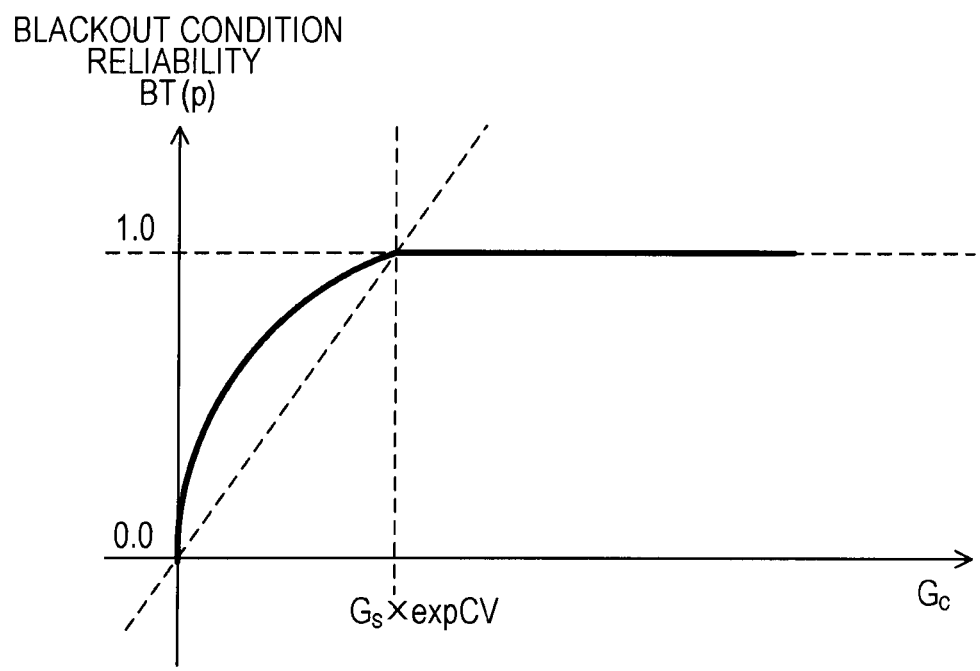
FIG. 19 illustrates another example of the blackout condition reliability in the second embodiment of the present invention.

Furthermore, the blackout condition reliability BT(p) may be a value having characteristics like in the following equation shown in FIG. 19. This equation calculates the blackout condition degree on the basis of the pixel value of the reference image and an inter-channel ratio between the reference image and the processing target image.

$$BT(p) = \begin{cases} \text{if} & (G_c(p) > G_s(p) \cdot expCV) \\ \text{then} & 1 \\ \text{else} & 1 - \alpha \times (\log G_{white\_level} - \log G_c(p)) \times \\ & \log\left(\dfrac{G_s(p)}{G_c(p)} \cdot expCV\right) \end{cases} \quad \text{[Math 11]}$$

Meanwhile, in the above-mentioned saturation reliability calculation unit 440 and blackout condition reliability calculation unit 450, a determination as to the blackout condition degree and saturation degree is made by using the G channel, but this is not limited to the G channel. A determination using R and B channels, or a determination based on the maximum/minimum, the linear sum, and the luminance value thereof, and the like, are also effective.

The moving subject reliability calculation unit 460 calculates the reliability of the reference image from the viewpoint of whether or not the subject is a moving subject. The moving subject reliability calculation unit 460 calculates the moving subject reliability MT(p) by considering the characteristic value of the distinguishable subject for any image of non-flash emission and flash emission and by making a determination as to whether or not each pixel is a moving subject. For such a characteristic value, for example, the spectral reflectance of the subject is considered. In general, since the comparison of pixels cannot be correctly performed in the moving subject, it is difficult to correctly obtain the gain. In such a pixel, it is considered to be effective that the weight is decreased during the smoothing process, and the value of the pixel is obtained by using the information on the neighboring pixels having higher reliability.

The reliability selection unit 470 selects the lowest reliability among the saturation reliability ST(p), the blackout condition reliability BT(p), and the moving subject reliability MT(p). As a result, the reliability FT(p) that is determined to be the most dubious is selected. Furthermore, during this selection, the reliability as the linear sum of the saturation reliability ST(p), the blackout condition reliability BT(p), and the moving subject reliability MT(p), may be calculated.

While the smoothing processing unit 480 performs smoothing on the basis of the reliability FT(p) obtained in this manner, the smoothing processing unit 480 applies the gains $FS_R(p)$ and $FS_B(p)$ to the RGB values ($R_s(p)$ and $B_s(p)$) of the processing target image. As an example of the first processing functions of the smoothing processing unit 480, the processing functions is realized by the following equation in a case where weighted smoothing is performed in an area α.

$$R_1(p) = \frac{\sum_{p \in \alpha} FS_R(p) \cdot FT(p)}{\sum_{p \in \alpha} FT(p)} \cdot R_s(p)$$

$$B_1(p) = \frac{\sum_{p \in \alpha} FS_B(p) \cdot FT(p)}{\sum_{p \in \alpha} FT(p)} \cdot B_s(p)$$

[Math 12]

The gain-applied mosaic image $M_I$ is held in the illumination component converted mosaic image holding unit 290. Meanwhile, another example of the smoothing process will be described later.

[Example of Configuration of Moving Subject Reliability Calculation Unit 460]

Figure 20:
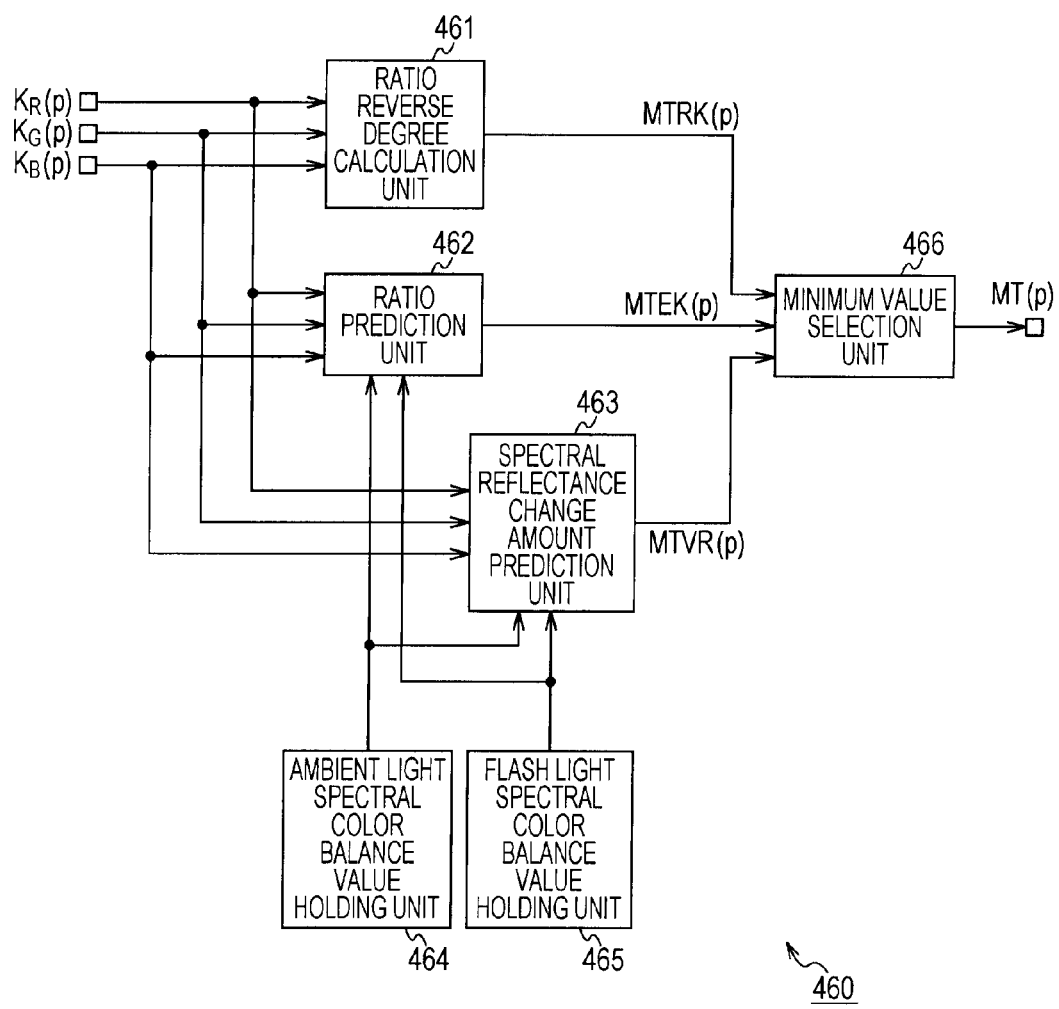
FIG. 20 illustrates an example of the configuration of a moving subject reliability calculation unit 460 in the second embodiment of the present invention.

FIG. 20 illustrates an example of the configuration of the moving subject reliability calculation unit 460 in the second embodiment of the present invention. The moving subject reliability calculation unit 460 includes a ratio reverse degree calculation unit 461, a ratio prediction unit 462, a spectral reflectance change amount prediction unit 463, an ambient light spectral color-balance value holding unit 464, a flash light spectral color-balance value holding unit 465, and a minimum value selection unit 466.

The ambient light spectral color-balance value that is held in the ambient light spectral color-balance value holding unit 464 is a gain for each channel such that the signal intensity of an achromatic object body is of an achromatic color, that is, R:G:B=1:1:1, with respect to the spectral of the ambient light in the reference image. In an approximate manner, the white balance $WB_c$ for the reference image can be used. In general, as the value of the white balance, a gain at which some amount of color shade is left for the object body of the achromatic color by considering image reproduction. However, for the ambient light spectral color-balance value, a gain such that R:G:B is completely 1:1:1 is obtained is preferable. Here, in order to distinguish the two, the gain is particularly represented as $WB_{pc}$.

The flash light spectral color-balance value that is held in the flash light spectral color-balance value holding unit 465 is a gain for each channel such that the signal intensity of the object body of an achromatic color becomes an achromatic color with respect to the spectral of the flash light by the flash emitting unit 61. In an approximate manner, the white balance $WB_s$ for the processing target image can be used. In general, as the value of the white balance, a gain at which some amount of color shade is left for the object body of the achromatic color by considering image reproduction. However, for the flash light spectral color-balance value, a gain such that R:G:B is completely 1:1:1 is obtained is preferable. Here, in order to distinguish the two, the gain is particularly represented as $WB_{pf}$. Meanwhile, the color-balance values for spectral may be set by calculating them inside the image-capturing device, and may be set from the outside of the image-capturing device. The same also applies to ambient light.

Figure 21:
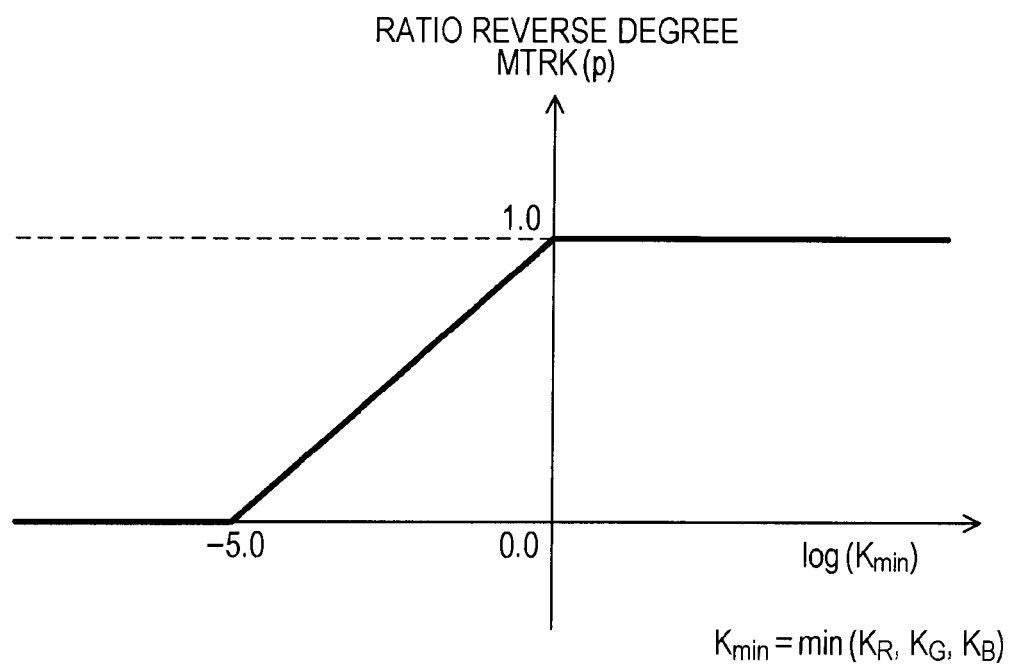
FIG. 21 illustrates an example of a ratio reverse degree in the second embodiment of the present invention.

The ratio reverse degree calculation unit 461 calculates a moving subject reliability from the viewpoint of the change direction of the pixel value. The ratio reverse degree calculation unit 461 determines that the pixel is a moving subject by detecting that the direction of the change of the pixel value is in reverse to the change direction of the illumination components of the entire image. In the example of flash emission/non-flash emission, if it is assumed that there is no change in the ambient light in the reference image and the processing target image that are continuously captured, in the image that is compensated for by the exposure compensation units 431 to 433, the ratio K after compensation will increase to more than "1" in the area in which a flash is emitted. Furthermore, the ratio K after compensation will become equal to "1" in the area in which a flash is not hit. Therefore, since it can be estimated that the signal intensity has decreased because the object body has moved in the area in which the ratio K after compensation becomes smaller than "1", a ratio reverse degree MTRK(p) can be determined using a function that is made to have characteristics shown in FIG. 21. That is, the ratio reverse degree MTRK(p) whose logK is negative and that has characteristics such that the greater the absolute value is, the more the value thereof approaches 0 is considered to be effective.

The ratio prediction unit 462 calculates the moving subject reliability from the viewpoint of the prediction value of the ratio K. The ratio prediction unit 462 predicts the value of the ratio K after compensation and measures the offset from the measured value, thereby determining that the pixel is a moving subject. The illumination components $E_s$ of the processing target image, which is a flash image, is represented by the addition of only $E''_c$ by the ambient light and $E''_{pf}$ by the flash light among the illumination components of the processing target image.

$$E_s(p) = E''_c(p) + E''_{pf}(p)$$

Therefore, the ratio Ko is represented by the following equation.

$$Ko(p) = \frac{I_s(p)}{I_c(p)} = \begin{bmatrix} \frac{R_s(p)}{R_c(p)} \\ \frac{G_s(p)}{G_c(p)} \\ \frac{B_s(p)}{B_c(p)} \end{bmatrix} = \begin{bmatrix} \frac{E_{sR}(p) \cdot \rho_R(p)}{E_{cR}(p) \cdot \rho_R(p)} \\ \frac{E_{sG}(p) \cdot \rho_G(p)}{E_{cG}(p) \cdot \rho_G(p)} \\ \frac{E_{sB}(p) \cdot \rho_B(p)}{E_{cB}(p) \cdot \rho_B(p)} \end{bmatrix}$$

[Math 13]

-continued $$= \begin{bmatrix} \dfrac{(E''_{cR}(p) + E''_{pfR}(p))}{E_{cR}(p)} \\ \dfrac{(E''_{cG}(p) + E''_{pfG}(p))}{E_{cG}(p)} \\ \dfrac{(E''_{cB}(p) + E''_{pfB}(p))}{E_{cB}(p)} \end{bmatrix}$$

Furthermore, the white-balance gain obtained from the spectral of the illumination is a gain that adjusts a color balance so that the channel intensity becomes R:G:B=1:1:1 in a target in which the spectral reflectance is of an achromatic color, that is, $\rho_R$:$\rho_G$:$\rho_B$=1:1:1. Therefore, the relationship of the following equation holds.

$$\begin{bmatrix} E_R \\ E_B \end{bmatrix} = E_G \cdot \begin{bmatrix} WB_R^{-1} \\ WB_B^{-1} \end{bmatrix} \quad \text{[Math 14]}$$

On the basis of the above two equations, the prediction values $eK_R$ and $eK_R$ of the ratios of the R and B channels can be represented as the following equation.

[Math 15]

$$\begin{bmatrix} eK_R \\ eK_B \end{bmatrix} = \begin{bmatrix} eKo_R \\ eKo_B \end{bmatrix} \cdot \exp CV \begin{bmatrix} \dfrac{(E''_{cG} \cdot WB_{pcR}^{-1} + E''_{pfG} \cdot WB_{pfR}^{-1})}{E_{cG} \cdot WB_{pcR}^{-1}} \\ \dfrac{(E''_{cG} \cdot WB_{pcB}^{-1} + E''_{pfG} \cdot WB_{pfB}^{-1})}{E_{cG} \cdot WB_{pcB}^{-1}} \end{bmatrix} \cdot \exp CV$$

$$= \begin{bmatrix} \dfrac{(E_{cG} \cdot WB_{pcR}^{-1} + E_{pfG} \cdot WB_{pfR}^{-1})}{E_{cG} \cdot WB_{pcR}^{-1}} \\ \dfrac{(E_{cG} \cdot WB_{pcB}^{-1} + E_{pfG} \cdot WB_{pfB}^{-1})}{E_{cG} \cdot WB_{pcB}^{-1}} \end{bmatrix}$$

$$= \begin{bmatrix} \dfrac{((WB_{pfR} - WB_{pcR}) + K_G \cdot WB_{pcR})}{WB_{pfR}} \\ \dfrac{((WB_{pfB} - WB_{pcB}) + K_G \cdot WB_{pcB})}{WB_{pfB}} \end{bmatrix}$$

Figure 22:
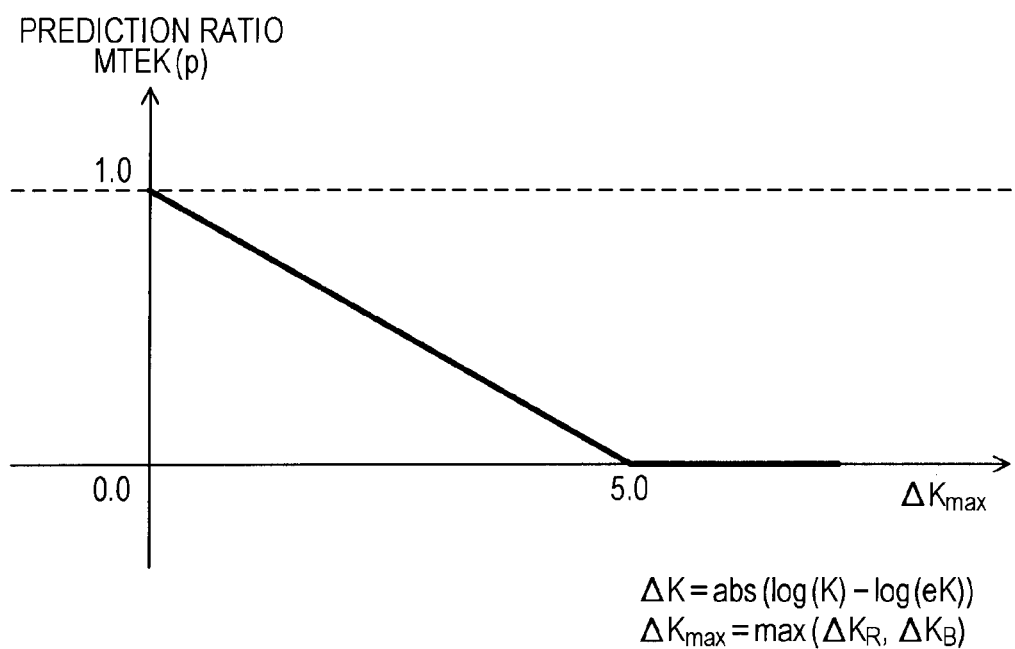
FIG. 22 illustrates an example of a prediction ratio in the second embodiment of the present invention.

Here, the fact that the prediction value eK differs greatly from the measured value K is considered to be attributable to the fact that the spectral reflectance $\rho$ is changed and was not divisible. As a result, it is determined that a pixel whose difference absolute value, $\Delta K = |K - eK|$, is large is a moving subject, and a prediction ratio MTEK(p) having characteristics as in FIG. 22 is set. That is, by considering that the greater the value of $\Delta K = |K - eK|$, the larger the influence due to the change in the spectral reflectance $\rho$, the weight during the smoothing process is decreased. Meanwhile, the prediction ratio in FIG. 22 means the reliability associated with the error between the predicted ratio and the actual value.

The spectral reflectance change amount prediction unit 463 calculates the moving subject reliability from the viewpoint of the prediction value of the spectral reflectance change amount. Similarly to the ratio prediction unit 462, the spectral reflectance change amount prediction unit 463 estimates the values of the intensity ratios K of the R and B channels on the basis of the value of the G channel. If the illumination intensity of the ambient light is changed to $E'_c$ between the reference image and the processing target image, the equation of the prediction values $eK_R$ and $eK_B$ of the ratio of the R and B channels can be rewritten as the following equation.

$$\begin{bmatrix} eK_R \\ eK_B \end{bmatrix} = \begin{bmatrix} \dfrac{(E'_{cG} \cdot WB_{pcR}^{-1} + E_{pfG} \cdot WB_{pfR}^{-1})}{E_{cG} \cdot WB_{pcR}^{-1}} \\ \dfrac{(E'_{cG} \cdot WB_{pcB}^{-1} + E_{pfG} \cdot WB_{pfB}^{-1})}{E_{cG} \cdot WB_{pcB}^{-1}} \end{bmatrix} \quad \text{[Math 16]}$$

$$= \begin{bmatrix} \dfrac{E'_{cG}}{E_{cG}} + \dfrac{E_{pfG}}{E_{cG}} \cdot \dfrac{WB_{pcR}}{WB_{pfR}} \\ \dfrac{E'_{cG}}{E_{cG}} + \dfrac{E_{pfG}}{E_{cG}} \cdot \dfrac{WB_{pcB}}{WB_{pfB}} \end{bmatrix}$$

Therefore, the ratio of R, G, and B can be approximated in accordance with the following equation.

$$\begin{bmatrix} K_R \\ K_G \\ K_B \end{bmatrix} \cong \begin{bmatrix} eK_R \\ eK_G \\ eK_B \end{bmatrix} = \begin{bmatrix} \dfrac{E'_{cg}}{E_{cG}} + \dfrac{E_{pfG}}{E_{cG}} \cdot \dfrac{WB_{pcR}}{WB_{pfR}} \\ \dfrac{E'_{cG}}{E_{cG}} + \dfrac{E_{pfG}}{E_{cG}} \\ \dfrac{E'_{cG}}{E_{cG}} + \dfrac{E_{pfG}}{E_{cG}} \cdot \dfrac{WB_{pcB}}{WB_{pfB}} \end{bmatrix} \quad \text{[Math 17]}$$

This equation means that the following three points exist in the same straight line.

$$\left( \dfrac{WB_{pcR}}{WB_{pfR}}, K_R \right), (1, K_G), \left( \dfrac{WB_{pcB}}{WB_{pfB}}, K_B \right) \quad \text{[Math 18]}$$

Figure 23:
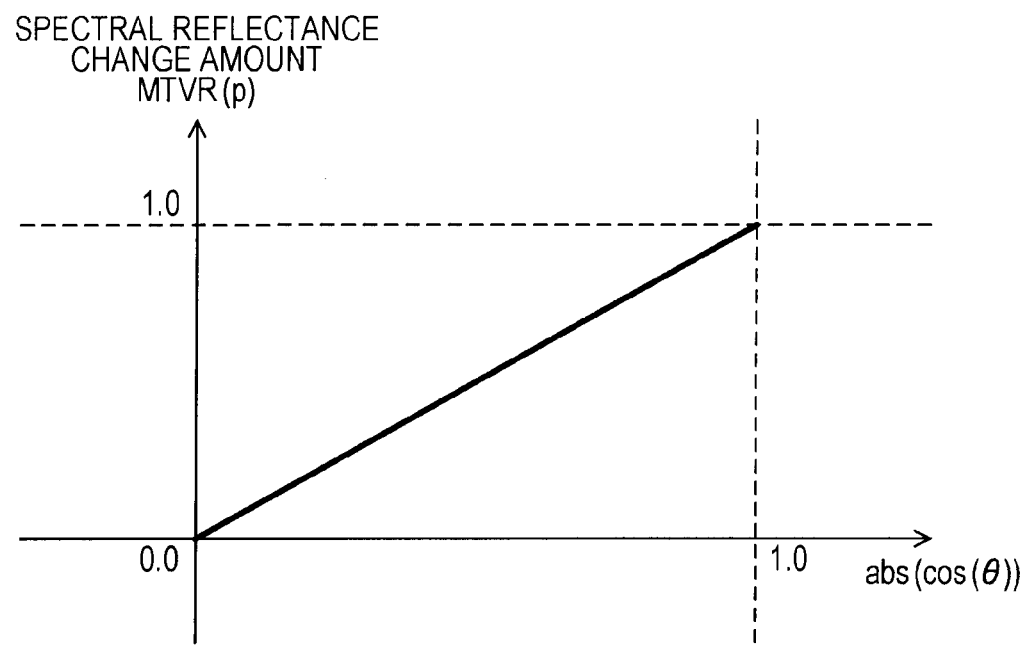
FIG. 23 illustrates an example of a spectral reflectance change amount in the second embodiment of the present invention.

If these three points do not exist in the same straight line, it is considered that $\rho$ could not be cancelled in the course of deducing the equation of the prediction values $eK_R$ and $eK_B$ of the above-mentioned ratio of the R and B channels. Consequently, the pixel can also be determined to be a moving subject. Whether or not the three points exist in a straight line can be determined on the basis of an angle $\theta$ formed by the three points or the like. Therefore, it is preferable that the spectral reflectance change amount MTVR(p) have such characteristics as in FIG. 23 as a function of $\theta$. That is, when the three points are lined up in a straight line, the weight in spatial smoothing approaches "1", and the angle $\theta$ becomes "0" when it is 90°. Meanwhile, the spectral reflectance change amount in FIG. 23 means the reliability associated with the change of the spectral reflectance.

The minimum value selection unit 466 selects the minimum value from among the values that are obtained in the ratio reverse degree calculation unit 461, the ratio prediction unit 462, and the spectral reflectance change amount prediction unit 463, and outputs the minimum value as the final moving subject reliability MT(p). Meanwhile, in the embodiment of the present invention, all of the ratio reverse degree calculation unit 461, the ratio prediction unit 462, and the spectral reflectance change amount prediction unit 463 are used. However, only some of them may be used singly or in combination.

[Example of Operation]

Figure 24:
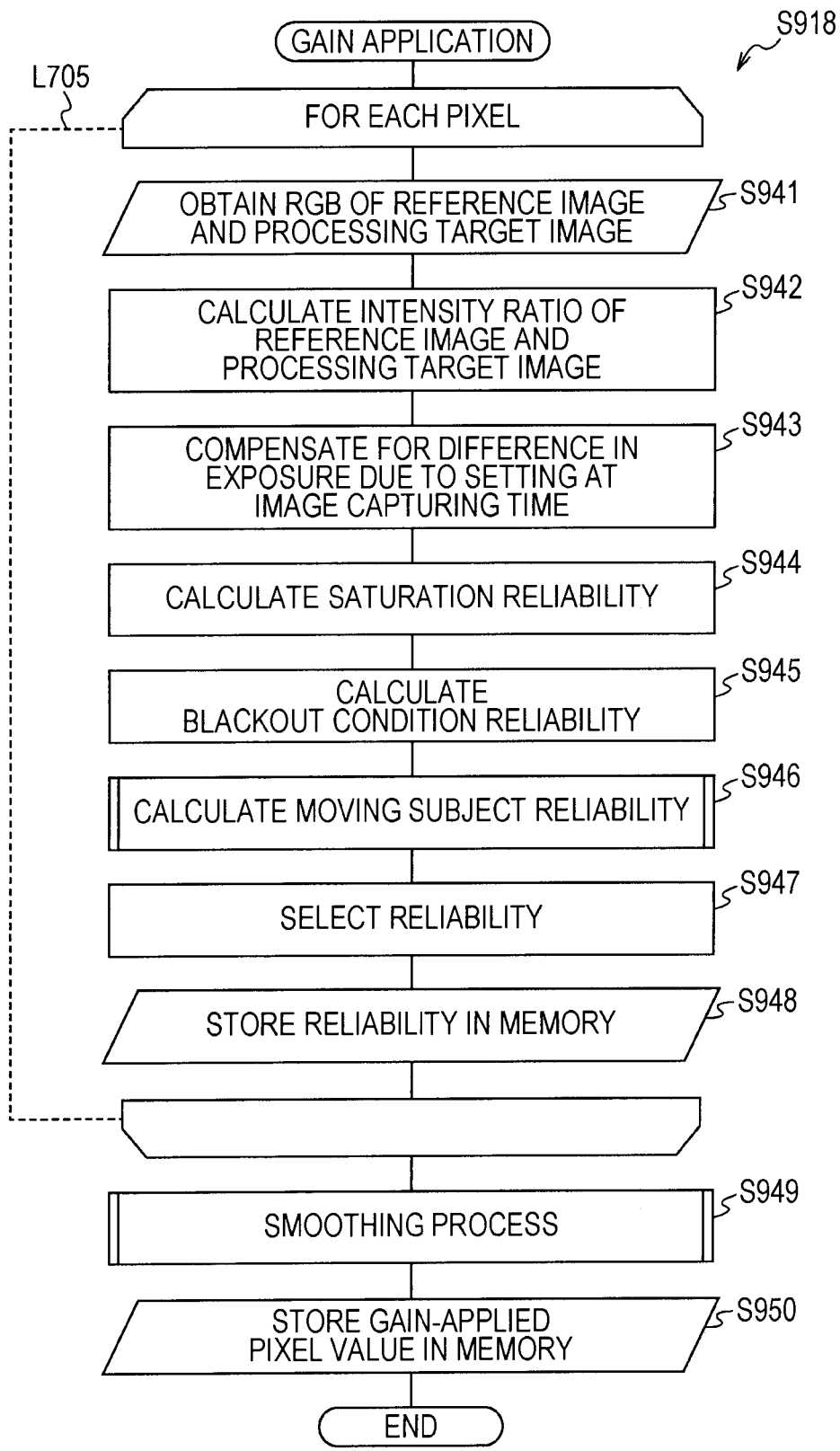
FIG. 24 illustrates an example of the operation of the channel gain application unit 260 in the second embodiment of the present invention.

FIG. 24 illustrates an example of the operation of the channel gain application unit 260 in the second embodiment of the present invention. Here, the following processing is repeated by using each pixel as a target (loop L705).

In the loop L705, the RGB values (Rc(p), Gc(p) and Bc(p), and Rs(p), Gs(p) and Bs(p)) of the reference image and the processing target image are obtained (step S941). In the division units 421 to 423, the ratio Ko(p) of the RGB values of the reference image and the processing target image is calculated (step S942). Furthermore, in the exposure compensation units 431 to 433, an exposure compensation process in accordance with the setting at the time of image capturing is performed (step S943). As a result, in the still subject in which there is no change in the illumination environment, the ratio becomes "1".

Next, in the saturation reliability calculation unit 440, a saturation reliability ST(p) is calculated (step S944). In the blackout condition reliability calculation unit 450, a blackout condition reliability BT(p) is calculated (step S945). Furthermore, in the moving subject reliability calculation unit 460, the moving subject reliability MT(p) is calculated (step S946). Then, the reliability selection unit 470 selects the lowest reliability among the saturation reliability ST(p), the blackout condition reliability BT(p), and the moving subject reliability MT(p) (step S947). The reliability that is obtained in this manner is stored in a memory (not shown) (step S948). When the processing in all the pixels is completed, control exits from the loop L705. In the second embodiment of the present invention, by inserting the processing of steps S942 to S948 immediately after control exits from the loop L703 in FIG. 13, the loop L702 in FIG. 13 and the loop L705 in FIG. 24 can be formed as a common loop process. Since the value of each pixel has already been read in step S923, step S941 can be omitted.

Next, in the smoothing processing unit 480, a smoothing process is performed for each pixel (step S949). The pixel value to which the gain is applied in this manner is held in the illumination component converted mosaic image holding unit 290 (step S950). Furthermore, the process of step S950 referred to herein is step S919 in FIG. 12, and by storing the processing result in one of them, the other processes can be omitted. Upon completion of the processing in all the pixels, the channel gain application process for one frame is completed.

Figure 25:
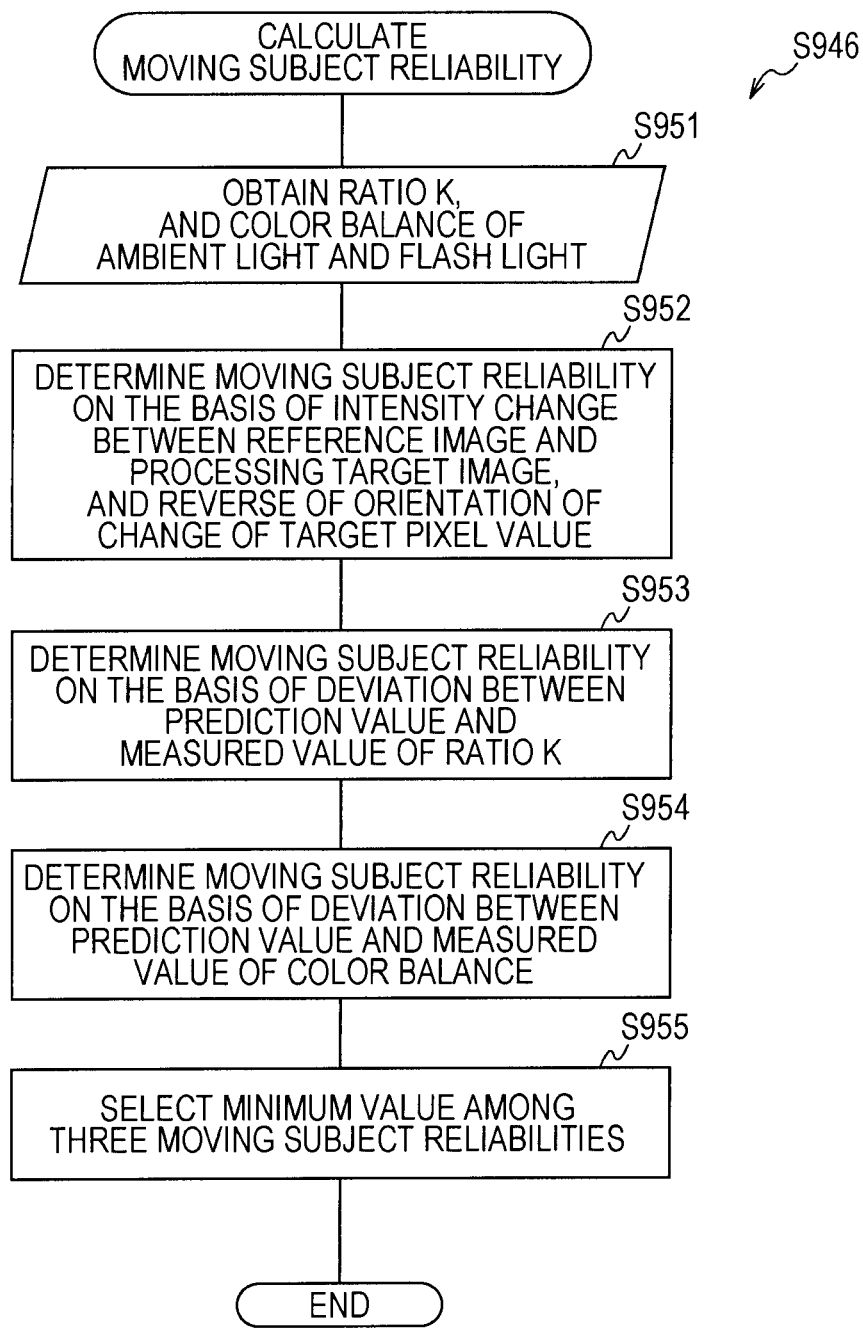
FIG. 25 illustrates an example of the operation of a moving subject reliability calculation unit 460 in the embodiment of the present invention.

FIG. 25 illustrates an example of the operation of the moving subject reliability calculation unit 460 in the embodiment of the present invention. Here, the following processing is performed by using each pixel as a target.

First, the ratio K is obtained from the exposure compensation units 431 to 433 (step S951). Furthermore, the color balance of the ambient light in the reference image is obtained from the ambient light spectral color-balance value holding unit 464, and the color balance of the flash light is obtained from the flash light spectral color-balance value holding unit 465 (step S951).

Then, in the ratio reverse degree calculation unit 461, a determination is made as to the reverse of the direction of the change of the entire image intensity and the orientation of the intensity of the pixel, and the ratio reverse degree is calculated in accordance with the degree thereof (step S952). Furthermore, in the ratio prediction unit 462, a determination is made as to whether or not the pixel is a moving subject according to the degree of the divergence between the measured value of the ratio K and the estimated value thereof, and the prediction ratio is determined (step S953). During the ratio prediction, since it is assumed that the spectral reflectance p is cancelled by the denominator/numerator, the divergence from the prediction indicates that the change of the spectral reflectance has been detected, and the pixel is determined to be a moving subject. Furthermore, in the spectral reflectance change amount prediction unit 463, the spectral reflectance change amount is predicted on the basis of the offset between the prediction value of the color balance and the measured value (step S954). Then, in the minimum value selection unit 466, the minimum value is selected from among the values obtained in the ratio reverse degree calculation unit 461, the ratio prediction unit 462, and the spectral reflectance change amount prediction unit 463 (step S955). This selected value is output as the final moving subject reliability MT(p).

As described above, according to the second embodiment of the present invention, a determination is made as to the reliability for each pixel from the viewpoint of the blackout condition, saturation, or the moving subject, and the weight of the pixel having a low reliability is decreased during the smoothing, making it possible to use the information on the neighboring pixels and to perform robust gain application.

In the second embodiment, an example in which simple weighted smoothing is performed during the smoothing process has been described. Alternatively, edge preservation type smoothing can be applied. Edge preservation smoothing is a nonlinear filter process in which the gradation is smoothed while leaving a conspicuous step difference, such as an object body boundary in the image. Since fine variation is removed while storing the object body contour that affects the ease of viewing, the edge preservation smoothing has long been used for a noise reduction process. The edge preservation smoothing process is also used for a gradation correction process in which a luminance difference other than detail components typified by texture is compressed by using property that can separate between fine luminance variation of texture inside an object body and a conspicuous luminance step difference of an object body contour.

In recent years, a technology called a bilateral filter has often been used among such edge preservation smoothing processes. In general, a bilateral filter BLF(p) for the luminance I(p) of an image adds pixel values I(p) in the surroundings of a center pixel position pc, which are weighted by two functions, that is, a weight function $\omega(p-p_c)$ in the space direction and a weight function $\phi(I(p)-I(p_c))$ in the luminance value direction, as the following equation.

$$BLF(p_c) = \frac{\sum_{p \in Q} \omega(p - p_c) \cdot \phi(I(p) - I(p_c)) \cdot I(p)}{\sum_{p \in Q} \omega(p - p_c) \cdot \phi(I(p) - I(p_c))} \quad \text{[Math 19]}$$

In the above equation, the denominator on the right side indicates the normalized coefficient of the weight value.

As shown in the above equation, in the bilateral filter, weighting for each pixel in a local area changes depending on the luminance value of the center pixel. For this reason, since the weight value needs to be re-calculated for each pixel, there is a problem in that the number of computations is considerably increased to more than that of an ordinary linear FIR filter. Furthermore, as an application technology of the bilateral filter, a technology called a joint bilateral filter or a cross bilateral filter has been proposed. In the bilateral filter, weighting for each pixel in a local area is changed depending on the luminance value of the center pixel that is a filter processing target. In contrast, in the joint bilateral filter, a characteristic value used for a weight calculation differs from a characteristic value of a filter processing target. The equation by the joint bilateral filter JBLF(p) is given in the following equation.

$$JBLF(p_c) = \frac{\sum_{p \in Q} \omega(p - p_c) \cdot \phi(I(p) - I(p_c)) \cdot S(p)}{\sum_{p \in Q} \omega(p - p_c) \cdot \phi(I(p) - I(p_c))} \quad \text{[Math 20]}$$

The above equation represents a computation in which pixel values S(p) in the surroundings of the center pixel position pc, which are weighted by two functions, that is, the weight function ω(p−pc) in the space direction and the weight function φ(I(p)−I(pc)) in the luminance value direction. For example, when there is a signal I having a high correlation with a signal with very poor S/N characteristics and having a high S/N ratio, by performing weighting corresponding to an I signal, an edge preservation type filter process having a satisfactory S/N ratio is made possible.

Furthermore, in the joint bilateral filter, similarly to the bilateral filter, weighting for each pixel in a local area changes in such a manner as to be dependent on the luminance value of the center pixel. For this reason, since the weight value needs to be re-calculated for each pixel, there is a problem in that the number of computations is considerably greater than that of an ordinary linear FIR filter.

Therefore, in the following third embodiment, a technique of decreasing the number of computations of edge preservation type smoothing by using a block histogram is proposed.

Third Embodiment

In the third embodiment of the present invention, a pixel frequent value and a certain defined characteristic value are calculated in each of blocks that are divided into plural portions in the spatial axis and in the luminance axis, and thereafter, a characteristic value for each block is weight-added on the basis of the weight that is defined by the distance between each pixel position and each block. For the characteristic value, an integration value (grand total) of gains of pixels contained in the inside for each block, the central value of the gains of the pixels contained in the inside, the central value being multiplied by the number of pixels contained in the inside, or the like can be used. This computation is represented as the following equation.

$$\tilde{S}(p_c) = \frac{\sum_{i,j,\lambda} \omega(i, j, p_c) \cdot \phi(\lambda, I(p_c)) \cdot S(i, j, \lambda)}{\sum_{i,j,\lambda} \omega(i, j, p_c) \cdot \phi(\lambda, I(p_c)) \cdot H(i, j, \lambda)} \quad \text{[Math 21]}$$

Here, i, j are indexes of a block in the spatial axis direction. Furthermore, λ is the central value of the luminance range corresponding to a block. I(pc) is the value of the luminance at the coordinate position pc. S(i, j, λ), is the integration value of the gain of a block(i, j, λ). H(i, j, λ) is the value of the block histogram. The above equation corresponds to that in which the weight function ω in the spatial axis of the joint bilateral filter and the weight function φ in the luminance axis are discretized in a stepwise manner along the division of the block, thereby exhibiting the effect of edge preservation smoothing. In addition, even if the cost of calculating the block histogram and the block integration value is subtracted, the number of computations of the weighted product sum for each block can be considerably decreased to less than that of the weighted product sum for each pixel. The larger the operator size of edge preservation smoothing, the larger this effect is.

In addition, in the third embodiment of the present invention, an edge preservation type smoothing process in which, in addition to the weight, a weight τ(p) determined for each pixel position is introduced, is proposed. The block histogram and the weighted integration of characteristic values inside a block are represented in the following manner.

$$ISW(i, j, \lambda) = \sum_{p \in \Pi} \tau(p) \cdot S(p) \quad \text{[Math 22]}$$

$$IFT(i, j, \lambda) = \sum_{p \in \Pi} \tau(p) \cdot 1 \quad \text{[Math 23]}$$

Here, ISW(i, j, λ) is the weighted gain integration value inside a block (i, j, λ), and IFT(i, j, λ) is the weighted frequent value inside the block (i, j, λ), that is, the integration value of the weight itself. When this is applied to the previous equation, the following equation is obtained.

$$\hat{S}(p_c) = \frac{\sum_{i,j,\lambda} \omega(i, j, p_c) \cdot \phi(\lambda, I(p_c)) \cdot ISW(i, j, \lambda)}{\sum_{i,j,\lambda} \omega(i, j, p_c) \cdot \phi(\lambda, I(p_c)) \cdot IFT(i, j, \lambda)} \quad \text{[Math 24]}$$

This computation corresponds to that in which the weight function ω in the spatial axis of the weighted joint bilateral filter and the weight function φ in the luminance axis, which are represented by the following equation, are discretized in a stepwise manner along the division of the block.

$$WJBLF(p_c) = \frac{\sum_{p \in Q} \omega(p - p_c) \cdot \phi(I(p) - I(p_c)) \cdot \tau(p) \cdot S(p)}{\sum_{p \in Q} \omega(p - p_c) \cdot \phi(I(p) - I(p_c)) \cdot \tau(p)} \quad \text{[Math 25]}$$

Therefore, there is an effect of edge preservation smoothing. In addition, even if the cost of calculating the block integration value is subtracted, the number of computations of the weighted product sum for each block can be considerably decreased to less than that of the weighted product sum for each pixel. The larger the operator size of edge preservation smoothing, the larger this effect is.

In addition, in the third embodiment of the present invention, a technique of decreasing the number of computations is provided. That is, a computation of convoluting a weight function in the luminance axis direction is performed on the block histogram and the gain integration value for each block in advance, and the result thereof is held. In this case, the convolution computation on the block histogram is given in the following equation.

$$H_{convolved}(i, j, v) = \sum_{\lambda} H(i, j, \lambda) \cdot \phi(\lambda, v) \quad \text{[Math 26]}$$

Furthermore, the convolution computation on the block integration value is given in the following equation.

$$S_{convolved}(i, j, v) = \sum_{\lambda} S(i, j, \lambda) \cdot \phi(\lambda, v) \quad \text{[Math 27]}$$

In the weighted product-sum computation for each pixel, the block histogram in which the luminance weight function has already been convoluted and the result in which the weighted gain integration value is interpolated in the space direction needs only to be divided by each other. This computation is given in the following equation.

$$\tilde{S}(p) = \frac{\sum_{i,j} \omega(i, j, p) \cdot S_{convolved}(i, j, I(p))}{\sum_{i,j} \omega(i, j, p) \cdot H_{convolved}(i, j, I(p))} \quad \text{[Math 28]}$$

This effect increases with a small number of divisions of blocks when compared to the original image size, that is, when a smoothing process is performed by considering a wide range in the image.

In addition, in the third embodiment of the present invention, the above-mentioned block histogram, the gain integration value for each block, or those convoluted by a luminance axis weight function, are stored in a memory. As a result, a technique used for an edge preservation smoothing process in a frame that is input next is provided. That is, in a case where the input is moving image data, large edge preservation smoothing can be performed with a small working memory without scanning all the pixels twice.

In addition, in the third embodiment of the present invention, a process for reducing the input image is performed before a process for calculating the above-mentioned block histogram, the above-mentioned gain integration value for each block, or those that are convoluted by a luminance axis weight function, is performed. As a result, the number of computations and the amount of memory for calculating the block histogram, the gain integration value for each block, or those that are convoluted by a luminance axis weight function are reduced.

Meanwhile, in the third embodiment, the configuration of the image-capturing device, the image processing circuit 23, and the illumination component conversion processing unit 120 that are assumed is the same as that of the second embodiment and thus, the description thereof is omitted.

[Example of Processing Functions of Smoothing Processing Unit 480]

Figure 26:
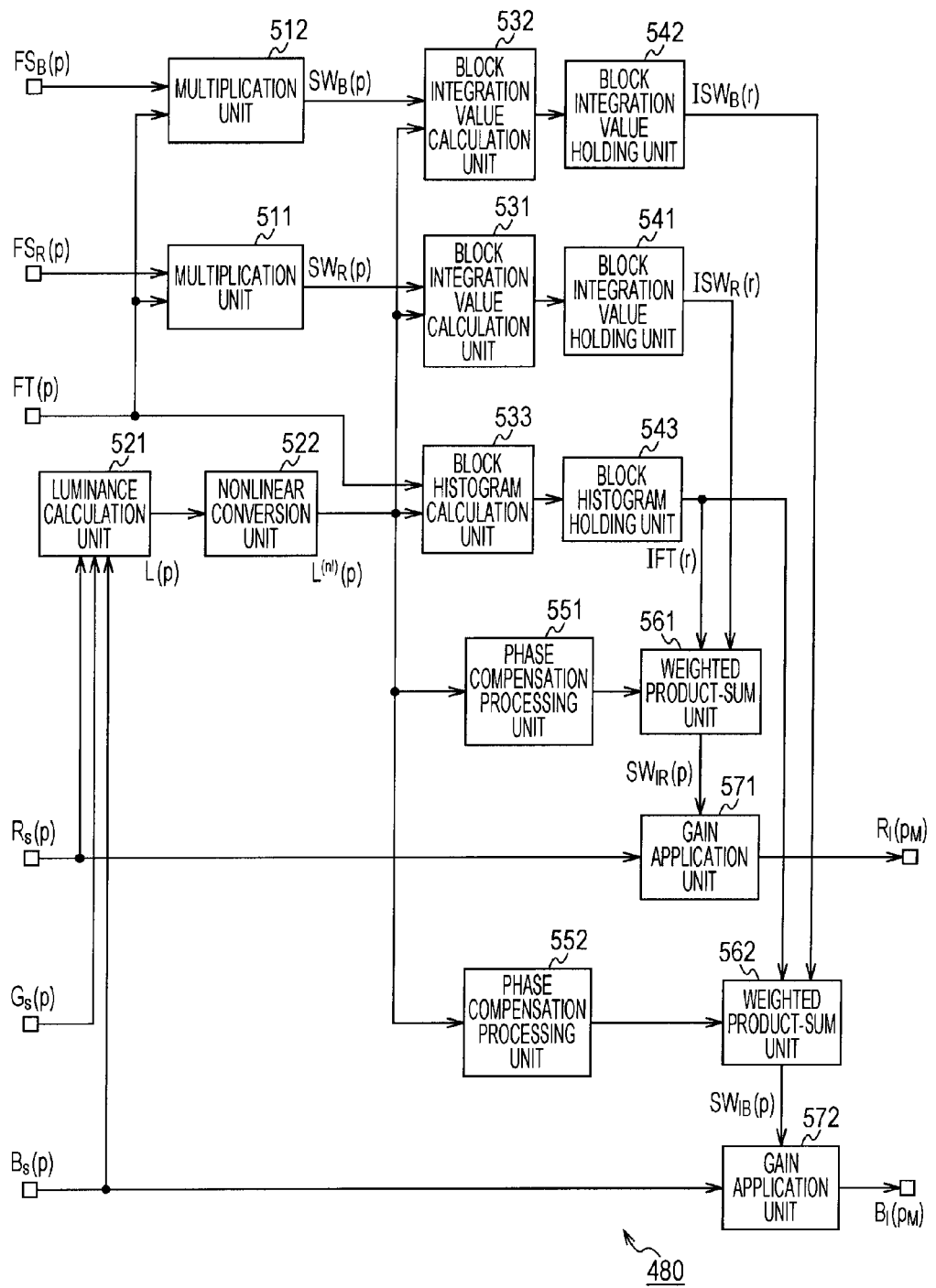
FIG. 26 illustrates an example of processing functions of a smoothing processing unit 480 in a third embodiment of the present invention.

FIG. 26 illustrates an example of the processing functions of a smoothing processing unit 480 in the third embodiment of the present invention. The example of processing functions of the smoothing processing unit 480 includes multiplication units 511 and 512, a luminance calculation unit 521, and a nonlinear conversion unit 522. Furthermore, the example of the second processing functions of the smoothing processing unit 480 includes block integration value calculation units 531 and 532, a block histogram calculation unit 533, block integration value holding units 541 and 542, and a block histogram holding unit 543. Furthermore, the example of the second processing functions of the smoothing processing unit 480 further includes phase compensation processing units 551 and 552, weighted product-sum units 561 and 562, and gain application units 571 and 572.

The luminance calculation unit 521 calculates a luminance value L(p) from the RGB values of the processing target image. The luminance calculation unit 521 may, for example, calculate the luminance value by computing the linear sum of the RGB values using a preset coefficient (weight) with respect to the RGB values. Furthermore, this luminance calculation unit 521 may generate the luminance value by such a process for obtaining the maximum value from among the RGB values.

The nonlinear conversion unit 522 outputs a nonlinear conversion luminance value $L^{(nl)}(p)$ by performing nonlinear conversion on the luminance value calculated by the luminance calculation unit 521. It is effective for the nonlinear conversion unit 522 to apply, for example, "monotonously increasing characteristics in the form of an upwardly convex", such as a γ curve, exponentiation characteristic using an exponentiation smaller than 1, or logarithm conversion.

The multiplication units 511 and 512 generate a weighted gain SW(p) for each channel by multiplying the gain FS(p) for each channel by the reliability FT(p) of the target pixel.

The block integration value calculation units 531 and 532 divide the image into a plurality of blocks in the spatial axis direction and in the luminance axis direction, and calculate the integration value of the characteristic values belonging to each block. The characteristic values referred to herein are weighted gains $SW_R(p)$ and $SW_R(p)$ of the R and B channels, which are weighted in accordance with the reliability FT(p). The integration values calculated by the block integration value calculation units 531 and 532 are stored in the block integration value holding unit 541 or 542. That is, the block integration value holding unit 541 holds the weighted gain $ISW_R(r)$ of the R channel. The block integration value holding unit 542 holds the weighted gain $ISW_B(r)$ of the B channel.

The block histogram calculation unit 533 integrates the reliability FT(p) belonging to each of the divided blocks, and calculates the frequent value of the pixels as a block histogram. The block histogram IFT(r) calculated by the block histogram calculation unit 533 is stored in the block histogram holding unit 543. In the following, the information held in the block integration value holding units 541 and 542 and the block histogram holding unit 543 will also be referred to as intermediate data.

The phase compensation processing units 551 and 552 calculate a luminance value corresponding to the position in the mosaic image of the processing target image corresponding to each channel of the target pixel. In simplified demosaicing, the luminance value is obtained at a position 601 for each Bayer set 602. The processes by the phase compensation processing units 551 and 552 can be realized by a linear interpolation process on the basis of neighboring four luminance values for each pixel position in the mosaic image. In a case where demosaicing is performed for each pixel rather than simplified demosaicing, the luminance is obtained for each pixel of the mosaic image of the processing target image by the luminance calculation unit 521 and the nonlinear conversion unit 522. Thus, this phase compensation process can be omitted.

The weighted product-sum units 561 and 562 calculate a global gain value at the target pixel position on the basis of the block histogram, the block integration value, and the luminance value at the target pixel position. The global gain value is information corresponding to the average gain of the object body area to which the target pixel position belongs. The weighted product-sum unit 561 supplies a global gain value $SW_{IR}(p)$ to the gain application unit 571, and the weighted product-sum unit 562 supplies a global gain value $SW_{IB}(p)$ to the gain application unit 572.

The gain application units 571 and 572 apply the gain calculated by the weighted product-sum units 561 and 562 to each channel value. In general, the processing in the gain application units 571 and 572 can be realized by multiplication. That is, the gain application units 571 and 572 perform such computations as the following equations, respectively.

$$R_I(p) = R_s(p) \times SW_{IR}(p) B_I(p) = B_s(p) \times SW_{IB}(p)$$

Meanwhile, the weighted product-sum units 561 and 562 and the gain application units 571 and 572 are examples of a smoothing processing unit described in the Claims.

[Example of Configuration of Block Integration Value Calculation Units 531 and 532 and Block Histogram Calculation Unit 533]

Figure 27:
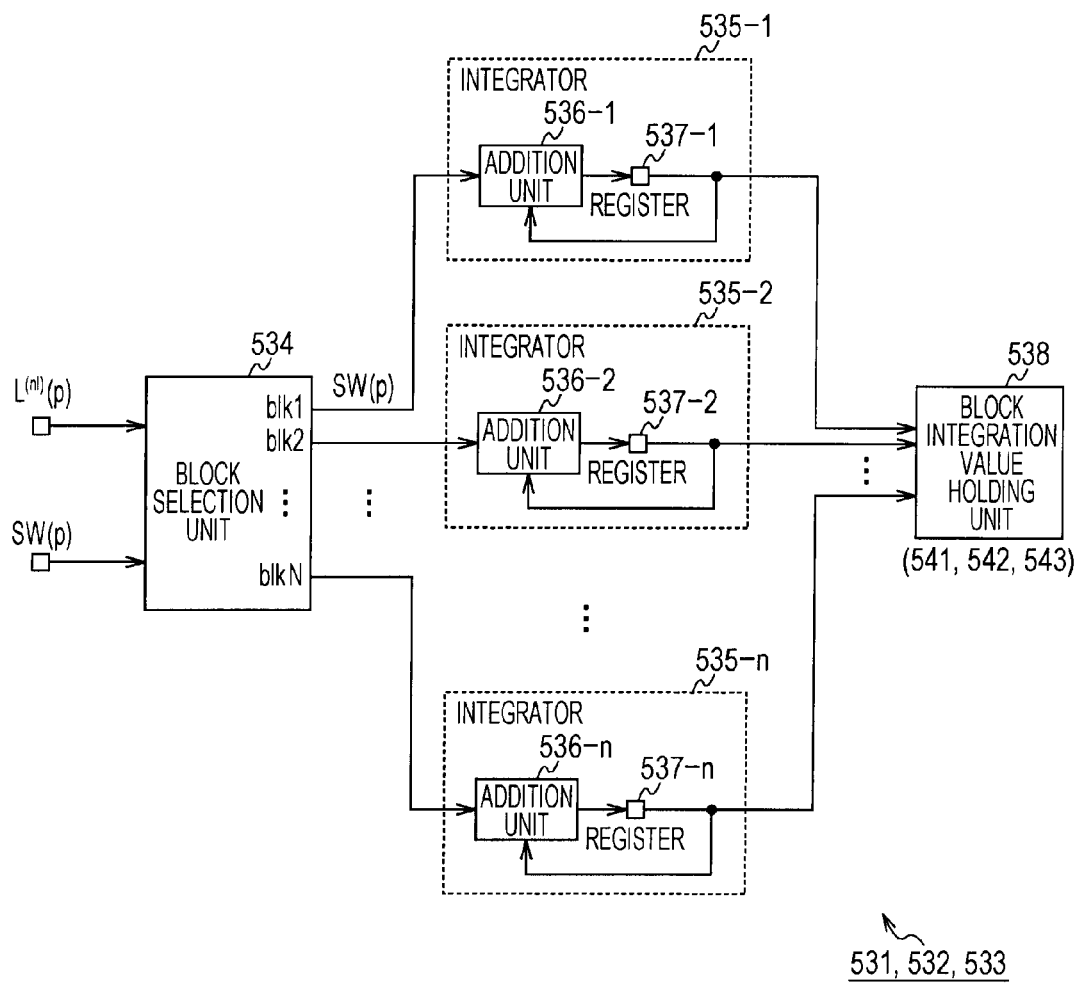
FIG. 27 illustrates an example of the configuration of block integration value calculation units 531 and 532 and a block histogram calculation unit 533 in the third embodiment of the present invention.

FIG. 27 illustrates an example of the configuration of block integration value calculation units 531 and 532 and a block histogram calculation unit 533 in the third embodiment of the present invention. Each of the block integration value calculation units 531 and 532 and the block histogram calculation unit 533 includes a block selection unit 534 and n integrators 535-1 to 535-n. Here, when the number of block divisions of the image in the width direction is denoted as W, the number of block divisions of the image in the height direction as H, and the number of block divisions of the image in the luminance direction as D, the number n of blocks is W×H×D.

The block selection unit 534 classifies the weighted feature quantity of each pixel, which is input, into one of N blocks in accordance with the pixel position and the luminance value. The weighted feature quantity referred to herein is the gains $SW_R(p)$ and $SW_B(p)$ for the R and B channels, which are weighted in accordance with the reliability $FT(p)$, or the reliability $FT(p)$.

The integrators 535-1 to 535-n add the classified weighted feature quantity. Each of the integrators 535-1 to 535-n holds the addition unit 536 and the register 537. The addition unit 536 adds the classified weighted feature quantity and the value held in the register 537. The register 537 holds the output of the addition unit 536. After the pixels for one frame have been processed, the values of the integrators 535-1 to n of all the blocks are stored in the block integration value holding unit 538. Here, the block integration value holding unit 538 corresponds to the block integration value holding units 541 and 542 or the block histogram holding unit 543.

[Example of Configuration of Weighted Product-Sum Units 561 and 562]

Figure 28:
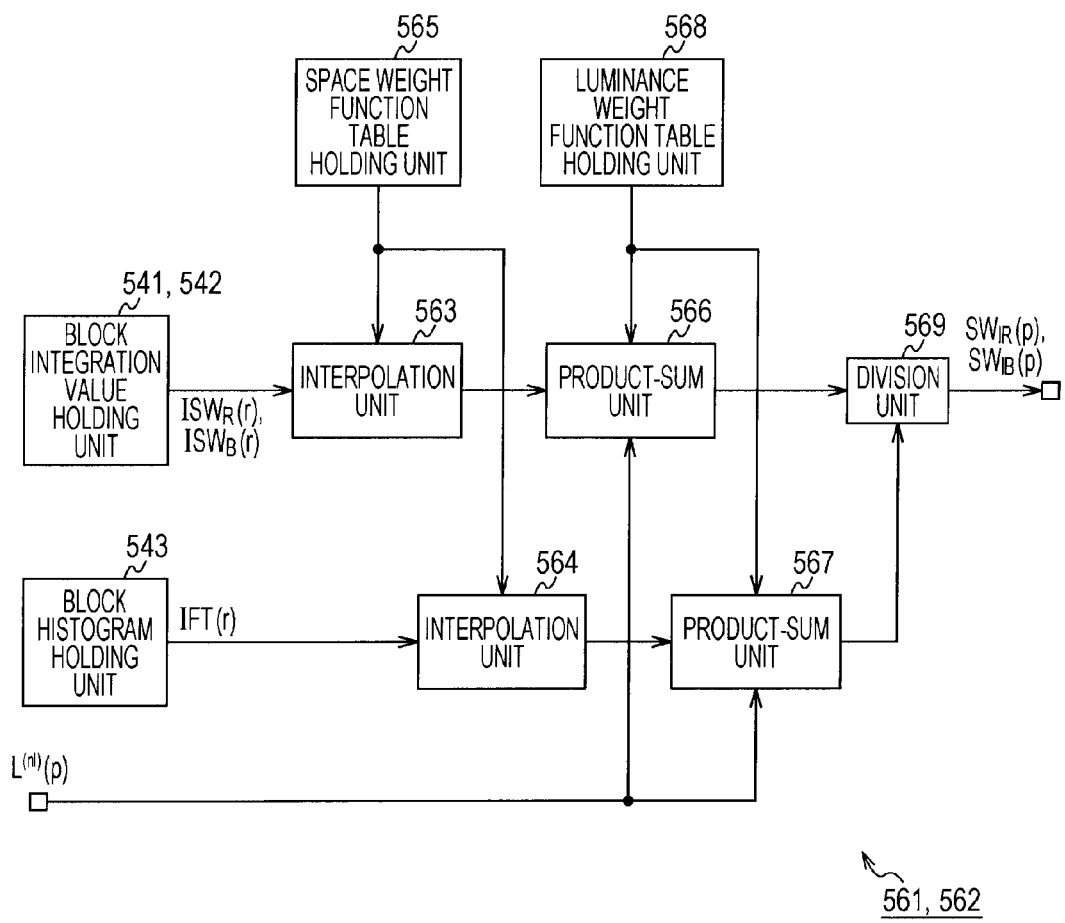
FIG. 28 illustrates an example of the configuration of weighted product-sum units 561 and 562 in the third embodiment of the present invention.

FIG. 28 illustrates an example of the configuration of weighted product-sum units 561 and 562 in the third embodiment of the present invention. Each of the weighted product-sum units 561 and 562 includes interpolation units 563 and 564, a space weight function table holding unit 565, product-sum units 566 and 567, a luminance weight function table holding unit 568, and a division unit 569.

The interpolation units 563 and 564 interpolate the weighted feature quantity corresponding to the pixel position of the luminance value. That is, the interpolation unit 563 interpolates the block integration value $ISW_R(r)$ or $ISW_B(r)$ of the weighted gain $SW_R(r)$ or $SW_B(r)$ of the neighboring 4×4 block area in the space direction of the target pixel position. The interpolation unit 564 interpolates the block integration value $IFT(r)$ of the reliability $FT(p)$ itself of the neighboring 4×4 block area in the space direction at the target pixel position. For the interpolation coefficient in that case, for example, a cubic B-spline function or the like is appropriate. This B-Spline function value can be held as a space weight function table in the space weight function table holding unit 565, so that a necessary coefficient is extracted on the basis of the relative position relationship between the neighboring block position and the target pixel position. The computations performed by the interpolation units 563 and 564 are as the following equations.

$$SW_{interpolatedR}(\lambda) = \sum_{i,j} B_{i,j} \cdot ISW_R(i, j, \lambda)$$ [Math 29]

$$SW_{interpolatedB}(\lambda) = \sum_{i,j} B_{i,j} \cdot ISW_B(i, j, \lambda)$$

$$FT_{interpolated}(\lambda) = \sum_{i,j} B_{i,j} \cdot IFT(i, j, \lambda)$$ [Math 30]

Here, i, j are indexes indicating neighboring 4×4 blocks. $\lambda$ is the central value of the luminance level corresponding to each block of the histogram. $B_{i,j}$ is B-Spline interpolation coefficient for a block corresponding to the indexes i and j. $ISW_R$ (i, j, $\lambda$), and $ISW_B$(i, j, $\lambda$) are the block integration values of the weighted gain $SW_R(p)$ or $SW_B(P)$ of the block corresponding to (i, j, $\lambda$). $IFT(i, j, \lambda)$ is the integration value (block histogram) for the reliability $FT(p)$ itself of the block corresponding to (i, j, $\lambda$). Meanwhile, the interpolation unit 563 is an example of the first interpolation unit described in the Claims. Furthermore, the interpolation unit 564 is an example of the second interpolation unit described in the Claims.

Figure 29:
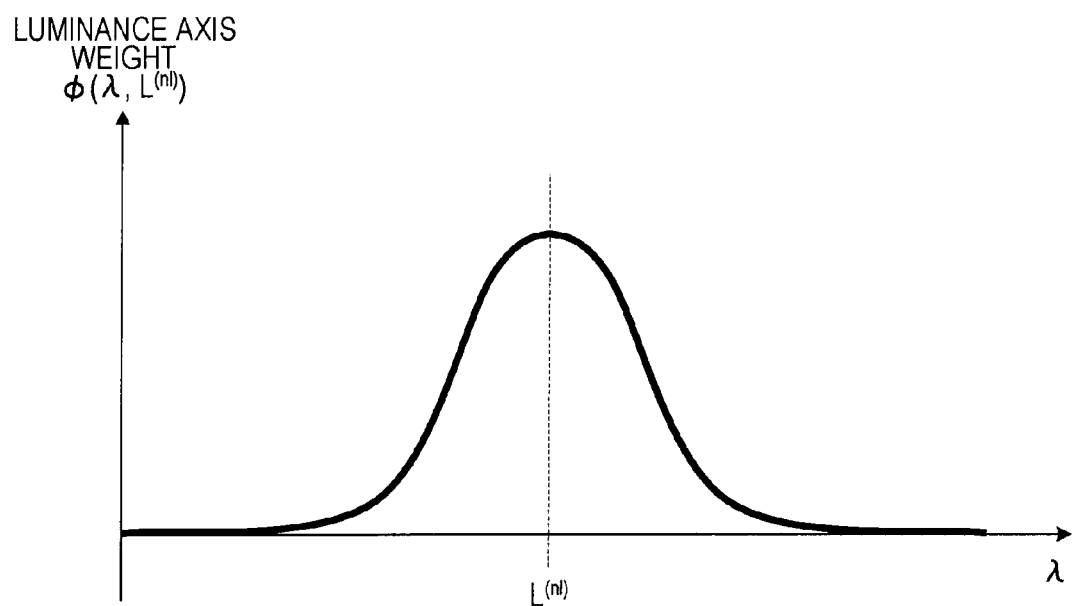
FIG. 29 illustrates an example of the shape of a luminance weight function in the third embodiment of the present invention.

The product-sum units 566 and 567 calculate the result in which the luminance weighted value is summed with respect to the weighted integration value corresponding to the target pixel position. The luminance weighted value is calculated by using the table stored in the luminance weight function table holding unit 568. FIG. 29 illustrates an example of the shape of a luminance weight function stored in the luminance weight function table holding unit 568. Regarding the luminance weight function, a function in a unimodal shape that has a larger value with a decrease in the difference value between the input luminance value $L^{(nl)}(p)$ at the target pixel position and the luminance level $\lambda$ corresponding to each block of the integration value interpolated at the target pixel position is appropriate. For example, a function such as that shown in the following equation can be used.

$$\phi(\lambda, L^{(nl)}(p)) = \exp\left(-\frac{(\lambda - L^{(nl)}(p))^2}{2 \cdot \sigma_{th}^2}\right)$$ [Math 31]

Here, σ_th is the constant value that determines the size of the spread of the range of the function. As a result of using such a luminance weight function, it is possible to assign a large weight value to a block having a value close to the input luminance value $L^{(nl)}(p)$ and possible to assign a small weight value to a block having a value away therefrom. The product-sum units 566 and 567 calculate a weight value for each block on the basis of the luminance weight function and the input luminance value, and thereafter perform, in accordance with each weight, the weighted summation of the weight itself interpolated at the target pixel position and the values of all the blocks of the weighted gain integration value. Division unit 569 divides the weighted gain value calculated by the product-sum unit 566 by the reliability calculated by the product-sum unit 567, and outputs the result thereof as a global gain value at the target pixel position. The computations performed by the product-sum units 566 and 567 and the division unit 569 are as the following equation.

$$SW_l(p) = \frac{\sum_\lambda SW_{interpolated}(\lambda) \cdot \phi(\lambda, L^{(nl)}(p))}{\sum_\lambda FT_{interpolated}(\lambda) \cdot \phi(\lambda, L^{(nl)}(p))}$$ [Math 32]

Meanwhile, the product-sum unit 566 is an example of the first product-sum unit described in the Claims. Furthermore, the product-sum unit 567 is an example of the second product-sum unit described in the Claims. Furthermore, the division unit 569 is an example of the second division unit described in the Claims.

In the block integration value, the weighted gain of the pixel having a close value for each block area and the reliability itself are integrated for each block. Therefore, by performing summation in which a weight is placed on the block of the luminance level close to the luminance value at the target pixel position in the manner described above, the integration result of the pixels of the luminance values that are particularly close within the neighboring 4×4 block area is obtained. Therefore, the influence of the pixel value applied to another subject of a different brightness is small even if a wide range of area like a neighboring 4×4 block area is small, and it is possible to calculate the average gain value of the subject to which the target pixels belong.

Meanwhile, the interpolation unit 564 is an example of the first interpolation unit described in the Claims. Furthermore, the interpolation unit 563 is an example of the second interpolation unit described in the Claims. Furthermore, the product-sum unit 567 is an example of the first product-sum unit described in the Claims. Furthermore, the product-sum unit 566 is an example of the second product-sum unit described in the Claims.

[Example of Operation]

Figure 30:
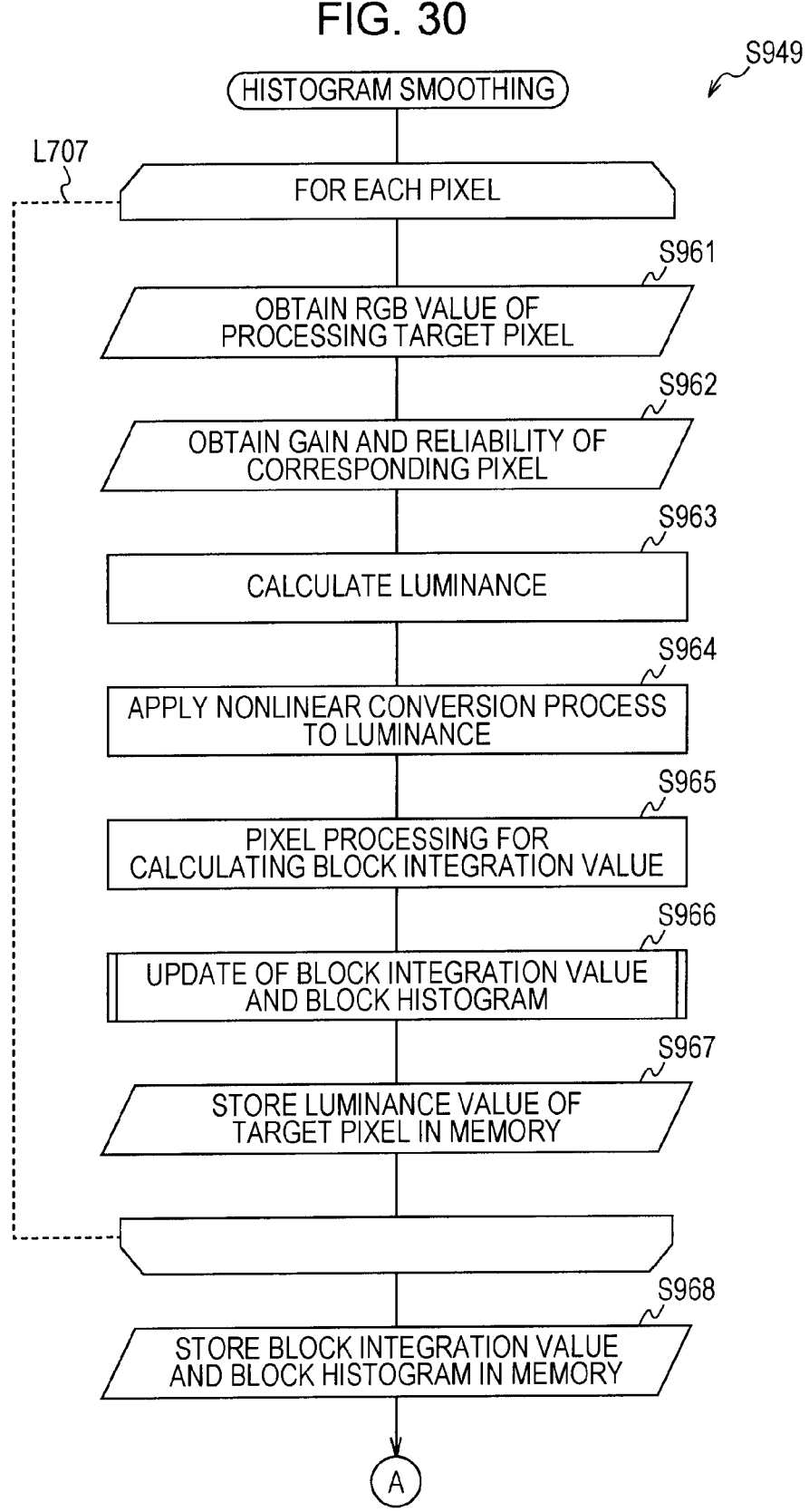
FIG. 30 illustrates a first half of the smoothing processing unit 480 in the third embodiment of the present invention.
Figure 31:
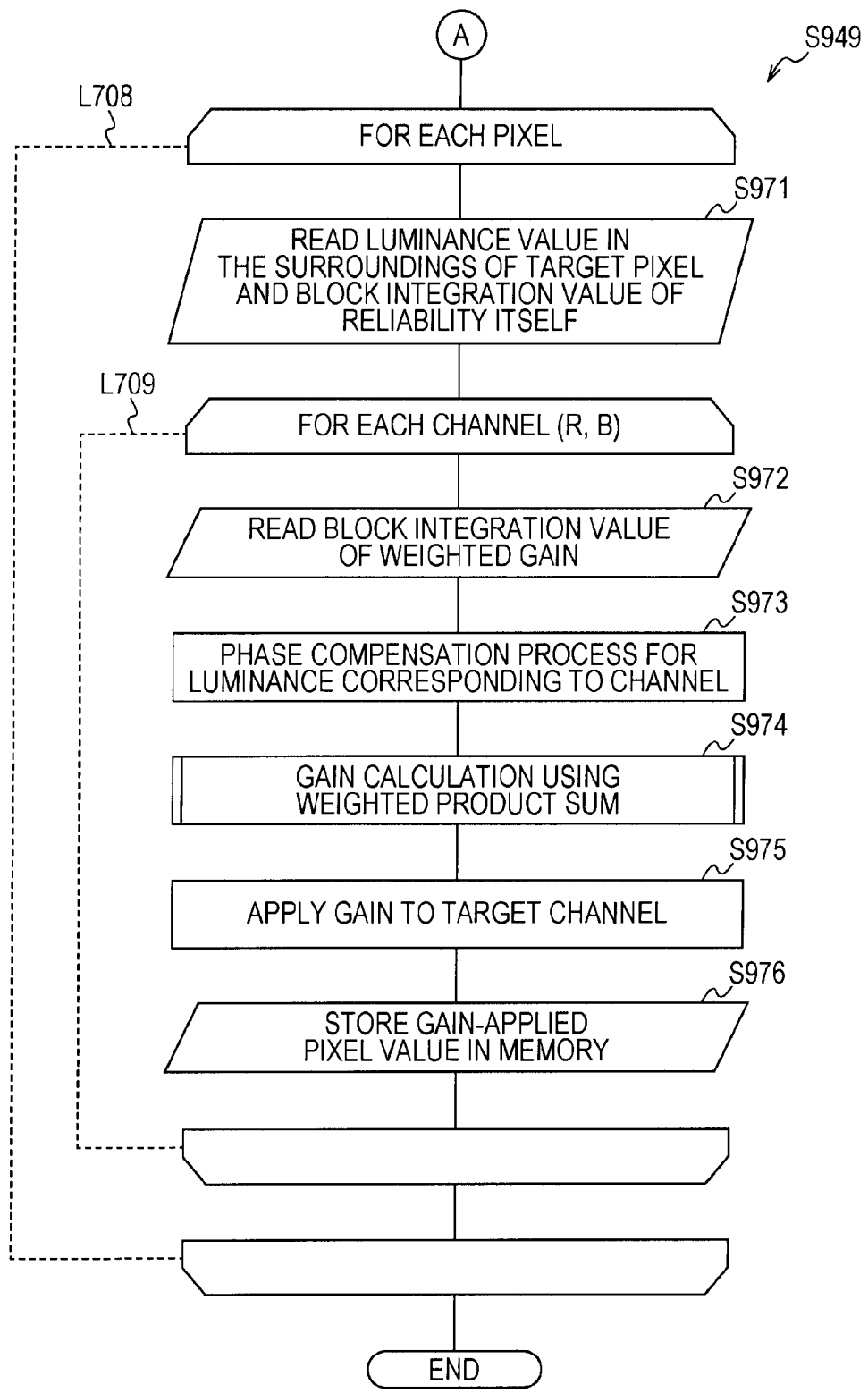
FIG. 31 illustrates a second half of an example of the operation of the smoothing processing unit 480 in the third embodiment of the present invention.

FIGS. 30 and 31 illustrate examples of the operation of the smoothing processing unit 480 in the third embodiment of the present invention.

Here, first, the processing of steps S961 to S967 is repeated by using each pixel as a target (loop L707). In this loop L707, the RGB values of the processing target image are obtained (step S961). Furthermore, the gains $FS_R(P)$ and $FS_B(P)$ of the corresponding pixel and the reliability $FT(p)$ are obtained (step S962). Then, in the luminance calculation unit 521, the luminance value $L(p)$ is calculated (step S963). This luminance value $L(p)$ is subjected to nonlinear conversion in the nonlinear conversion unit 522, and a nonlinear conversion luminance value $L^{(nl)}(p)$ is output (step S964).

Then, a process for calculating a block integration value is performed (step S965). Specifically, in the multiplication units 511 and 512, the gains $FS_R(p)$ and $FS_B(p)$ and the reliability $FT(p)$ are multiplied by each other. Furthermore, in the block integration value calculation units 531 and 532, the block integration value of the gains for the R and B channels at the target pixel position is updated (step S966). Furthermore, in the block histogram calculation unit 533, the block integration value of the reliability itself corresponding to the block histogram at the target pixel position is updated (step S966). Then, the luminance value of the target pixel is stored in a memory (not shown) (step S967).

Upon completion of the processing of steps S961 to S967 of the loop L707, a process for the next pixel position is repeated. When the processing for all the pixel positions is completed, control exits from the loop L707, and the block integration value for one frame and the block histogram are stored in the block integration value holding units 541 and 542 and the block histogram holding unit 543, respectively (step S968). Furthermore, in the third embodiment of the present invention, by inserting the processing of steps S962 to S967 immediately after step S947 in FIG. 24, the loop L705 in FIG. 24 and the loop L707 in FIG. 30 can be formed as a common loop process. Since the value of each pixel has been read in step S941, it is possible to omit step S961. Furthermore, regarding reliability, by directly using the value selected in step S947, the storage and the reading process of the reliability in steps S948 and S962 can be omitted.

Next, the following processing is repeated by using each pixel as a target (loop L708). In this loop L708, the luminance value in the surroundings of the target pixel are read from a memory (not shown). Furthermore, the block integration value for the reliability itself in the surroundings of the target pixel is read from the block histogram holding unit 543 (step S971). Then, the following processing is repeated by using each channel (R and B channels) as a target (loop L709).

In the loop L709, the block integration value of the weighted gains for the target channel is read from the block integration value holding unit 541 or 542 (step S972). Then, in the phase compensation processing unit 551 or 552, a luminance value corresponding to the pixel position of the target channel in the mosaic image is calculated (step S973). Furthermore, in the weighted product-sum unit 561 or 562, the gain for the target pixel channel is calculated by the weighted product-sum computation of the block integration value (step S974). Then, in the gain application unit 571 or 572, the gain obtained by weighted product sum is applied to the target channel (step S975). The pixel value that is gain-applied in this manner is stored, for each channel, at the target pixel position of the illumination component converted mosaic image holding unit 290 (step S976). Furthermore, the process of step S976 referred to herein is step S919 in FIG. 12 and step S950 in FIG. 24, and by storing the processing result in one of them, the other processing can be omitted.

When the processing of steps S972 to S976 is completed in the loop L709, the same processing is repeated for the next channel. Upon completion of the processing for all the channels, control exits from the loop L709, and the same processing is repeated for the next pixel. Upon completion of the processing for all the pixel positions, control exits from the loop L708, and the smoothing process for one frame is completed.

Figure 32:
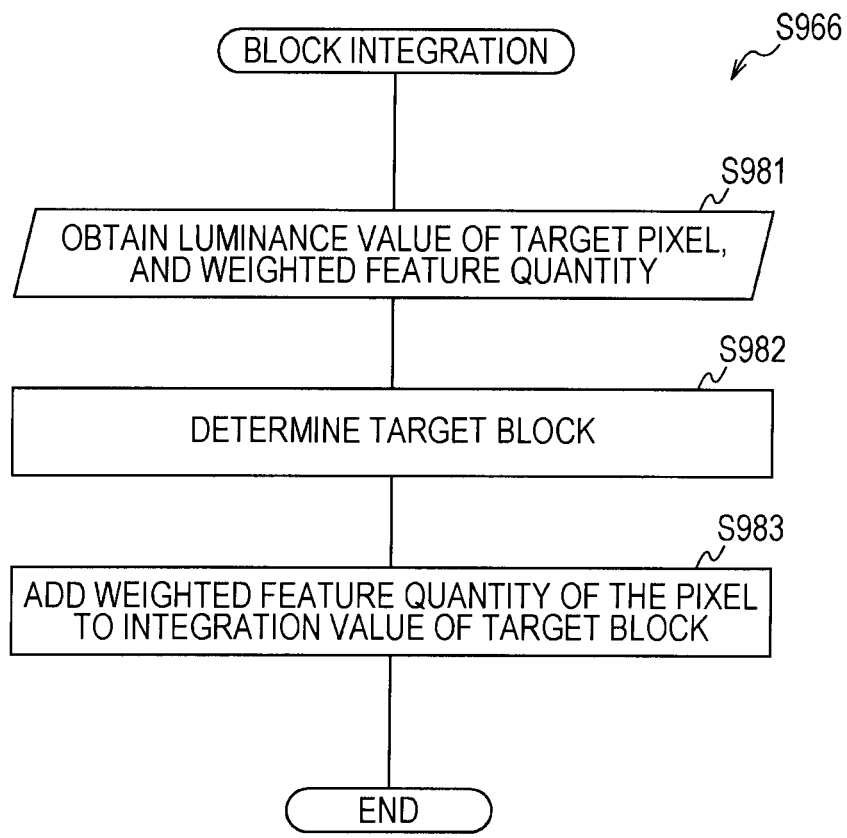
FIG. 32 illustrates an example of the operation of block integration value calculation units 531 and 532 and a block histogram calculation unit 533 in the third embodiment of the present invention.

FIG. 32 illustrates an example of the operation of block integration value calculation units 531 and 532 and a block histogram calculation unit 533 in the third embodiment of the present invention.

Here, the processing of steps S981 to S983 is performed by using each pixel as a target. First, the luminance value and the weighted feature quantity at the target pixel position are obtained from the nonlinear conversion unit 522 and the multiplication units 511 and 512 (step S981). Then, a determination is made by the block selection unit 534 as to which one of the blocks the block in which the target pixel position is contained is from among n blocks (step S982). Then, in the corresponding integrators 535-1 to 535-$n$, the weighted feature quantity of the target pixel is added (step S983).

Figure 33:
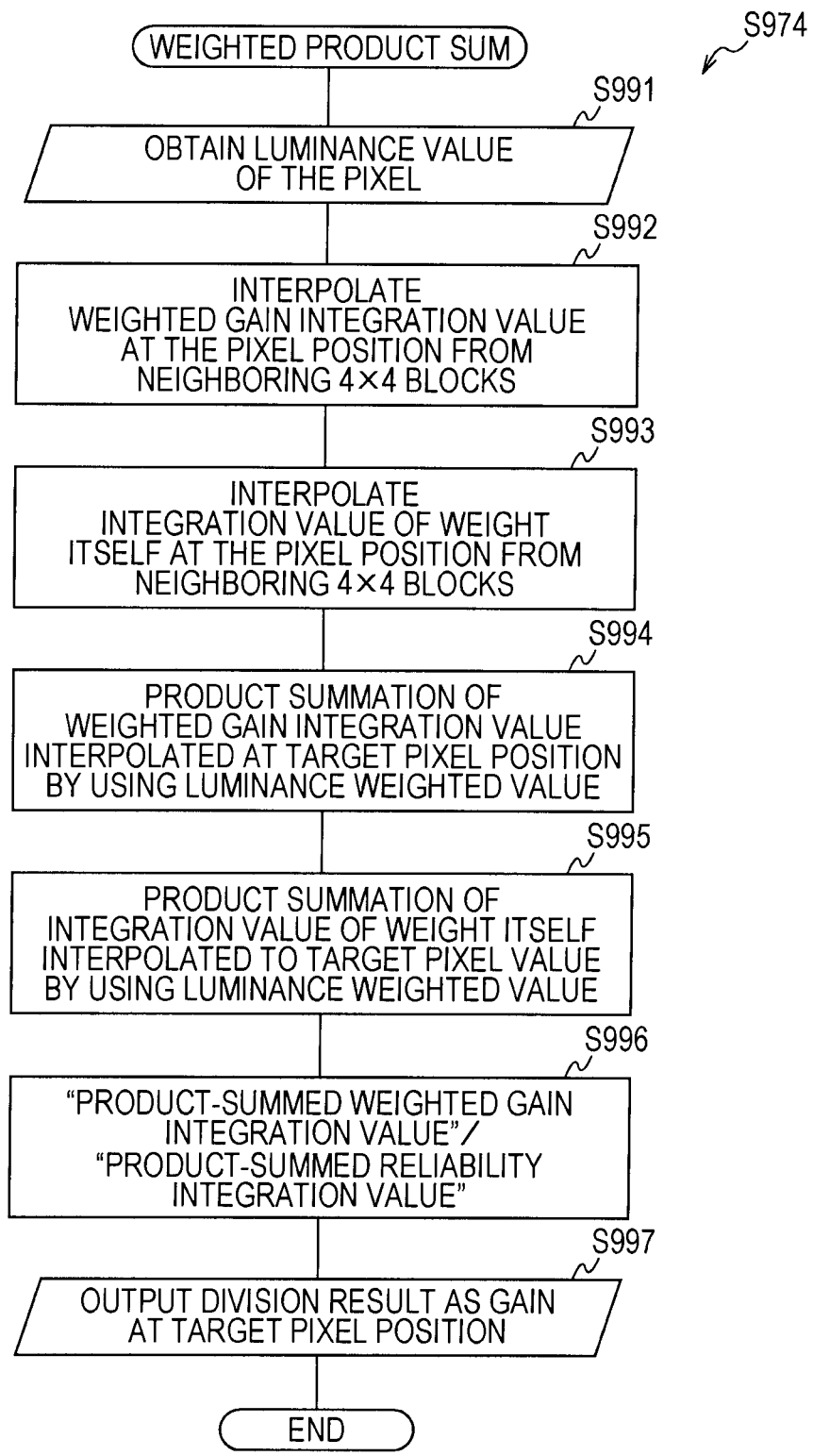
FIG. 33 illustrates an example of the operation of the weighted product-sum units 561 and 562 in the third embodiment of the present invention.

FIG. 33 illustrates an example of the operation of weighted product-sum units 561 and 562 in the third embodiment of the present invention.

First, the luminance at the target pixel position is obtained (step S991). Then, in the interpolation unit 563, the weighted gain integration value at the target pixel position is calculated for each division in the luminance direction by interpolation on the basis of the block integration value information of the neighboring 4×4 blocks in the spatial direction in which the luminances are equal (step S992). Furthermore, in the interpolation unit 564, the integration value of the reliability itself at the target pixel position corresponding to the block histogram of the neighboring 4×4 blocks in the spatial direction in which the luminances are equal is calculated for each division in the luminance direction by interpolation (step S993).

Next, in the product-sum unit 566, the result in which the luminance weighted value is summed to the weighted gain integration value interpolated at the target pixel position is calculated (step S994). Furthermore, in the product-sum unit 567, the result in which the luminance weighted value is summed to the integration value (block histogram) of the reliability itself interpolated at the target pixel position is calculated (step S995).

Next, in the division unit 569, the weighted gain integration value that is summed by the product-sum unit 566 is divided by the integration value of the reliability itself, which is summed by the product-sum unit 567 (step S996). Then, the calculation result of the division unit 569 is output as a global gain value at the target pixel position (step S997), and the weighted product-sum process for one pixel is completed.

As described above, according to the third embodiment of the present invention, by using the weighted gain of the pixel having a close value for each block area and the block integration value in which the reliability itself is integrated for each block, it is possible to decrease the number of computations of edge preservation type smoothing. Furthermore, in the embodiment of the present invention, weighted product summation is performed in the order in which spatial smoothing is performed and next, smoothing in the luminance direction is performed. Alternatively, luminance direction smoothing may be performed and next, spatial smoothing is performed. Furthermore, as shown in Math 26 to Math 28, by holding the weighted gain in which smoothing in the luminance direction has been performed beforehand as the block integration value, the number of computations for each pixel can be decreased.

Meanwhile, in the above-mentioned embodiment, the gains of the R and B channels when the gain of the G channel is fixed to "1" is obtained. In the gain when the luminance is fixed, it is also necessary to apply a gain for the G channel. In that case, the technique according to the present embodiment effectively functions also for the G channel.

Fourth Embodiment

In the scope of the present invention, as another embodiment, the illumination component conversion process can include a process for performing resolution conversion on an input image and making a comparison. The intermediate data in the illumination component conversion process is such that the global illumination distribution and the structure of the entire image are extracted. Consequently, even if the intermediate data is calculated image that is reduced in advance, those information are not deteriorated, and the number of computations can be decreased. Furthermore, by making a comparison after being reduced, it is possible to suppress the influence of the moving subject. In addition, with the introduction of a resolution conversion processing unit, a monitor image that is directed and output toward the LCD, or the like becomes usable. As a result, when the monitor image is used as a reference mosaic image, it is possible to generate an image having high color reproducibility without performing continuous image capturing of flash emission and non-flash emission, and this contributes to the saving of memory. A method of reducing the input image may be a simple method like a simple average of pixels belonging to an area in the mosaic image of the processing target image corresponding to each pixel position of the reduced image.

Meanwhile, in the fourth embodiment, since the configuration of the image-capturing device and the image processing circuit 23 that are assumed is the same as that of the third embodiment, the description thereof is omitted.

[Example of Configuration of Illumination Component Conversion Processing Unit 120]

Figure 34:
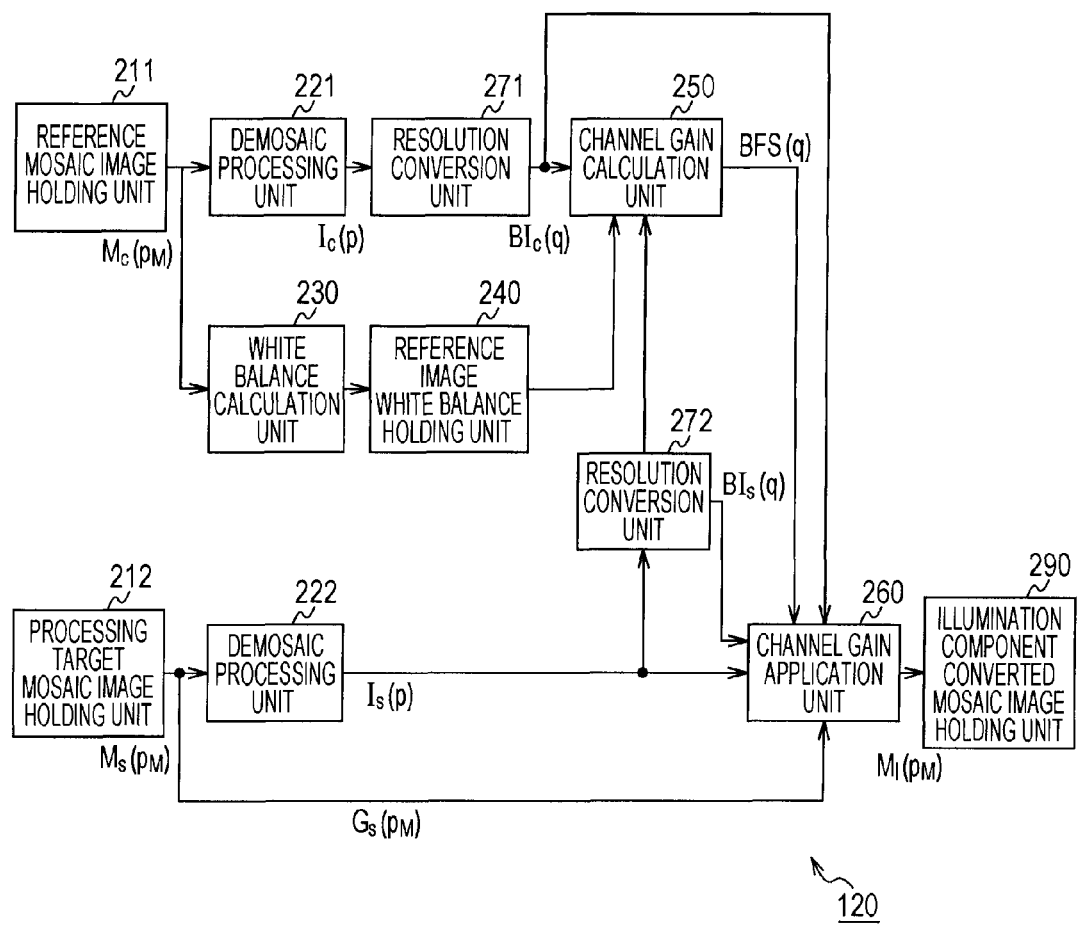
FIG. 34 illustrates an example of the configuration of an illumination component conversion processing unit 120 in a fourth embodiment of the present invention.

FIG. 34 illustrates an example of the configuration of an illumination component conversion processing unit 120 in the fourth embodiment of the present invention. Similarly to the third embodiment, the illumination component conversion processing unit 120 includes demosaic processing units 221 and 222, a white balance calculation unit 230, a reference image white balance holding unit 240, a channel gain calculation unit 250, and a channel gain application unit 260. In this example, the channel gain calculation unit 250 differs from the channel gain calculation unit 250 of FIG. 15 in input/output, and a value after resolution conversion is used. Other than that, the same operation is performed. The illumination component conversion processing unit 120 further includes resolution conversion units 271 and 272.

The resolution conversion units 271 and 272 change the size of an input image. A major objective of the resolution conversion is to reduce the image and suppress an influence of a difference other than the change in the illumination environment by a moving subject or the like. Another example of the objective is to make the size of the input image match between the reference image and the processing target image. It is common practice that a monitor image output to the LCD has a resolution smaller than that of an image captured in a normal process. For this reason, the sizes of two images differ, and the above-mentioned gain calculation cannot be directly used. In order to solve this problem, a technique in which resolution conversion for making the sizes of the reference image and the processing target image uniform with each other is performed and then the images are compared is effective. In that case, which one of expansion reduction the process performed by the resolution conversion units 271 and 272 becomes is determined on the basis of the size relationship between the image sizes of the reference image and the processing target image. When the process performed by the resolution conversion units 271 and 272 is an expansion process, the expansion process by the edge preservation type smoothing filter process is effective. In the smoothing process, since a smoothing process progresses even in a case where the illumination environment is greatly different in the boundary of the object body, a color blur occurs in the boundary. When the process performed by the resolution conversion units 271 and 272 is a reduction process, a comparatively simple method, such as a simple average, a central value, or a thinning process of pixels belonging to a block area in the original image corresponding to each pixel position of the reduced image, may be used. Furthermore, by performing the resolution conversion process in the resolution conversion units 271 and 272 at the same time as the demosaic process performed by the demosaic processing units 221 and 222, the number of computations can be reduced. Furthermore, the order of the resolution conversion process in the resolution conversion units 271 and 272 and the demosaic process performed by the demosaic processing units 221 and 222 may be changed. In that case, also, the number of computations can be reduced.

[Example of Configuration of Channel Gain Application Unit 260]

Figure 35:
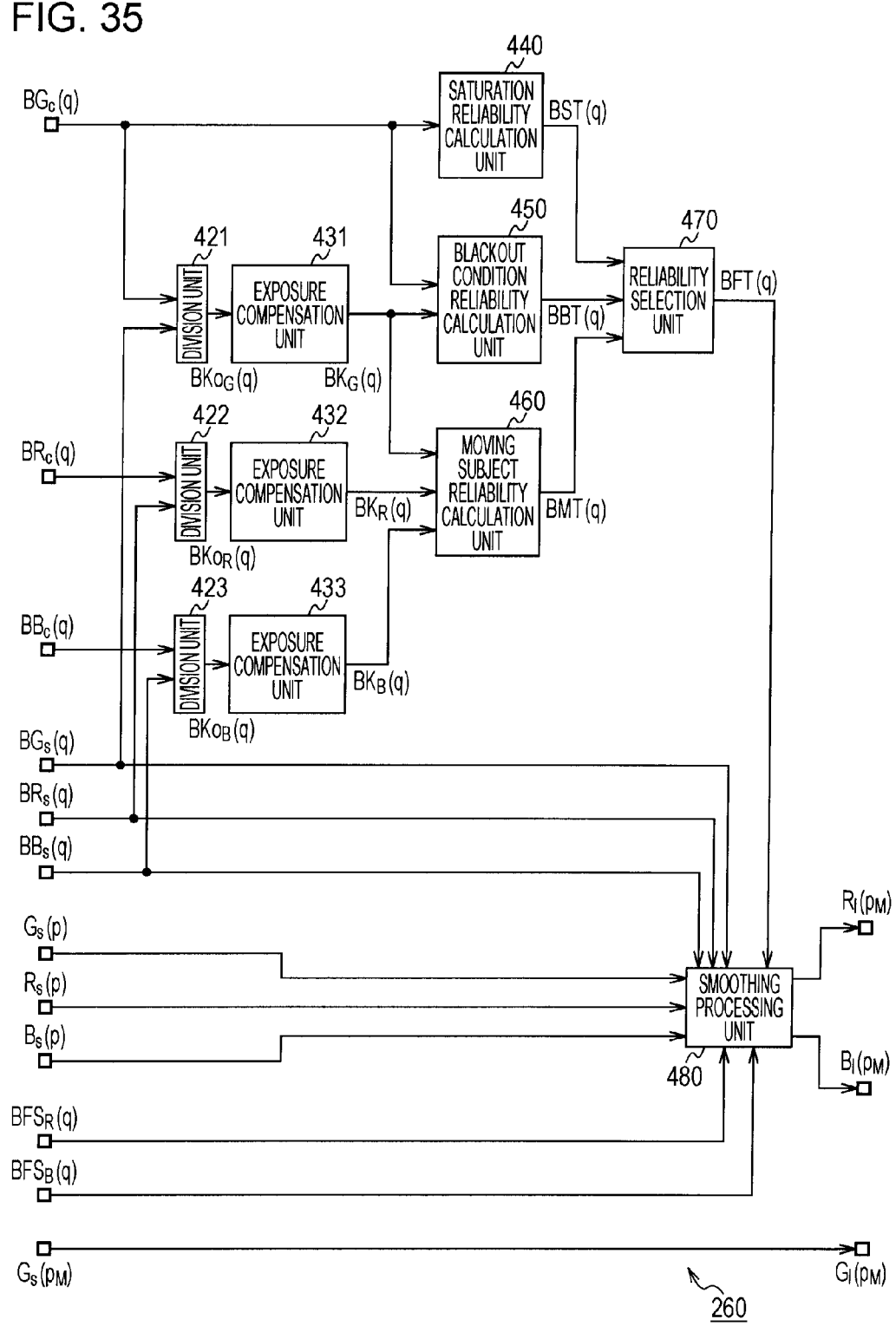
FIG. 35 illustrates an example of the configuration of a channel gain application unit 260 in the fourth embodiment of the present invention.

FIG. 35 illustrates an example of the configuration of a channel gain application unit 260 in the fourth embodiment of the present invention. The channel gain application unit 260 includes the same configuration as in the second embodiment described in FIG. 16. However, when the reliability is to be generated, a reduced image is used. Reference images $BR_c(q)$, $BG_c(q)$, and $BB_c(q)$, which are reduced, and processing target images $BR_s(q)$, $BG_s(q)$, and $BB_s(q)$, which are reduced, are input. Furthermore, in the smoothing processing unit 480, in addition to the processing target images $R_s(p)$, $G_s(p)$, and $B_s(p)$, the reduced processing target images $BR_s(q)$, $BG_s(q)$, and $BB_s(q)$, a reliability $BFS_B(q)$ based on the reduced image, and the gain $BFS_R(q)$ and $BFS_R(q)$ of the reduced image are input. Here, p and q denote each pixel.

[Example of Configuration of Smoothing Processing Unit 480]

Figure 36:
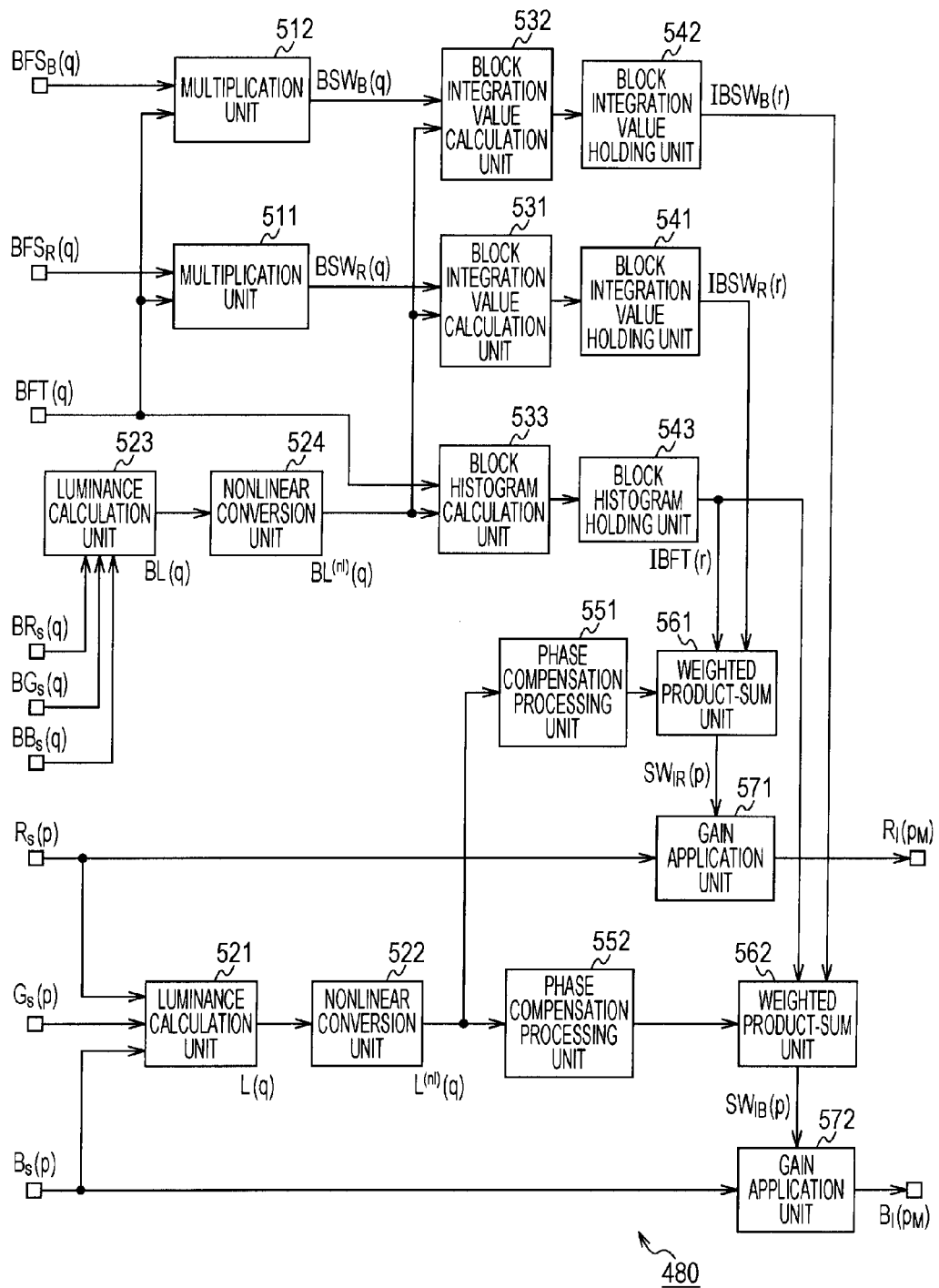
FIG. 36 illustrates an example of the configuration of a smoothing processing unit 480 in the fourth embodiment of the present invention.

FIG. 36 illustrates an example of the configuration of a smoothing processing unit 480 in the fourth embodiment of the present invention. The smoothing processing unit 480 includes the same configuration as that of the third embodiment described with reference to FIG. 26. However, the image used for the calculation of the block integration value is a reduced image. That is, the gains $BFS_R(q)$ and $BFS_B(q)$ of the reduced image and the reliability $BFT(q)$ based on the reduced image are input to the multiplication units 511 and 512. Furthermore, the reduced processing target images $BR_s(g)$, $BG_s(q)$, and $BB_s(q)$ are input to the luminance calculation unit 523.

On the other hand, the size of the processing target image that is weighted-summed is maintained as is. That is, the processing target images $R_s(p)$, $G_s(p)$, and $B_s(p)$ are input to the luminance calculation unit 521. Furthermore, the processing target images $R_s(p)$ and $B_s(p)$ are input to the gain application units 571 and 572, respectively.

[Example of Operation]

Figure 37:
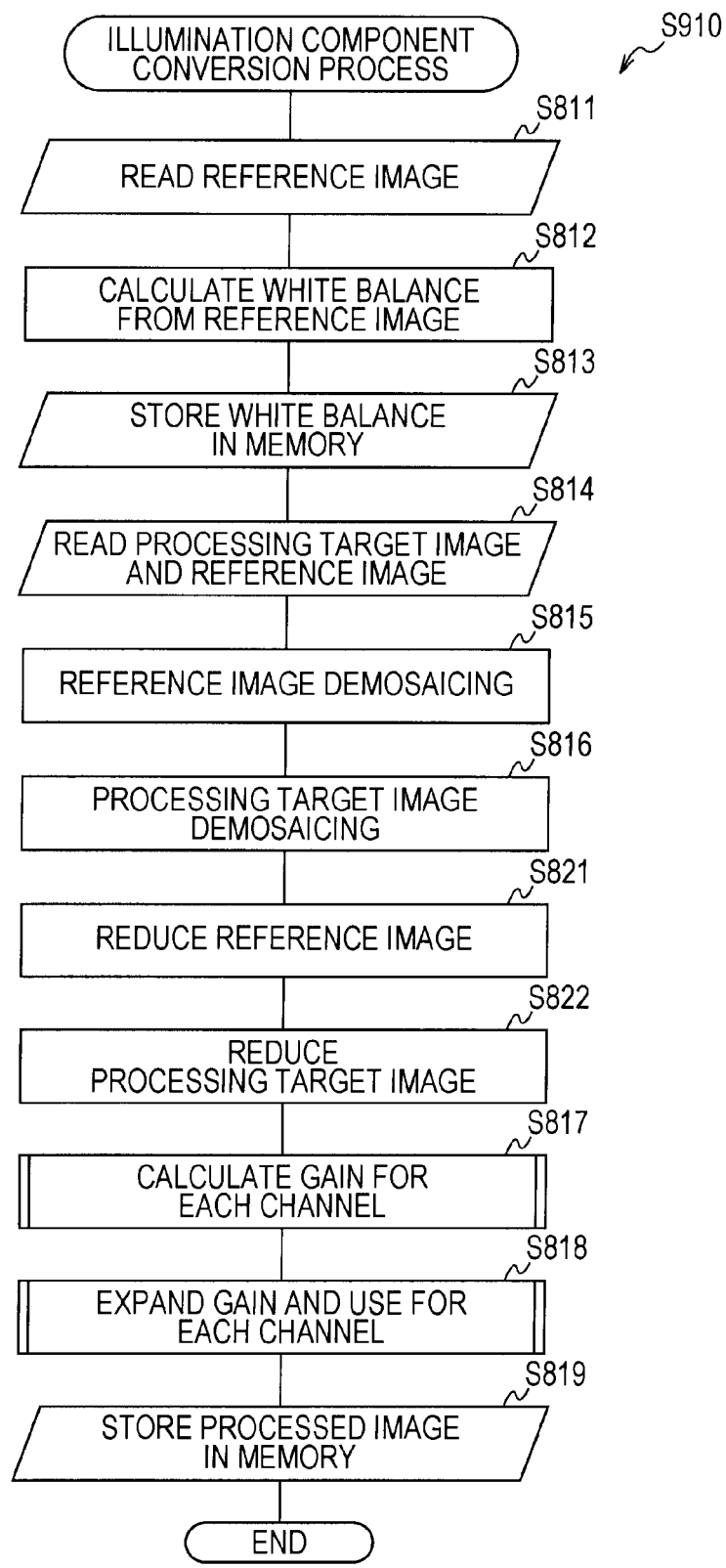
FIG. 37 illustrates an example of the operation of the illumination component conversion processing unit 120 in the fourth embodiment of the present invention.

FIG. 37 illustrates an example of the operation of the illumination component conversion processing unit 120 in the fourth embodiment of the present invention. This example of the operation is basically the same as that of the first embodiment described with reference to FIG. 12. However, in the resolution conversion units 271 and 272, a process for reducing the reference image and the processing target image is performed (steps S821 and S822). Furthermore, in the channel gain application unit 260, the gain is expanded in accordance with the processing target image and is applied to each channel (step S818). At this time, the reliability is set on the basis of the determination as to whether or not the target pixel has deteriorated to a blackout condition or a whiteout condition or whether or not the target pixel is a moving subject. A space-smoothed gain is applied by the edge preservation type by considering the original pixel position of each channel.

Figure 38:
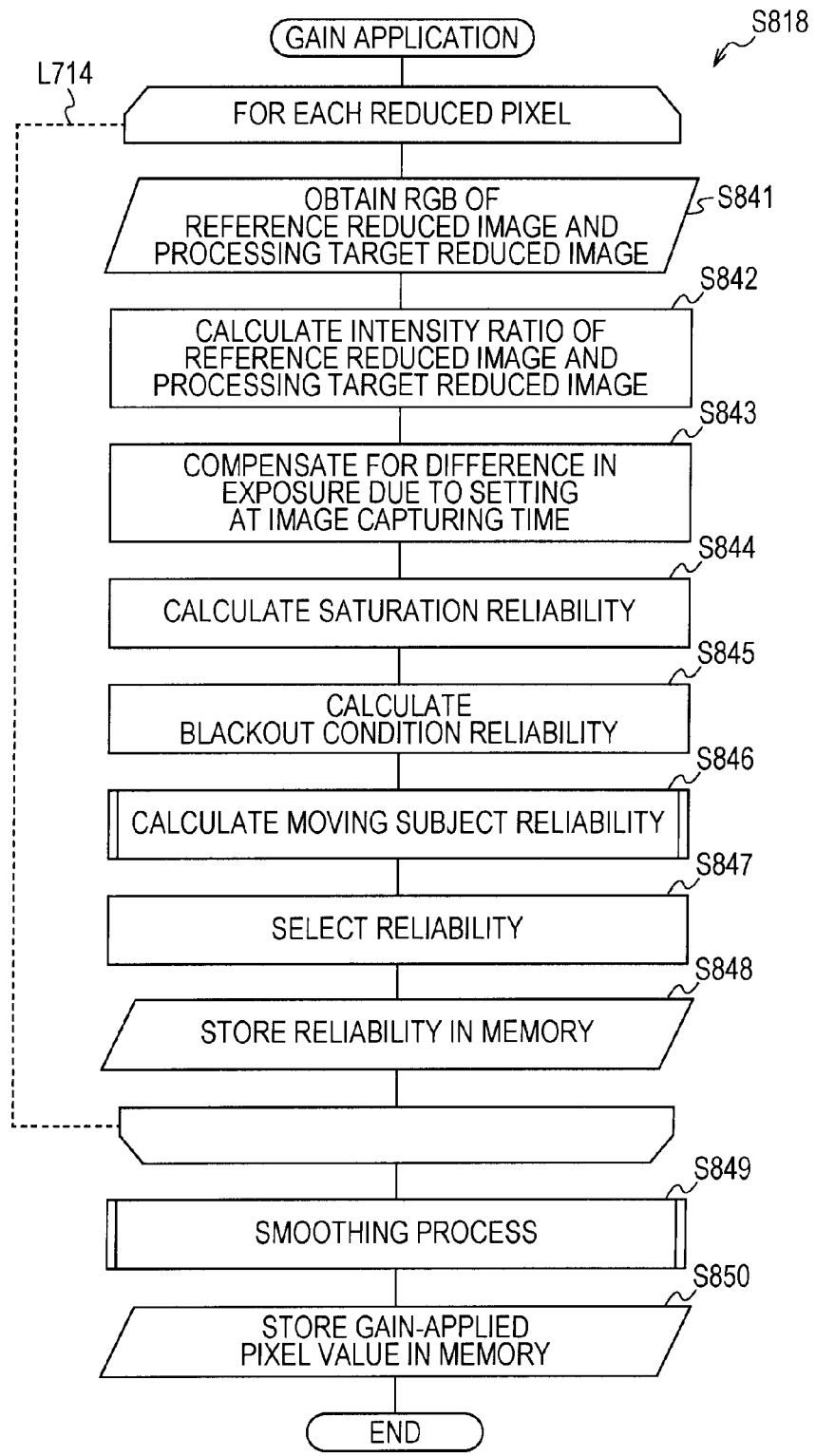
FIG. 38 illustrates an example of the operation of the channel gain application unit 260 in the fourth embodiment of the present invention.

FIG. 38 illustrates an example of the operation of the channel gain application unit 260 in the fourth embodiment of the present invention. This example of the operation is basically the same as that of the second embodiment described with reference to FIG. 24. However, the difference is that the reliability is calculated on the basis of the reduced image. For this reason, the process of the loop L714 corresponding to the loop L705 is a process for each reduction pixel. Furthermore, as the loop L702 and the loop L705 can be formed as a common loop, the process corresponding to the loop L702 performed by the channel gain calculation unit 250 on the reduced image and the process of the loop 714 can be formed together to be a large loop process. Furthermore, the image used for the calculation of the block integration value is also a reduced image (step S841). That is, the gains $BFS_R(q)$ and $BFS_B(q)$ of the reduced image and the reliability $BFT(q)$ based on the reduced image are input to the multiplication units 511 and 512. Furthermore, the reduced processing target images $BR_s(q)$, $BG_s(q)$, and $BB_s(q)$ are input to the luminance calculation unit 523. Furthermore, the process of step S850 referred to herein is step S819 in FIG. 37. By storing the processing result in one of them, the other process can be omitted.

In this smoothing, smoothing corresponding to the pixel position in the mosaic image of the processing target image of the target channel in each pixel is preferable. As a result, the smoothing is a process that is applied while being expanded in accordance with the size of the mosaic image of the processing target image. At this time, although the edge preservation type smoothing process and the expansion process can be performed separately, it is preferable that these processes be performed at the same time from the viewpoint of the reduction in the number of computations.

Figure 39:
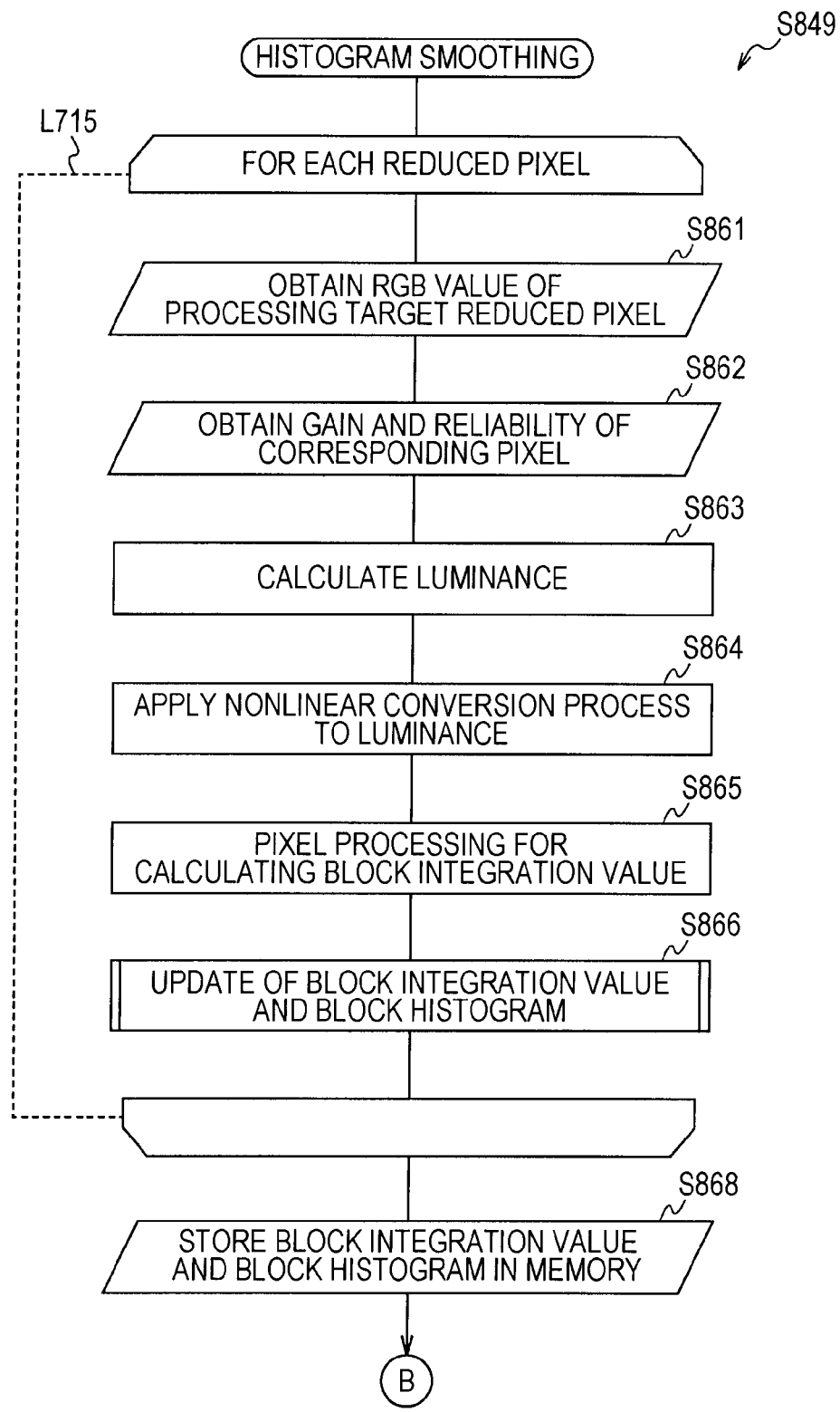
FIG. 39 illustrates a first half of an example of the operation of the smoothing processing unit 480 in the fourth embodiment of the present invention.
Figure 40:
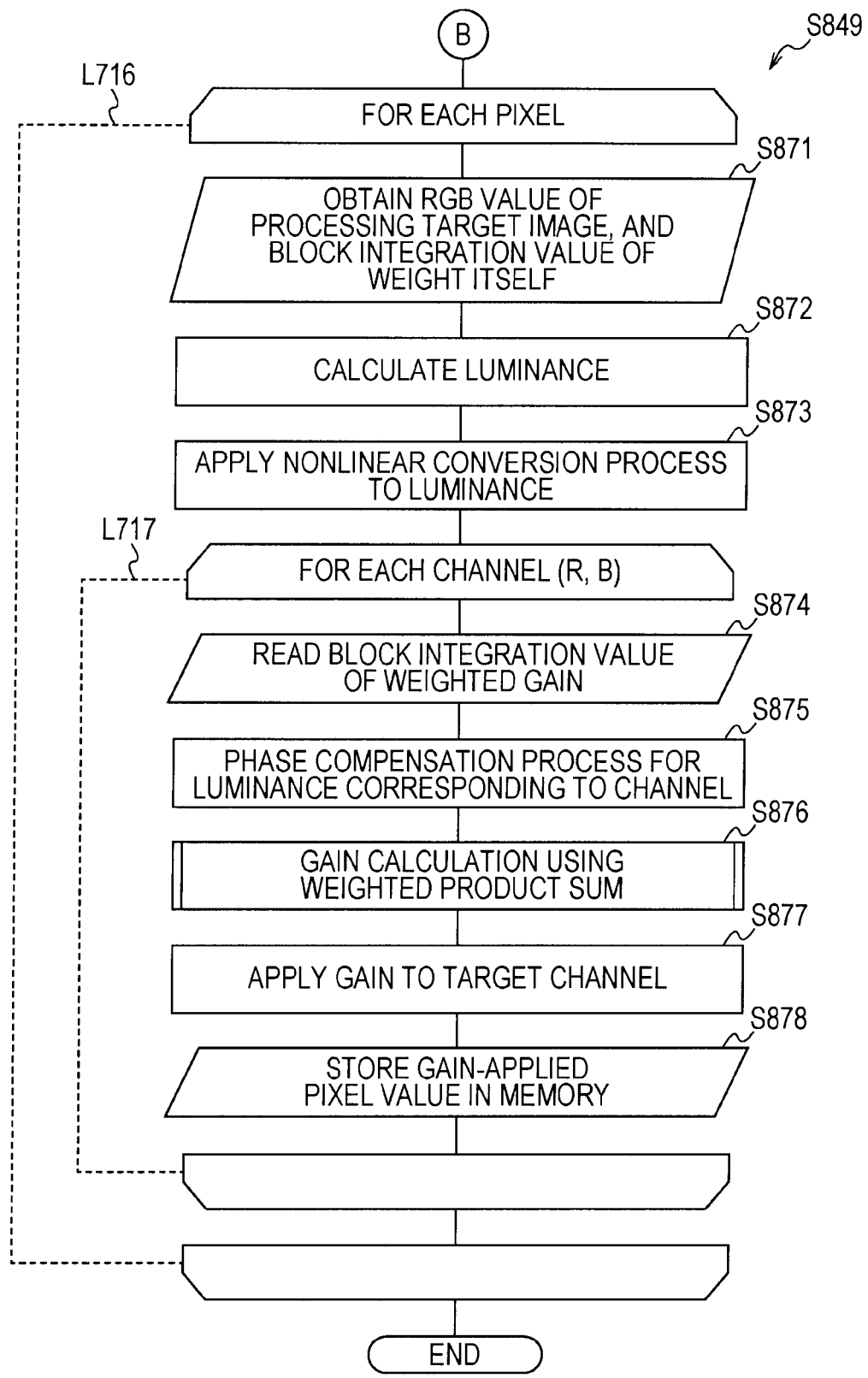
FIG. 40 illustrates a second half of the example of the operation of the smoothing processing unit 480 in the fourth embodiment of the present invention.

FIGS. 39 and 40 illustrate an example of the operation of a smoothing processing unit 480 in the fourth embodiment of the present invention. This example of the operation is basically the same as that of the third embodiment described with reference to FIGS. 30 and 31. However, the image used for the calculation of the block integration value is a reduced image. That is, the gains $BFS_R(q)$ and $BFS_B(q)$ of the reduced image and the reliability $BFT(q)$ based on the reduced image are input to the multiplication units 511 and 512. Furthermore, the reduced processing target images $BR_s(q)$, $BG_s(q)$, and $BB_s(q)$ are input to the luminance calculation unit 523. Furthermore, the size of the processing target image to be weighted-summed is maintained as is. For this reason, in the luminance calculation unit 521, the luminance is calculated on the basis of the processing target images $R_s(p)$, $G_s(p)$, and $B_S(p)$ (step S872), and nonlinear conversion is performed in the nonlinear conversion unit 522 (step S873). A phase compensation process is performed on the nonlinearly converted luminance (step S875). Furthermore, in the weighted product-sum units 561 and 562, when the gain for the target pixel channel is to be calculated by the weighted product-sum computation of the block integration value (step S876), it is important to consider the block integration value and the distance of the target pixel by using the resolution of the mosaic image of the processing target image before reduction. Furthermore, the process of step S878 referred to herein is step S819 in FIG. 37 or step S850 in FIG. 38. By storing the processing result in one of them, the other processing can be omitted. Furthermore, in the fourth embodiment of the present invention, by inserting the processing steps S862 to S866 immediately after step S847 in FIG. 38, the loop L714 in FIG. 38 and the loop L715 in FIG. 39 can be formed as a common loop process. Since the value of each pixel has already been read in step S841, step S861 can be omitted. Furthermore, regarding the reliability, by directly using the value selected in step S847, the storage and the reading process of the reliability in steps S848 and S862 can be omitted.

As described above, according to the fourth embodiment of the present invention, use of the reduced image makes it possible to decrease the overall number of computations and suppress the influence by the moving subject.

Fifth Embodiment

Furthermore, as another form of the illumination component conversion process, another form described below can be taken. In the illumination component conversion process described up to this point, a single image captured by a digital camera has been used as the reference image and the processing target image. A description will be given below of an embodiment that includes a frame memory and that deals with a scene other than flash emission or non-flash emission by generating a combined input image from a plurality of images.

Meanwhile, in the fifth embodiment, the configuration of an image-capturing device and the image processing circuit 23, which are assumed, is the same as that of the fourth embodiment and thus, the description thereof is omitted.

[Example of Configuration of Illumination Component Conversion Processing Unit 120]

Figure 41:
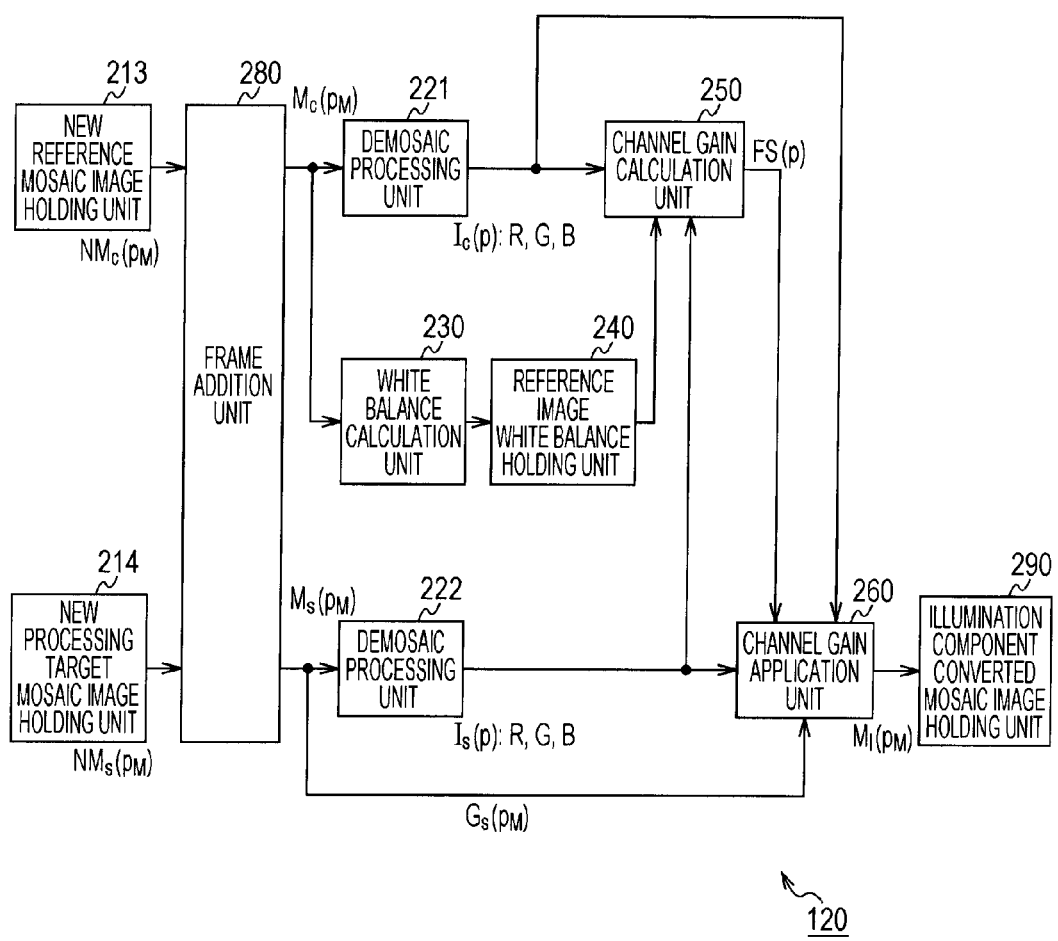
FIG. 41 illustrates an example of the configuration of an illumination component conversion processing unit 120 in a fifth embodiment of the present invention.

FIG. 41 illustrates an example of the configuration of the illumination component conversion processing unit 120 in the fifth embodiment of the present invention. Similarly to the fourth embodiment, the illumination component conversion processing unit 120 includes demosaic processing units 221 and 222, a white balance calculation unit 230, a reference image white balance holding unit 240, a channel gain calculation unit 250, and a channel gain application unit 260. The illumination component conversion processing unit 120 further includes a frame addition unit 280. The frame addition unit 280 generates a combined input image from a plurality of images.

[Example of Configuration of Frame Addition Unit 280]

Figure 42:
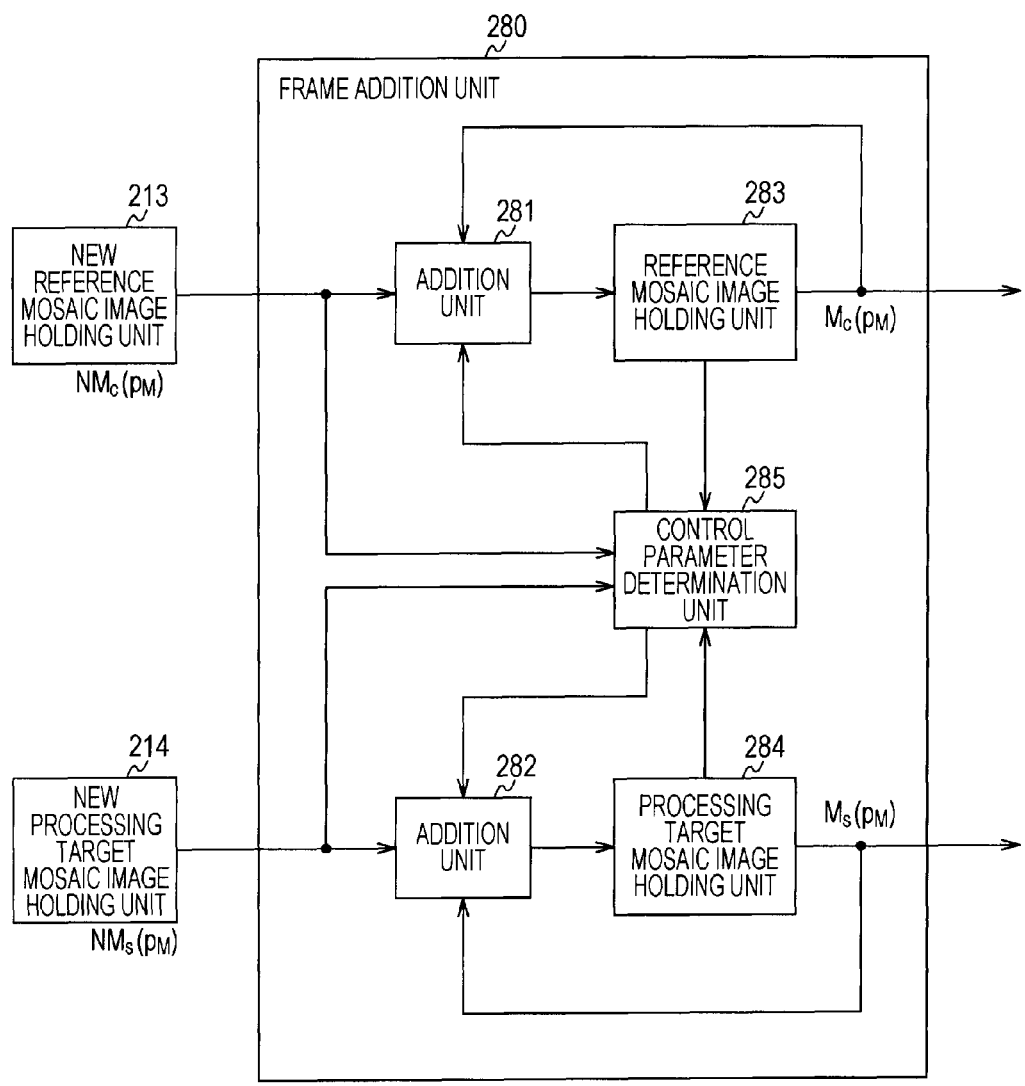
FIG. 42 illustrates an example of the configuration of a frame addition unit 280 in the fifth embodiment of the present invention.

FIG. 42 illustrates an example of the configuration of the frame addition unit 280 in the fifth embodiment of the present invention. The frame addition unit 280 includes addition units 281 and 282, a reference mosaic image holding unit 283, a processing target mosaic image holding unit 284, and a control parameter determination unit 285.

The reference mosaic image holding unit 283 and the processing target mosaic image holding unit 284 hold images captured in the past, and the addition result of them. In the reference mosaic image holding unit 283 and the processing target mosaic image holding unit 284, images that are integrated in the time direction are held. Furthermore, in the reference mosaic image holding unit 283 and the processing target mosaic image holding unit 284, in order to hold an accurate color balance in a wide intensity range, it is preferable that a high dynamic range (HDR) image based on 16-bit accuracy of each channel be held.

The addition unit 281 adds an image from a new reference mosaic image holding unit 213 and an image held in the reference mosaic image holding unit 283. The addition unit 282 adds an image from a new processing target mosaic image holding unit 214 and an image held in the processing target mosaic image holding unit 284.

The control parameter determination unit 285 determines whether or not new image-capturing is performed, and determines a control parameter during image capture on the basis of the image in the frame memory and the new captured image. As this control parameter, it is preferable that a sufficiently high-speed shutter speed be adopted so that camera shake and subject camera shake do not occur. Furthermore, the control parameter determination unit 285 performs control to perform continuous image capture while changing the exposure so that an appropriate RGB color balance in which there are no saturation and a blackout condition for all the pixel positions on the basis of the exposure setting parameters when the processing target image is to be captured and the value of the processing target image.

Furthermore, the control parameter determination unit 285 performs control of detecting flicker from an image held in the reference mosaic image holding unit 283 and the processing target mosaic image holding unit 284 and repeating image capturing until the influence thereof disappears.

Furthermore, as another control method, in the control parameter determination unit 285, a blackout condition or saturation may be detected from the image held in the reference mosaic image holding unit 283 and the processing target mosaic image holding unit 284. Then, by repeating image capturing while changing the exposure until the influence thereof disappears, it is possible to generate a wide dynamic range image.

Meanwhile, in the addition units 281 and 282, addition is preferably performed after accurate positioning is performed by block matching or the like. Alternatively, it is possible to combine with the resolution conversion process of the fourth embodiment. As a result, it becomes possible to obtain a satisfactory outcome even with a simple weighted addition average without performing positioning between the image held in the reference mosaic image holding unit 283 and the new image.

[Example of Operation]

Figure 43:
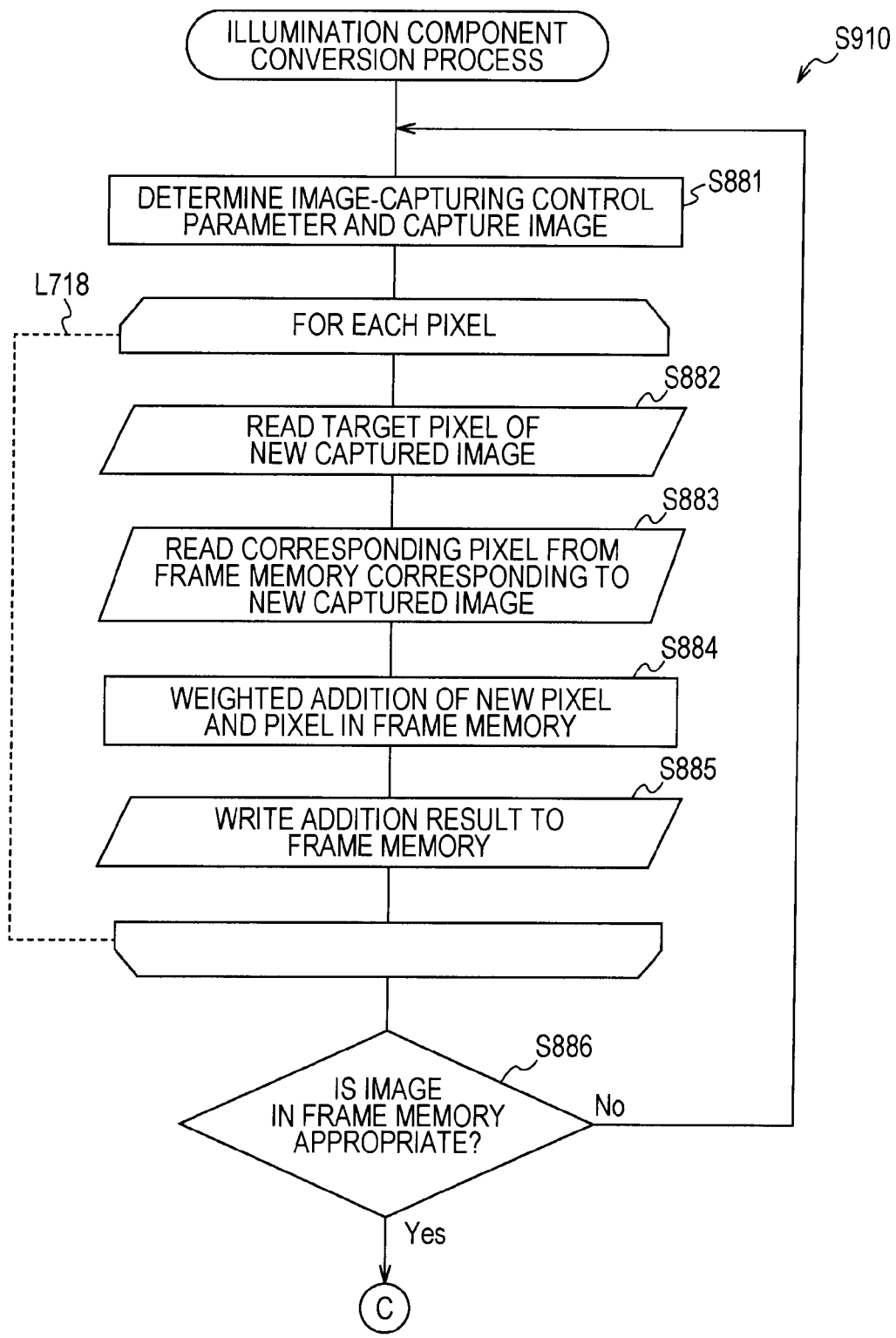
FIG. 43 illustrates a first half of an example of the operation of the illumination component conversion processing unit 120 in the fifth embodiment of the present invention.
Figure 44:
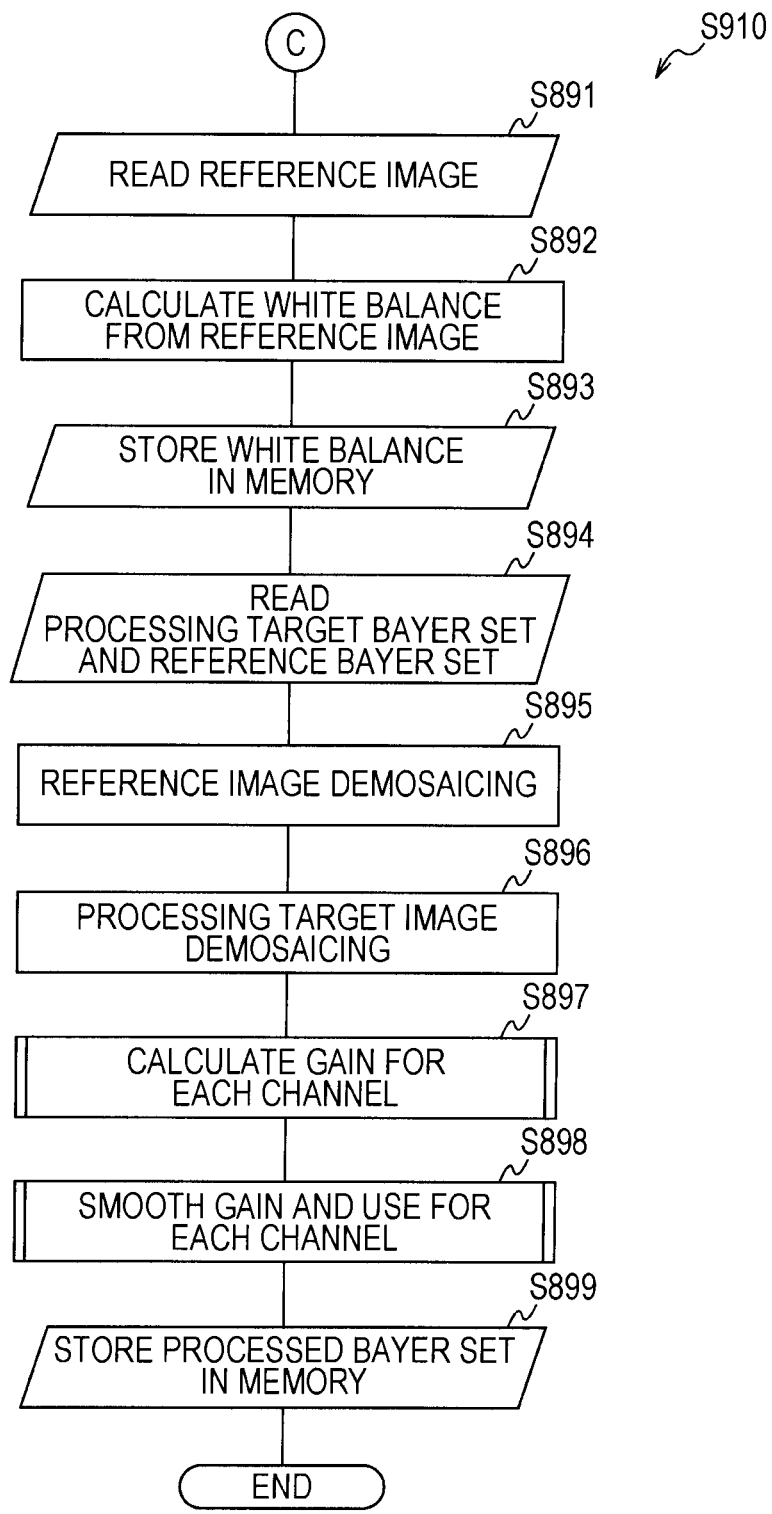
FIG. 44 illustrates a second half of the example of the operation of the illumination component conversion processing unit 120 in the fifth embodiment of the present invention.

FIGS. 43 and 44 illustrate an example of the operation of the illumination component conversion processing unit 120 in the fifth embodiment of the present invention. The second half of the illumination component conversion processing unit 120 is the same as that of the first embodiment described with reference to FIG. 12, and the difference is that frame addition for the reference mosaic image holding unit 283 and the processing target mosaic image holding unit 284 is performed in the first half. Meanwhile, the reference mosaic image holding unit 283 and the processing target mosaic image holding unit 284 will be referred to as a frame memory in the following.

First, in the control parameter determination unit 285, a control parameter regarding image capturing is determined, and the first image is captured in accordance with this control parameter (step S881). The image that is captured at this time may be a reference image and a processing target image, or may be one of them.

Next, the processing of steps S882 to S885 is repeated for each pixel (loop L718). In the loop L718, the target pixel value of the image that is captured newly is obtained (step S882). Furthermore, the existing corresponding pixel value is obtained from the frame memory (step S883). Then, in the addition units 281 and 282, the new pixel value and the image in the frame memory are weight-added (step S884). The addition result is rewritten as a new frame memory image in the frame memory (step S885).

Upon completion of the processing of steps S882 to S885, the process for the next pixel is repeated. Upon completion of the processing for all the pixels, control exits from the loop L718, and the process proceeds to the subsequent step. At that time, in the control parameter determination unit 285, whether or not new image capturing should be performed is determined on the basis of the image in the frame memory and the new captured image, and a control parameter during image capturing is determined (step S886). In the control parameter determination unit 285, when it is determined that additional image capturing is necessary, the process returns to step S881, where new image capturing is performed. In a case where the image in the frame memory is valid, the process proceeds to the subsequent step. The subsequent processing is the same as that of the first embodiment described with reference to FIG. 12.

As described above, according to the fifth embodiment of the present invention, a frame memory is provided, and a combined input image is generated from a plurality of images, thereby making it possible to deal with a scene of other than flash emission or non-flash emission. For example, in the image that is captured in a short time period exposure by using a CMOS sensor under the illumination of a fluorescent lamp or a mercury lamp, an area appears in which illumination conditions are different partially due to an influence of flicker. However, it is possible to deal with such an image.

Meanwhile, it is effective that the fifth embodiment is used in such a manner as to be combined with the fourth embodiment.

Sixth Embodiment

Example of Processing Functions of Image Processing Circuit 23

Figure 45:
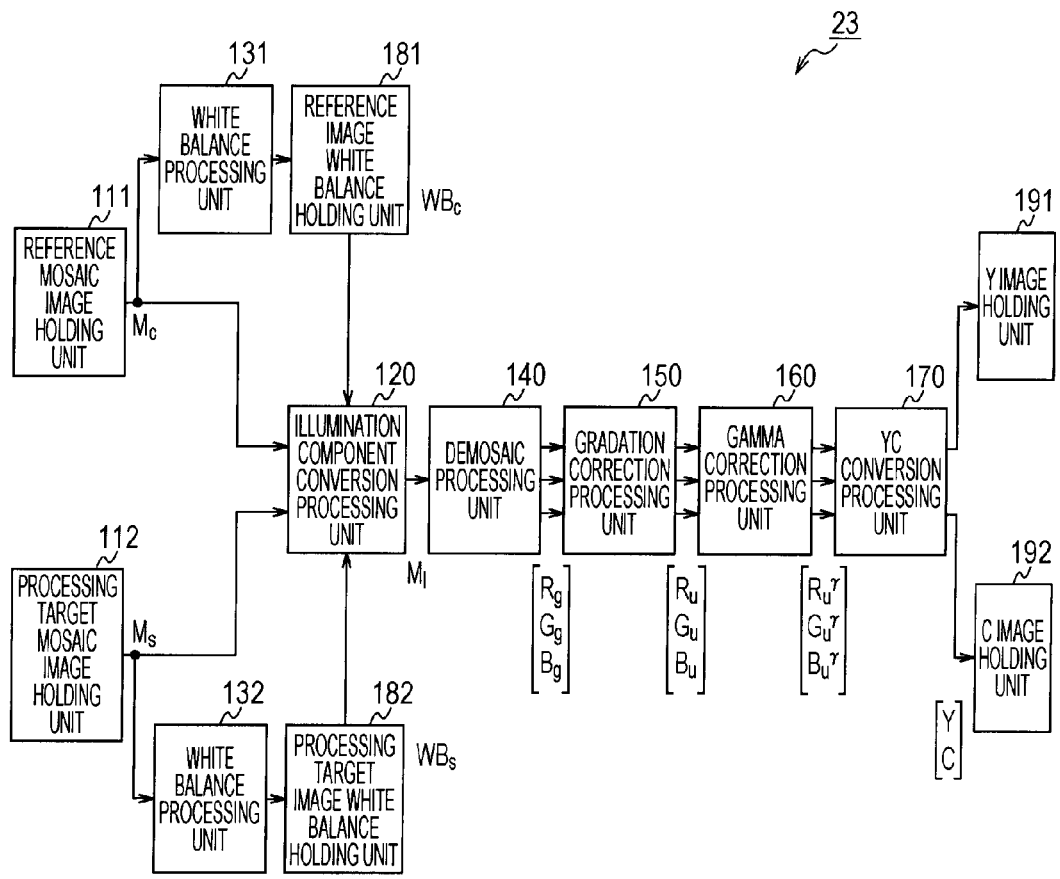
FIG. 45 illustrates an example of processing functions of an image processing circuit 23 in a sixth embodiment of the present invention.

FIG. 45 illustrates an example of processing functions of the image processing circuit 23 in a sixth embodiment of the present invention. The image processing circuit 23 differs from that of the first embodiment described with reference to FIG. 2 in that the white balance process is performed at a stage preceding the illumination component conversion processing unit 120. That is, the white-balance values estimated in the white balance processing units 131 and 132 are calculated, and are stored in the reference image white balance holding unit 181 and the processing target image white balance holding unit 182, respectively. Then, the stored white-balance values are supplied to the illumination component conversion processing unit 120.

In the sixth embodiment, the processes in the color conversion gain calculation units 311 and 312 are as the following equation.

$$S(p) = \frac{WB_c \cdot Ko_G(p)}{Ko(p)} = \begin{bmatrix} \frac{WB_{cR} \cdot G_s(p)/G_c(p)}{R_s(p)/R_c(p)} \\ \frac{WB_{cG} \cdot G_s(p)/G_c(p)}{G_s(p)/G_c(p)} \\ \frac{WB_{cB} \cdot G_s(p)/G_c(p)}{B_s(p)/B_c(p)} \end{bmatrix} \quad \text{[Math 33]}$$

$$= \begin{bmatrix} WB_{cR} \cdot \frac{G_s(p) \cdot R_c(p)}{G_c(p) \cdot R_s(p)} \\ WB_{cG} \\ WB_{cB} \cdot \frac{G_s(p) \cdot B_c(p)}{G_c(p) \cdot B_s(p)} \end{bmatrix}$$

As a result, it becomes possible to simultaneously handle the gain of the illumination component conversion processing unit 120 and the gain of the white balance processing units 131 and 132. In this case, since the gains are multiplied by $WB_c$ with respect to the first embodiment, the value multiplied by $WB_c$ is set with regard to the gain upper limit value R holding unit 323 or the gain upper limit value B holding unit 324, or the gain lower limit value R holding unit 333 or the gain lower limit value B holding unit 334. As a result, it is effective that the upper limit value and the lower limit value represented by the following equation are set.

Gain upper limit value = [Math 34]

$$\max(WB_c, WB_s) = \begin{bmatrix} \max(WB_{cR}, WB_{sR}) \\ \max(WB_{cG}, WB_{sG}) \\ \max(WB_{cB}, WB_{sB}) \end{bmatrix}$$

Gain lower limit value = [Math 35]

$$\min(WB_c, WB_s) = \begin{bmatrix} \min(WB_{cR}, WB_{sR}) \\ \min(WB_{cG}, WB_{sG}) \\ \min(WB_{cB}, WB_{sB}) \end{bmatrix}$$

Furthermore, the same also applies to the blackout condition compensation value R holding unit 343 and the blackout condition compensation value B holding unit 344, and the saturation compensation value R holding unit 353 and the saturation compensation value B holding unit 354. It is sufficient that a blackout condition compensation value is set to $WB_s$, and a saturation compensation value is set to $WB_c$. Furthermore, for the calculation of the upper limit value, the lower limit value, and the compensation value, the values that are stored in the reference image white balance holding unit 181 and the processing target image white balance holding unit 182 are used.

Furthermore, at this time, the process by the white balance calculation unit 230 becomes unnecessary. The processes other than the above in the demosaic processing units 221 and 222 and the channel gain application unit 260 are the same as those of the first embodiment.

Seventh Embodiment

Example of Processing Functions of Image Processing Circuit 23

Figure 46:
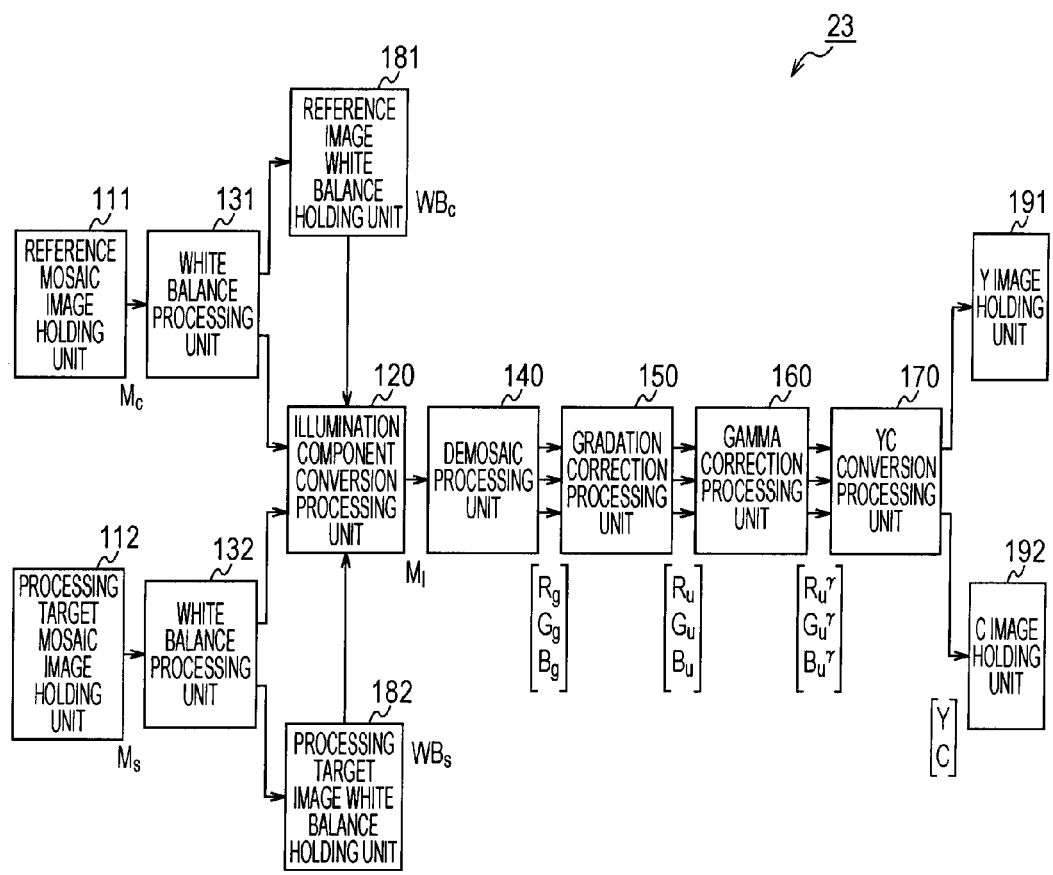
FIG. 46 illustrates an example of processing functions of an image processing circuit 23 in a seventh embodiment of the present invention.

FIG. 46 illustrates an example of processing functions of an image processing circuit 23 in a seventh embodiment of the present invention. In the image processing circuit 23, the mosaic image on which not only gain calculation but also a white balance process has been performed actually is used as an input to the illumination component conversion processing unit. Here, the white balance processing units 131 and 132 calculate white balances, store the white balances in the reference image white balance holding unit 181 and the processing target image white balance holding unit 182, respectively, and use the image on which the white balance process has been performed as an input to the illumination component conversion processing unit 120.

With respect to the input I of the first embodiment, the input on which the white balance process has been performed in the seventh embodiment is given in the following equation.

$$\dot{I}(p) = WB \cdot I(p) = WB \cdot E(p) \cdot \rho(p) \quad \text{[Math 36]}$$

As a result, the ratio and the gain that are calculated in the color conversion gain calculation units 311 and 312 in the channel gain calculation unit 250 are represented in the following manner, respectively.

$$\dot{K}o(p) = \frac{\dot{i}_s(p)}{\dot{i}_c(p)} \quad \text{[Math 37]}$$

$$= \begin{bmatrix} \frac{\dot{R}_s(p)}{\dot{R}_c(p)} \\ \frac{\dot{G}_s(p)}{\dot{G}_c(p)} \\ \frac{\dot{B}_s(p)}{\dot{B}_c(p)} \end{bmatrix} = \begin{bmatrix} \frac{WB_{sR} \cdot E_{sR}(p) \cdot \rho_R(p)}{WB_{cR} \cdot E_{cR}(p) \cdot \rho_R(p)} \\ \frac{WB_{sG} \cdot E_{sG}(p) \cdot \rho_G(p)}{WB_{cG} \cdot E_{cG}(p) \cdot \rho_G(p)} \\ \frac{WB_{sB} \cdot E_{sB}(p) \cdot \rho_B(p)}{WB_{cB} \cdot E_{cB}(p) \cdot \rho_B(p)} \end{bmatrix}$$

$$= \begin{bmatrix} \frac{\frac{WB_{sR}}{WB_{cR}} \cdot E_{sR}(p)}{E_{cR}(p)} \\ \frac{E_{sG}(p)}{E_{cG}(p)} \\ \frac{\frac{WB_{sB}}{WB_{cB}} \cdot E_{sB}(p)}{E_{cB}(p)} \end{bmatrix} = \begin{bmatrix} \frac{WB_{sR}}{WB_{cR}} \cdot Ko_R \\ Ko_G \\ \frac{WB_{sB}}{WB_{cB}} \cdot Ko_B \end{bmatrix}$$

$$\dot{S}(p) = \frac{\dot{K}o_G(p)}{\dot{K}o(p)} \quad \text{[Math 38]}$$

$$= \begin{bmatrix} \frac{WB_{cR}}{WB_{sR}} \cdot \frac{G_s}{G_c} \cdot \left(\frac{R_s}{R_c}\right)^{-1} \\ 1 \\ \frac{WB_{cB}}{WB_{sB}} \cdot \frac{G_s}{G_c} \cdot \left(\frac{B_s}{B_c}\right)^{-1} \end{bmatrix} = \begin{bmatrix} \frac{WB_{cR}}{WB_{sR}} \cdot \frac{G_s \cdot R_c}{G_c \cdot R_s} \\ 1 \\ \frac{WB_{cB}}{WB_{sB}} \cdot \frac{G_s \cdot B_c}{G_c \cdot B_s} \end{bmatrix}$$

$$= \begin{bmatrix} \frac{WB_{cR}}{WB_{sR}} \cdot S_R \\ S_G \\ \frac{WB_{cB}}{WB_{sB}} \cdot S_B \end{bmatrix}$$

Here, the ratio Ko has been multiplied by $WB_s/WB_c$, and the gains has been multiplied by $WB_c/WB_s$. When this fact is considered, the value multiplied by $WB_c/WB_s$ with respect to the first embodiment is set with regard to the gain upper limit value R holding unit 323 or gain upper limit value B holding unit 324, or the gain lower limit value R holding unit 333 or the gain lower limit value B holding unit 334. As a result, it is effective that the upper limit value and the lower limit value are set in the following manner.

$$\text{Gain upper limit value} = \max\left(1, \frac{WB_c}{WB_s}\right) = \begin{bmatrix} \max\left(1, \frac{WB_{cR}}{WB_{sR}}\right) \\ \max\left(1, \frac{WB_{cG}}{WB_{sG}}\right) \\ \max\left(1, \frac{WB_{cB}}{WB_{sB}}\right) \end{bmatrix} \quad [\text{Math 39}]$$

$$\text{Gain lower limit value} = \min\left(1, \frac{WB_c}{WB_s}\right) = \begin{bmatrix} \min\left(1, \frac{WB_{cR}}{WB_{sR}}\right) \\ \min\left(1, \frac{WB_{cG}}{WB_{sG}}\right) \\ \min\left(1, \frac{WB_{cB}}{WB_{sB}}\right) \end{bmatrix} \quad [\text{Math 40}]$$

Furthermore, the same also applies to the blackout condition compensation value R holding unit 343 and the blackout condition compensation value B holding unit 344, and the saturation compensation value R holding unit 353 and the saturation compensation value B holding unit 354. It is sufficient that the blackout condition compensation value is set to "1", and the saturation compensation value is set to $WB_c/WB_s$. Furthermore, for the calculation of the upper limit value, the lower limit value, and the compensation value, the values that are stored in the reference image white balance holding unit 181 and the processing target image white balance holding unit 182 are used.

Furthermore, as another form for obtaining the upper limit value, the lower limit value, and the compensation value, the following technique is considered. That is, for the value of WBc/WBs, the values that are stored in the reference image white balance holding unit 181 and the processing target image white balance holding unit 182 are not used, and may be directly obtained from the reference image and the processing target image on which the white balance process has been performed. The equation of the ratio K of two images on which an exposure compensation process has been performed in the image on which the white balance process has been performed can be written like Math 41 by performing an exposure compensation process with respect to Math 37. Here, in the background area in which flash light does not reach, since the ratio K(p) is 1, the ratio of the white balance can be obtained as the value of each channel of Math 41 in such an area. Therefore, a threshold value is provided for KG, and WBc/WBs can be obtained as a reciprocal of the average or the central value of the values of the channels of K of the area in which KG is close to 1.

$$\dot{K}(p) = \dot{K}o(p) \cdot \exp CV = \begin{bmatrix} \frac{WB_{sR}}{WB_{cR}} \cdot K_R(p) \\ K_G(p) \\ \frac{WB_{sB}}{WB_{cB}} \cdot K_B(p) \end{bmatrix} \quad [\text{Math 41}]$$

Furthermore, at this time, the process by the white balance calculation unit 230 becomes unnecessary. The processing in the demosaic processing units 221 and 222 is the same as that of the first embodiment. Furthermore, the process in the channel gain application unit 260 is a process in which the fact that the ratio Ko has been multiplied by $WB_s/WB_c$ with respect to the first embodiment is considered.

Eighth Embodiment

In the eighth embodiment of the present invention, two images on which some sort of conversion process has been added to RAW data are assumed. For example, two images on which the processes corresponding to the white balance processing unit 130 through to the YC conversion processing unit 170 in the image processing circuit 23 of the image-capturing device of FIG. 2 has been performed are assumed. As the image format, for example, JPEG (Joint Photographic Experts Group) format is assumed. Furthermore, it is assumed that for input images, three channels are fully prepared for each pixel and that a white balance process has already been performed on each image. That is, similarly to the seventh embodiment, in the eighth embodiment, an image on which the white balance process has already been performed can be used as an input image.

The main difference of the eighth embodiment from the other embodiments is that data for three channels has already been fully prepared for each pixel. As a result, the demosaic processing unit 221 for the reference image and the demosaic processing unit 222 for the processing target image in FIG. 5 become unnecessary and are bypassed. Furthermore, the operation of the white balance calculation unit 230 also differs. In the white balance calculation unit 230, it is assumed that a white-balance value obtained in advance by the white balance processing unit 130 is held and is stored as the value of WBc for the reference image in the reference image white balance holding unit. Regarding WBs, it is assumed that the value obtained by the white balance processing unit 130 in advance is held and used. Furthermore, as another form of setting of WBs, a white-balance value obtained by prior measurement for the flash emitting unit 61 of FIG. 1 may be used. Furthermore, as in Math 41 of the seventh embodiment, the ratio of the white balance of the reference image to the processing target image may be obtained as the ratio of two images after exposure compensation. Furthermore, another difference is that a nonlinear process corresponding to the gamma correction processing unit 160 of FIG. 2 has already been added to the input image and the intensity ratio K of the signals is not correctly obtained. For this reason, in the eighth embodiment, a process in which an input for the illumination component conversion process is used after an inverse gamma correction process is performed or a process that assumes a gamma correction process is desired to be changed. A block diagram that illustrates the configuration of the image processing circuit 23 in which an image after the inverse gamma correction process is an input is FIG. 47.

[Example of Processing Functions of Image Processing Circuit 23]

Figure 47:
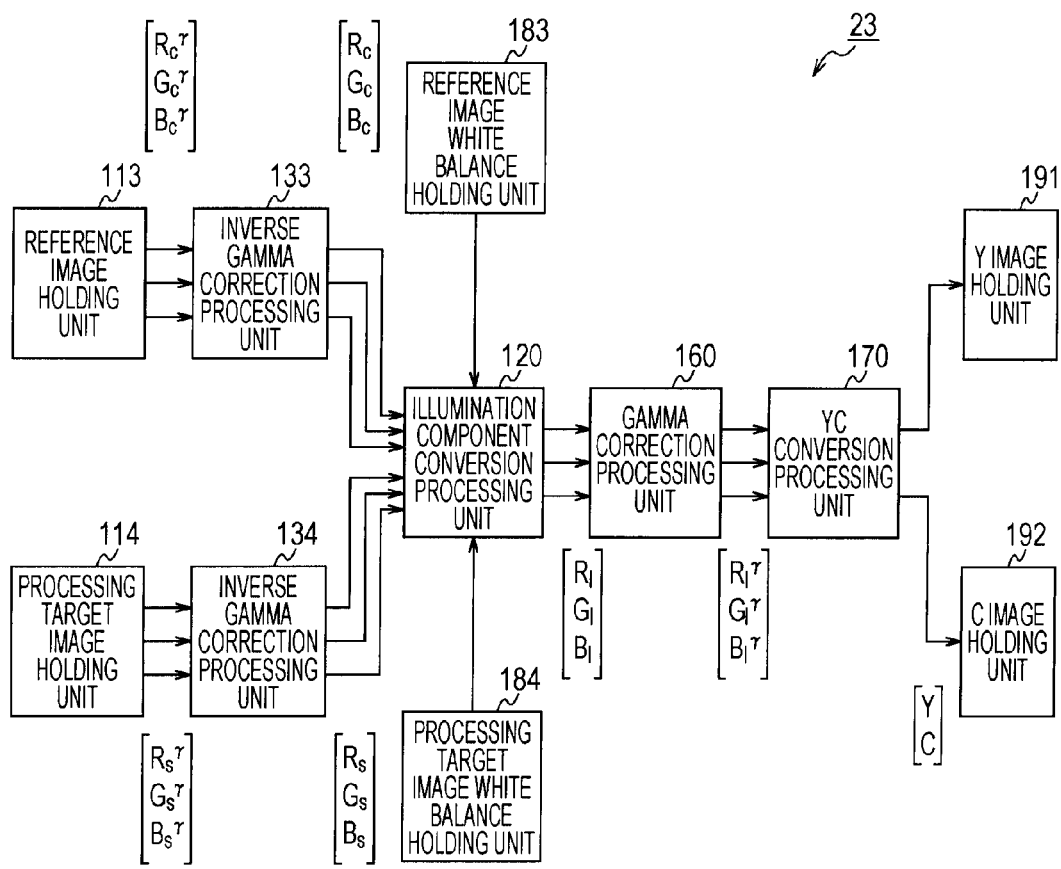
FIG. 47 illustrates an example of processing functions of an image processing circuit 23 in an eighth embodiment of the present invention.

FIG. 47 illustrates an example of processing functions of the image processing circuit 23 in an eighth embodiment of the present invention. The image processing circuit 23 includes inverse gamma correction processing units 133 and 134, an illumination component conversion processing unit 120, a gamma correction processing unit 160, a YC conversion processing unit 170, a reference image white balance holding unit 183, and a processing target image white balance holding unit 184.

The input image for the image processing circuit 23 is an image that has already been decoded from the JPEG format and in which three channels are fully prepared for each pixel. For the inverse gamma correction process, inverse conversion of a gamma correction process when an image of the JPEG format is generated is desirable. In a case where it is not possible to know accurate inverse conversion, a simplified inverse gamma correction process may be used. A simplified process of the gamma correction process is given in the following equation.

$$gamI(p) = \left(\frac{I(p)}{I_{white\_level}}\right)^T \cdot I_{white\_level} \qquad [\text{Math 42}]$$

Therefore, it can be seen that it is sufficient that a correction process represented by the following equation, which is an inverse conversion equation of the above equation, is performed.

$$I(p) = \left(\frac{gamI(p)}{I_{white\_level}}\right)^{\frac{1}{\gamma}} \cdot I_{white\_level} \qquad [\text{Math 43}]$$

Here, $I_{white\_level}$ is the upper limit value of the input signal I for normalizing the input signal to the value of 0.0 to 1.0. The process for the image after inverse gamma correction conforms to the first embodiment of the present invention. Furthermore, the equations for calculating the gain upper limit value, the gain lower limit value, the saturation compensation value, and the blackout condition compensation value in the gain calculation unit conforms to Math 39 and Math 40 of the seventh embodiment. Furthermore, similarly to the seventh embodiment, the process in the channel gain application unit 260 is a process in which the fact that the ratio Ko has been multiplied by WBs/WBc with respect to the first embodiment is considered.

Furthermore, after the illumination component conversion process, gamma correction needs to be performed again. It is preferable that this conversion be inverse conversion of the inverse gamma correction processing units 133 and 134 independently of the gamma correction process when an image of the JPEG format is generated.

Next, in the example of the functions of FIG. 47, processing in a case where inverse gamma correction processing units 133 and 134 and gamma correction processing unit 160 are omitted will be described. In general, it is preferable that the color balance adjustment process for each channel be performed by using an image called RAW data having spectroscopy characteristics of the sensor and the color filter arranged on the surface thereof, the color balance of illumination components, and linear characteristics for the intensity. It is considered that an illumination component conversion process is performed on an image conversion f has been performed on this RAW data.

If the adjustment of the color balance is to be performed at the stage of RAW data in the manner described above, the output to be obtained at this point is an image on which the conversion f has been performed after the color conversion process has been performed. Thus, the output can be represented as in the following.

$$f(FS(p) \cdot I_s(p))$$

Here, in order to simplify the description, when the upper limit value clipping unit, the lower limit value clipping unit, the blackout condition compensation unit, and the saturation compensation unit in FIG. 6 are omitted, and it is set that gain S(p)=gain FS(p), the following is obtained.

$$f(S(p) \cdot I_s(p))$$

On the other hand, when the image after the conversion f is used as an input to the illumination component conversion processing unit 120, and the gain obtained by the color conversion gain calculation units 311 and 312 is denoted as tS(p), the image after the gain application is as in the following.

$$tS(p) \cdot f(I_s(p))$$

To be obtained here is tS(p) that makes the results of the above two equations match each other. Therefore, the following equation is obtained.

$$f(S(p) \cdot I_s(p)) = tS(p) \cdot f(I_s(p))$$

$$tS(p) = (f(S(p) \cdot I_s(p)))/f(I_s(p))$$

Here, it is assumed that with respect to the conversion f, the computation order of the multiplication and the division, and the conversion f is interchangeable. That is, the following equation is assumed to hold.

$$f(I(p) \cdot J(p)) = f(I(p)) \cdot f(J(p))$$

$$f(1/I(p)) = 1/f(I(p))$$

It can be seen that the use of this assumption makes it possible to obtain a corresponding color conversion gain tFS(p) as the following equation by performing the same process as that of Math 4 on the image after the conversion.

$$tS(p) = \frac{f\left[\frac{Ko_G(p)}{Ko(p)} \cdot I_s(p)\right]}{f(I_s(p))} \qquad [\text{Math 44}]$$

$$= \frac{f(Ko_G(p)) \cdot f\left[\frac{1}{Ko(p)}\right] \cdot f(I_s(p))}{f(I_s(p))}$$

$$= f(Ko_G(p)) \cdot \frac{1}{f(Ko(p))}$$

$$= f\left[\frac{G_s(p)}{G_c(p)}\right] \cdot \frac{1}{f\left[\frac{I_s(p)}{I_c(p)}\right]}$$

$$= \frac{f(G_s(p)) \cdot f(I_c(p))}{f(G_c(p)) \cdot f(I_s(p))}$$

That is, it is shown that the color conversion gain calculation method according to the embodiment of the present invention is also effective without performing an inverse conversion process with regard to the image on which the conversion f having the property of the above equation has been performed on the RAW data.

The gamma correction process can be approximated to a conversion using an exponentiation function shown in Math 41 representing a simplified gamma correction process. Furthermore, this conversion satisfies the assumption regarding the conversion f. Therefore, it is possible to apply the illumination component conversion process shown in the embodiment of the present invention to the image after a gamma process without performing inverse conversion in an approximate manner. Furthermore, at this time, it is effective that for the gain upper limit value, the gain lower limit value, the saturation compensation value, and the blackout condition compensation value used in the channel gain calculation unit 250, values that obtained in Math 39 and Math 40 of the seventh embodiment of the inverse gamma correction process are correspondingly multiplied by γ are used. Therefore, it is sufficient that the blackout condition compensation value is set to 1, the saturation compensation value is set to $(WB_c/WB_s)^\gamma$, and the gain upper limit value and the gain lower limit value are set by the following equations.

Gain upper limit value = [Math 45]

$$\max\left(1, \left(\frac{WB_c}{WB_s}\right)^\gamma\right) = \begin{bmatrix} \max\left(1, \left(\frac{WB_{cR}}{WB_{sR}}\right)^\gamma\right) \\ \max\left(1, \left(\frac{WB_{cG}}{WB_{sG}}\right)^\gamma\right) \\ \max\left(1, \left(\frac{WB_{cB}}{WB_{sB}}\right)^\gamma\right) \end{bmatrix}$$

Gain lower limit value = [Math 46]

$$\min\left(1, \left(\frac{WB_c}{WB_s}\right)^\gamma\right) = \begin{bmatrix} \min\left(1, \left(\frac{WB_{cR}}{WB_{sR}}\right)^\gamma\right) \\ \min\left(1, \left(\frac{WB_{cG}}{WB_{sG}}\right)^\gamma\right) \\ \min\left(1, \left(\frac{WB_{cB}}{WB_{sB}}\right)^\gamma\right) \end{bmatrix}$$

In a case where an image that has been maintained as being gamma-processed is used as an input image, the ratio gamKo of the images in a gamma-corrected state is given in the following equation.

$$gamKo(p) = \frac{gamI_s(p)}{gamI_c(p)} = \begin{bmatrix} \frac{gamR_s(p)}{gamR_c(p)} \\ \frac{gamG_s(p)}{gamG_c(p)} \\ \frac{gamB_s(p)}{gamB_c(p)} \end{bmatrix}$$

$$= \begin{bmatrix} \frac{\left(\frac{R_s(p)}{R_{white\,level}}\right)^\gamma \cdot R_{white\,level}}{\left(\frac{R_c(p)}{R_{white\,level}}\right)^\gamma \cdot R_{white\,level}} \\ \frac{\left(\frac{G_s(p)}{G_{white\,level}}\right)^\gamma \cdot G_{white\,level}}{\left(\frac{G_c(p)}{G_{white\,level}}\right)^\gamma \cdot G_{white\,level}} \\ \frac{\left(\frac{B_s(p)}{B_{white\,level}}\right)^\gamma \cdot B_{white\,level}}{\left(\frac{B_c(p)}{B_{white\,level}}\right)^\gamma \cdot B_{white\,level}} \end{bmatrix} = \begin{bmatrix} \left(\frac{R_s(p)}{R_c(p)}\right)^\gamma \\ \left(\frac{G_s(p)}{G_c(p)}\right)^\gamma \\ \left(\frac{B_s(p)}{B_c(p)}\right)^\gamma \end{bmatrix}$$

$$= \begin{bmatrix} \left(\frac{E_{R_s}(p) \cdot \rho_R(p)}{E_{R_c}(p) \cdot \rho_R(p)}\right)^\gamma \\ \left(\frac{E_{G_s}(p) \cdot \rho_G(p)}{E_{G_c}(p) \cdot \rho_G(p)}\right)^\gamma \\ \left(\frac{E_{B_s}(p) \cdot \rho_B(p)}{E_{B_c}(p) \cdot \rho_B(p)}\right)^\gamma \end{bmatrix} = \begin{bmatrix} \left(\frac{E_{R_s}(p)}{E_{R_c}(p)}\right)^\gamma \\ \left(\frac{E_{G_s}(p)}{E_{G_c}(p)}\right)^\gamma \\ \left(\frac{E_{B_s}(p)}{E_{B_c}(p)}\right)^\gamma \end{bmatrix} = Ko^\gamma$$

[Math 47]

Therefore, the ratio K after exposure correction due to the difference in the image-capturing environments is represented as the following equation by using gamKo.

$$K = Ko \cdot \exp CV = (gamKo)^{\frac{1}{\gamma}} \cdot \exp CV$$ [Math 48]

The equation (Math 41) of the simplified process of the gamma correction process regarding gamI is solved with respect to I and is substituted in each determination equation, it is possible to make a determination as to a blackout condition, saturation, and a moving subject when the image after gamma correction is used as an input. Furthermore, when the image after gamma correction is used as an input, "nonlinear conversion in the form of upwardly convex" has already been applied to the RGB value. Consequently, it follows that nonlinear conversion has been performed also on the luminance L represented by the linear sum thereof. Therefore, in the illumination component conversion process in which the image after gamma correction is used as an input image, it is possible to omit the process in the nonlinear conversion unit 522 (FIG. 26). Finally, the output of the illumination component conversion processing unit 120 is a signal equivalent to the output result of the gamma correction processing unit 160 in FIG. 2.

As described above, according to the eighth embodiment of the present invention, even in a case where an image on which a gamma correction process has been performed is used as the reference image and the processing target image, it is possible to generate an image having high color reproducibility.

Ninth Embodiment

In the third or fourth embodiment, during edge preservation smoothing, a luminance is calculated from an RGB value in accordance with a fixed coefficient and then nonlinear conversion is performed. In a ninth embodiment of the present invention, it is assumed that the luminance is calculated by performing multiple regression analysis after the RGB value is subjected to nonlinear conversion.

[Example of Processing Functions of Smoothing Processing Unit 480]

Figure 48:
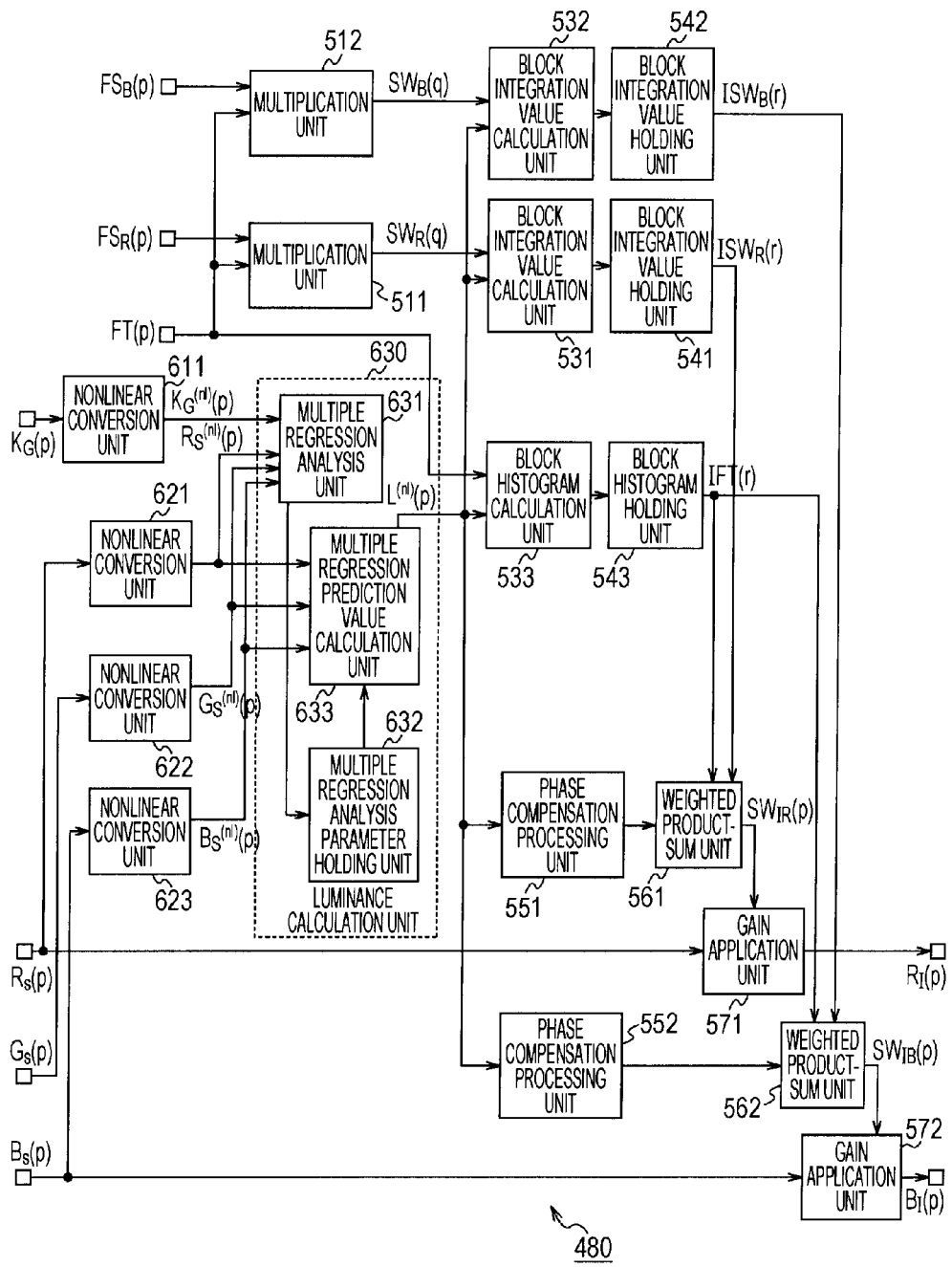
FIG. 48 illustrates an example of processing functions of a smoothing processing unit 480 in the embodiment of the present invention.

FIG. 48 illustrates an example of processing functions of a smoothing processing unit 480 in the ninth embodiment of the present invention. The example of the processing functions of the smoothing processing unit 480 includes nonlinear conversion units 611 and 621 to 623 and a luminance calculation unit 630 in place of the luminance calculation unit 521 and the nonlinear conversion unit 522 in the third embodiment shown in FIG. 26.

The nonlinear conversion unit 611 performs a nonlinear conversion on the intensity ratio $K_G(p)$ of the G channel and outputs a nonlinear intensity ratio $K_G^{(nl)}(p)$. The nonlinear conversion unit 621 to 623 perform a nonlinear conversion on each of the RGB values $R_s(p)$, $G_s(p)$, and $B_s(p)$ of the processing target image $I_s(p)$, and output nonlinear RGB values $R_s^{(nl)}(p)$, $G_s^{(nl)}(p)$, and $B_s^{(nl)}(p)$. Similarly to the nonlinear conversion unit 522, it is useful for the nonlinear conversion units 611 and 621 to 623 to apply, for example, "monotonously increasing characteristics in the form of an upwardly convex", such as a γ curve, exponentiation characteristic using an exponentiation smaller than 1, or logarithm conversion. Here, the reason why nonlinear conversion is performed is to improve the accuracy for a straight line model by changing the distribution of the pixel values. Furthermore, there are advantages that the correlation between the intensity ratio $K_G(p)$ and the gain increases as a result of this nonlinear conversion, and the relationship between them becomes easy to understand. Meanwhile, in the present embodiment, the intensity ratio $K_G(p)$ is used as the input of the nonlinear conversion unit 611. Instead, $K_R(p)$, $K_B(p)$, $1/K_R(p)$, $1/K_G(p)$, or $1/K_B(p)$ may be used. Furthermore, the color conversion gain itself, that is, $FS_R(p)$ and $FS_R(p)$ may be used.

The luminance calculation unit 630 calculates a nonlinearly converted luminance value $L^{(nl)}(p)$ from the outputs of the nonlinear conversion units 611 and 621 to 623. The luminance calculation unit 521 in the third embodiment calculates the linear sum of the RGB values on the basis of a fixed coefficient. The luminance calculation unit 630 calculates a luminance value on the basis of the coefficient obtained in accordance with the image. As an example thereof, the luminance calculation unit 630 performs multiple regression analysis on the outputs of the nonlinear conversion units 611 and 621 to 623, and calculates a luminance value by using the obtained multiple regression analysis parameter as a coefficient. Meanwhile, here, because the luminance value is calculated from the nonlinearly converted value, the value differs from the luminance value in a strict sense. Similarly to the third embodiment, since an objective is to calculate a nonlinearly converted luminance value $L^{(nl)}(p)$ in the end, the value is handled as a luminance value in a wide sense. The luminance calculation unit 630 includes a multiple regression analysis unit 631, a multiple regression analysis parameter holding unit 632, and a multiple regression prediction value calculation unit 633.

The multiple regression analysis unit 631 performs multiple regression analysis on the outputs of the nonlinear conversion units 611 and 621 to 623. The multiple regression analysis unit 631 obtains multiple regression analysis parameters $CC_R$, $CC_G$, $CO_B$, and $CC_{Offset}$ that minimizes the values of the following equation. Here, $CC_R$, $CO_G$, and $CC_B$ are partial regression coefficients, and $CC_{offset}$ is a segment.

$$\Sigma(K_G^{(nl)}(p) - (CC_R \cdot R_s^{(nl)}(p) + CC_G \cdot G_s^{(nl)}(p) + CC_B \cdot B_s^{(nl)}(p) + CC_{Offset}))^2$$

That is, here, multiple regression analysis in which $R_s^{(nl)}(p)$, $G_s^{(nl)}(p)$, and $B_s^{(nl)}(p)$ are explanatory varieties, and $K_G^{(nl)}(p)$ is an object variate is performed. Meanwhile, it is assumed in this example that one set of multiple regression analysis parameters are obtained with respect to the entire one screen. Alternatively, a multiple regression analysis parameter is obtained for each small area, which is a portion of the screen. Furthermore, here, multiple regression analysis is performed by using all the channels of RGB. Alternatively, multiple regression analysis may be performed by using only a specific channel, and multiple regression analysis may be performed by fixing $CC_{offset}$ to 0.

The multiple regression analysis parameter holding unit 632 is a memory for holding the multiple regression analysis parameters $CC_R$, $CC_G$, $CC_B$, and $CC_{offset}$, which are obtained by the multiple regression analysis unit 631. The multiple regression analysis parameters held in the multiple regression analysis parameter holding unit 632 are supplied to the multiple regression prediction value calculation unit 633.

The multiple regression prediction value calculation unit 633 calculates the nonlinearly converted luminance value $L^{(nl)}(p)$ as a multiple regression prediction value in accordance with the multiple regression analysis parameters held in the multiple regression analysis parameter holding unit 632. The multiple regression prediction value calculation unit 633 calculates the luminance value $L^{(nl)}(p)$ that is nonlinearly converted in accordance with the following equation.

$$L^{(nl)}(p) = CC_R \cdot R_S^{(nl)}(p) + CC_G \cdot G_S^{(nl)}(p) + CC_B \cdot B_S^{(nl)}(p) + CC_{Offset}$$

Since the nonlinearly converted luminance value $L^{(nl)}(p)$, which is obtained in the manner described above, is obtained from only the pixel values of the processing target image, the nonlinearly converted luminance value $L^{(nl)}(p)$ has characteristics such that it is difficult to be affected by the moving subject. Furthermore, since this nonlinearly converted luminance value $L^{(nl)}(p)$ has the same property as that in the case of the third embodiment, the description of the other configuration is omitted.

[Example of Processing Functions of Smoothing Processing Unit 480]

Figure 49:
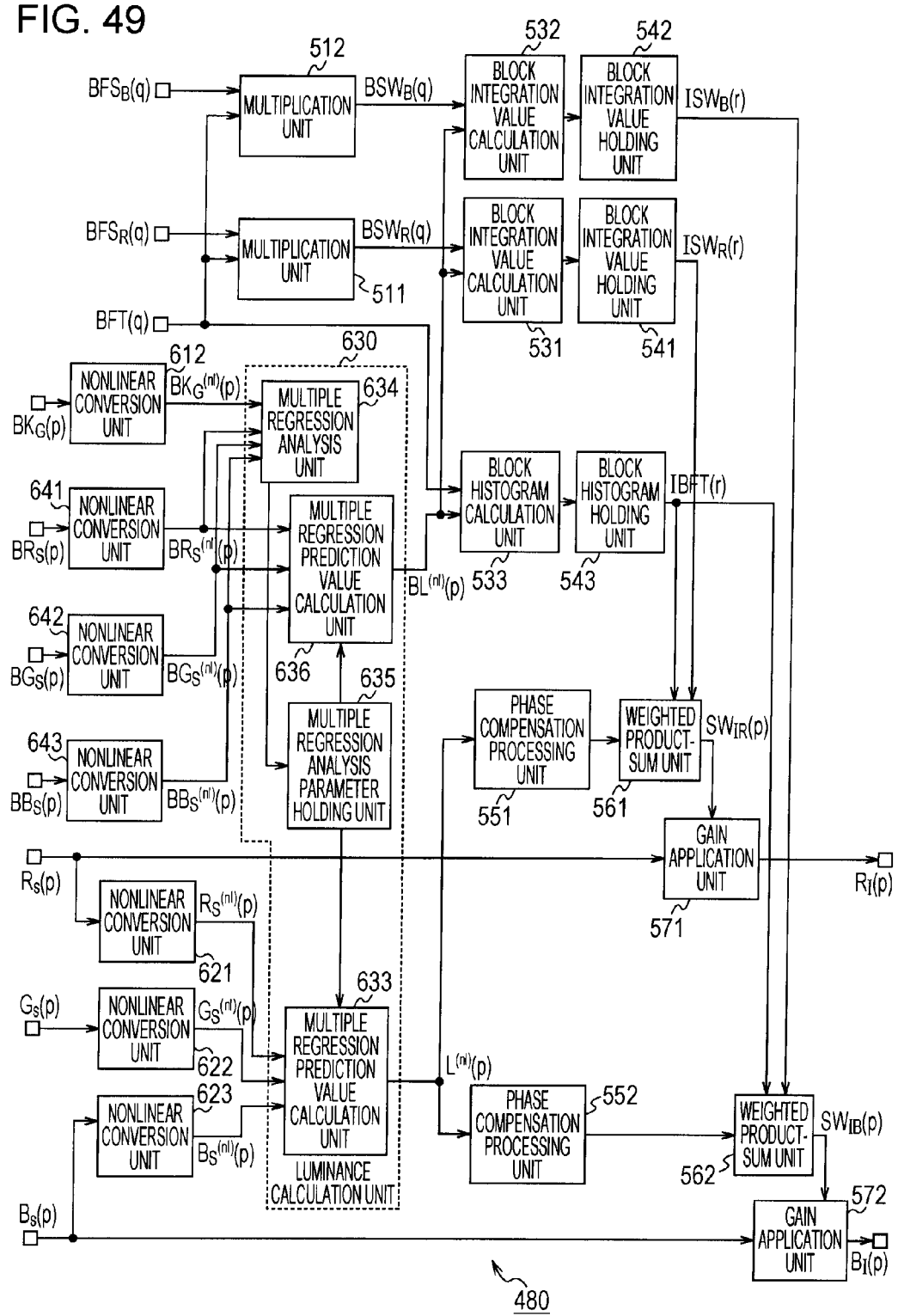
FIG. 49 illustrates another example of the processing functions of a smoothing processing unit 480 in the embodiment of the present invention.

FIG. 49 illustrates another example of processing functions of the smoothing processing unit 480 in the ninth embodiment of the present invention. The other example of processing functions of the smoothing processing unit 480 includes nonlinear conversion units 612 and 621 to 623 and 641 to 643 and a luminance calculation unit 630 in place of the luminance calculation unit 523 and the nonlinear conversion unit 524 in the fourth embodiment shown in FIG. 36. As described above, the fourth embodiment includes a process for performing a resolution conversion on an input image and making a comparison in the third embodiment, and has the same relationship also in the example of FIG. 48 and in the example of FIG. 49.

The nonlinear conversion unit 612 performs nonlinear conversion on the intensity ratio $BK_G(p)$ of the G channel of the reduced image and outputs a nonlinear intensity ratio $BK_G^{(nl)}(p)$. The nonlinear conversion units 621 to 623, as described above, perform nonlinear conversion on each of the RGB values $R_s(p)$, $G_s(p)$, and $B_s(p)$ of the processing target image $I_s(p)$, and output nonlinear RGB values $R_s^{(nl)}(p)$, $G_s^{(nl)}(p)$, and $B_s^{(nl)}(p)$. The nonlinear conversion units 641 to 643 perform nonlinear conversion on each of the RGB values $BR_s(p)$, $BG_s(p)$, and $BB_s(p)$ of the reduced image, and output nonlinear RGB values $BR_s^{(nl)}(p)$, $BG_s^{(nl)}(p)$, and $BB_s^{(nl)}(p)$. Similarly to the nonlinear conversion unit 522, it is useful for the nonlinear conversion units 612 and 621 to 623 and 641 to 643 to apply, for example, "monotonously increasing characteristics in the form of an upwardly convex", such as a γ curve, exponentiation characteristic using an exponentiation smaller than 1, or logarithm conversion.

The luminance calculation unit 630 calculates a nonlinearly converted luminance value $L^{(nl)}(p)$ from the outputs of the nonlinear conversion units 611 and 621 to 623 and 641 to 643. The luminance calculation unit 630 calculates a luminance value on the basis of the coefficient obtained in accordance with the reduced image. The luminance calculation unit 630 includes a multiple regression analysis unit 634, a multiple regression analysis parameter holding unit 635, and multiple regression prediction value calculation units 633 and 636.

The multiple regression analysis unit 634 performs multiple regression analysis on the outputs of the nonlinear conversion units 612 and 641 to 643. The multiple regression analysis unit 634 is the same as the multiple regression analysis unit 631 described using the example of FIG. 48 except that the analysis target is based on a reduced image.

The multiple regression analysis parameter holding unit 635 is a memory for holding multiple regression analysis parameters $CC_R$, $CC_G$, $CC_B$, and $CC_{Offset}$, which are obtained by the multiple regression analysis unit 634. The multiple regression analysis parameters held in the multiple regression analysis parameter holding unit 635 are supplied to the multiple regression prediction value calculation units 633 and 636.

The multiple regression prediction value calculation unit 633 calculates the nonlinearly converted luminance value $L^{(nl)}(p)$ as a multiple regression prediction value in accordance with the multiple regression analysis parameters held in the multiple regression analysis parameter holding unit 635. Furthermore, the multiple regression prediction value calculation unit 636 calculates the nonlinearly converted luminance value $BL^{(nl)}(p)$ of the reduced image as a multiple regression prediction value in accordance with the multiple regression analysis parameters held in the multiple regression analysis parameter holding unit 635. In the multiple regression prediction value calculation units 633 and 636, the same multiple regression analysis parameters are used.

[Example of Operation]

Figure 50:
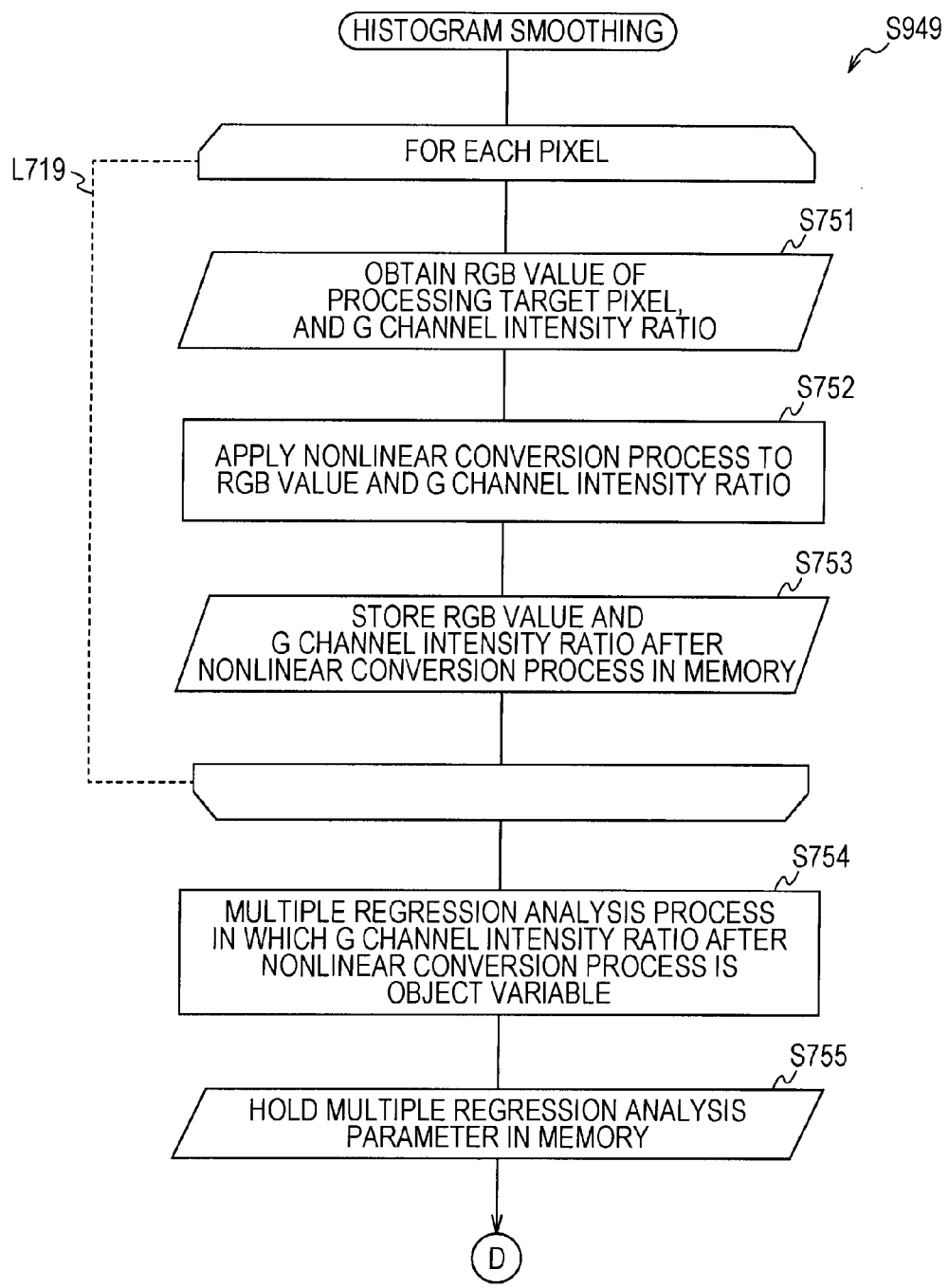
FIG. 50 illustrates a first half of an example of the operation of the smoothing processing unit 480 in a ninth embodiment of the present invention, which corresponds to the example of the processing functions of FIG. 48.
Figure 51:
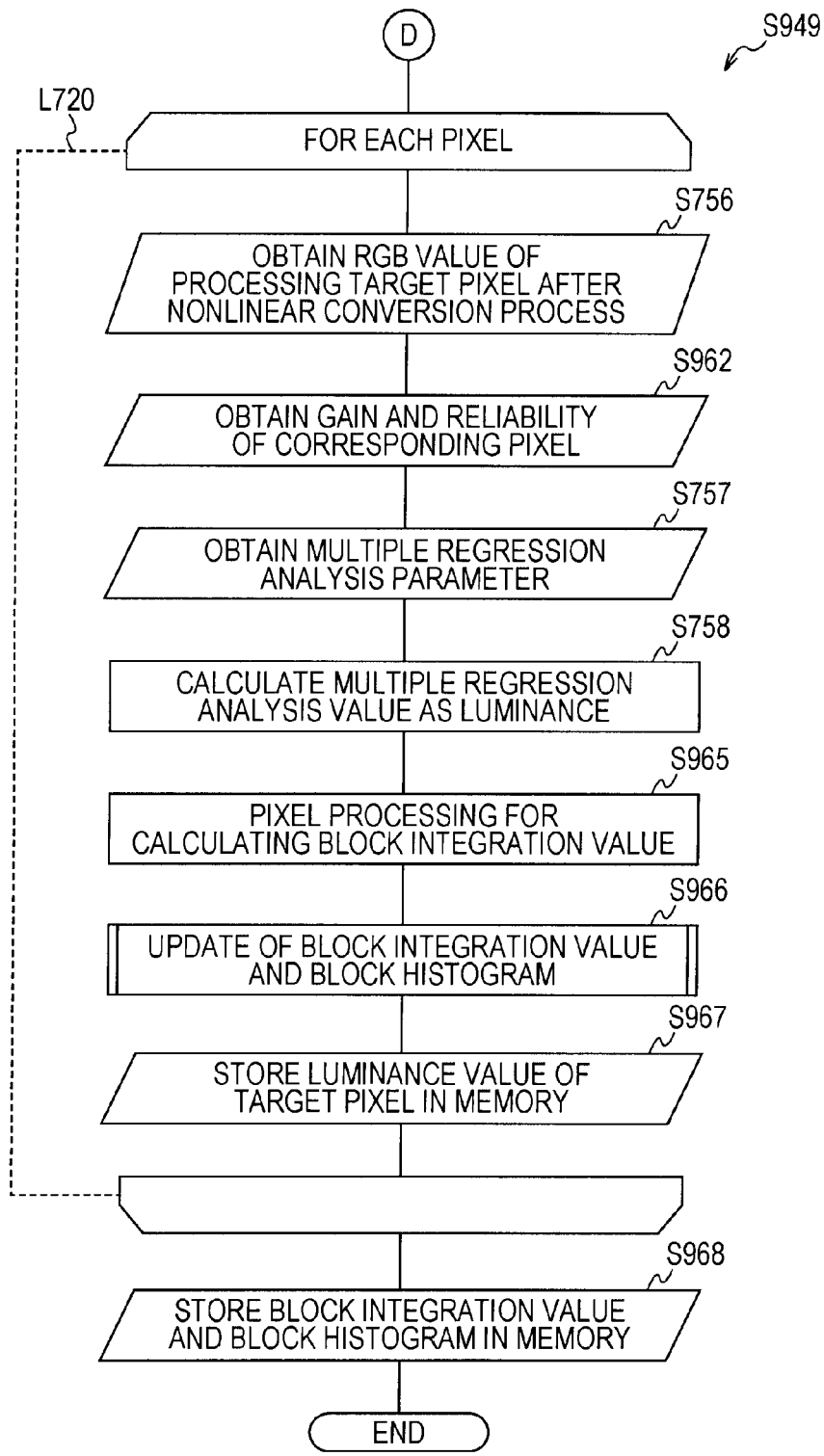
FIG. 51 illustrates a second half of the example of the operation of the smoothing processing unit 480 in the ninth embodiment of the present invention, which corresponds to the example of the processing functions of FIG. 48.

FIGS. 50 and 51 illustrate an example of the operation of the smoothing processing unit 480 in the ninth embodiment of the present invention, which corresponds to the example of the processing functions of FIG. 48. Meanwhile, here, the same processes as those of FIG. 30 are designated with the same reference numerals.

Here, first, the processing of steps S751 to S753 is repeated by using each pixel as a target (loop L719). In the loop L719, the RGB values of the processing target image and the intensity ratio of the G channel are obtained (step S751). The RGB values and the intensity ratio are nonlinearly converted in the nonlinear conversion units 611 and 621 to 623 (step S752). The nonlinearly converted RGB values and the intensity ratio are stored in a memory (not shown) (step S753).

When a nonlinear conversion process is performed on each pixel, in the multiple regression analysis unit 631, multiple regression analysis in which $R_s^{(nl)}(p)$, $G_s^{(nl)}(p)$, and $B_s^{(nl)}(p)$ are explanatory varieties, and $K_G^{(nl)}(p)$ is an object variate is performed (step S754). As a result, the multiple regression analysis parameters obtained by the multiple regression analysis are held in the multiple regression analysis parameter holding unit 632 (step S755).

When the multiple regression analysis parameters are obtained by the multiple regression analysis, the processing of steps S756 to S967 is repeated by using each pixel as a target (loop L720). In the loop L720, the RGB values after the nonlinear conversion process of the processing target image are obtained (step S756). Furthermore, the gains $FS_R(p)$ and $FS_B(p)$ and the reliability $FT(p)$ of the corresponding pixel are obtained (step S962). In addition, the multiple regression analysis parameters held in the multiple regression analysis parameter holding unit 632 are obtained (step S757). Then, in the multiple regression prediction value calculation unit 633, the multiple regression prediction value is calculated as a nonlinearly converted luminance value $L^{(nl)}(p)$ (step S758). The subsequent processing is the same as that described with reference to FIG. 31 and accordingly, the description thereof is omitted.

Figure 52:
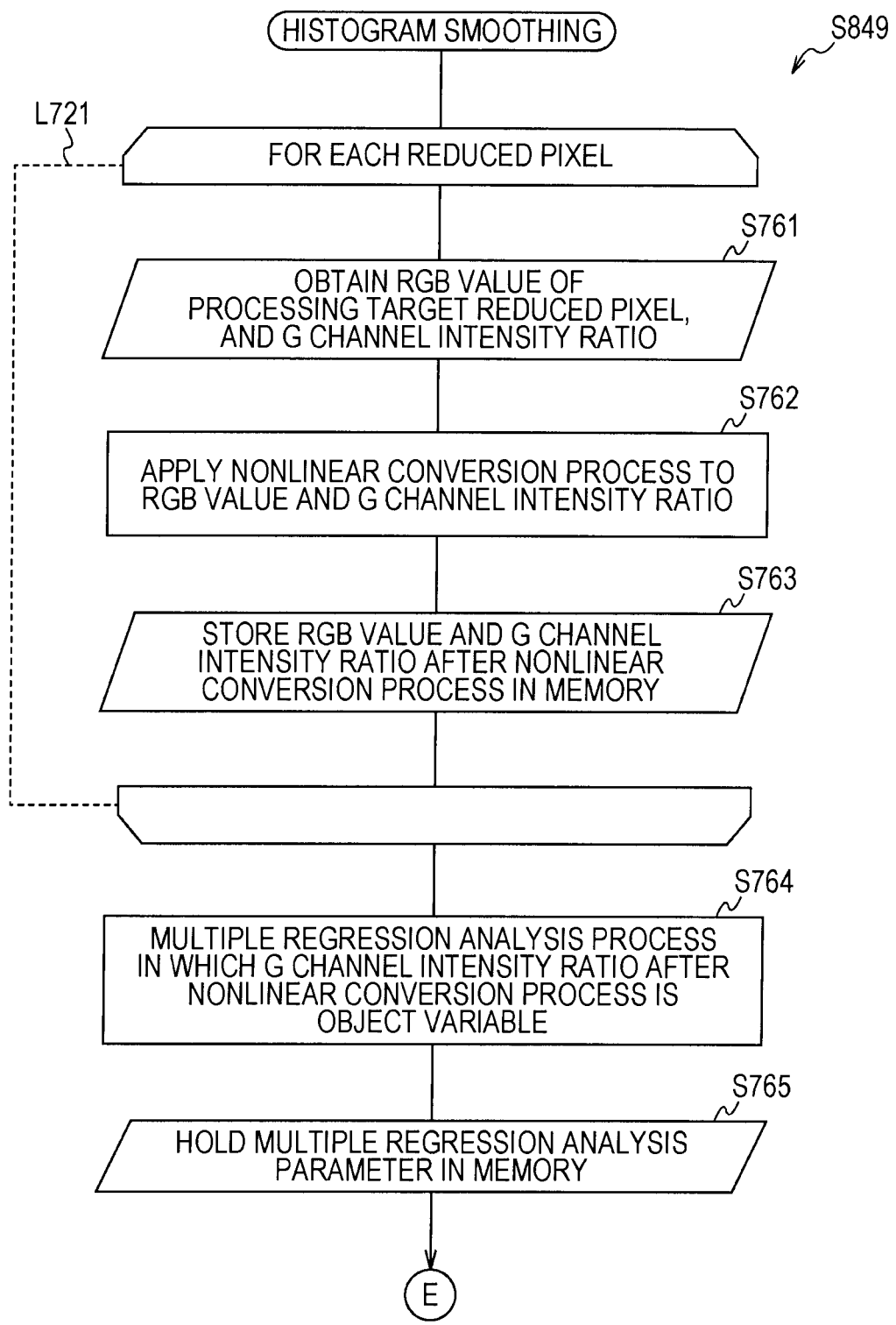
FIG. 52 illustrates a first example of the operation of the smoothing processing unit 480 in the ninth embodiment of the present invention, which corresponds to the example of the processing functions of FIG. 49.
Figure 53:
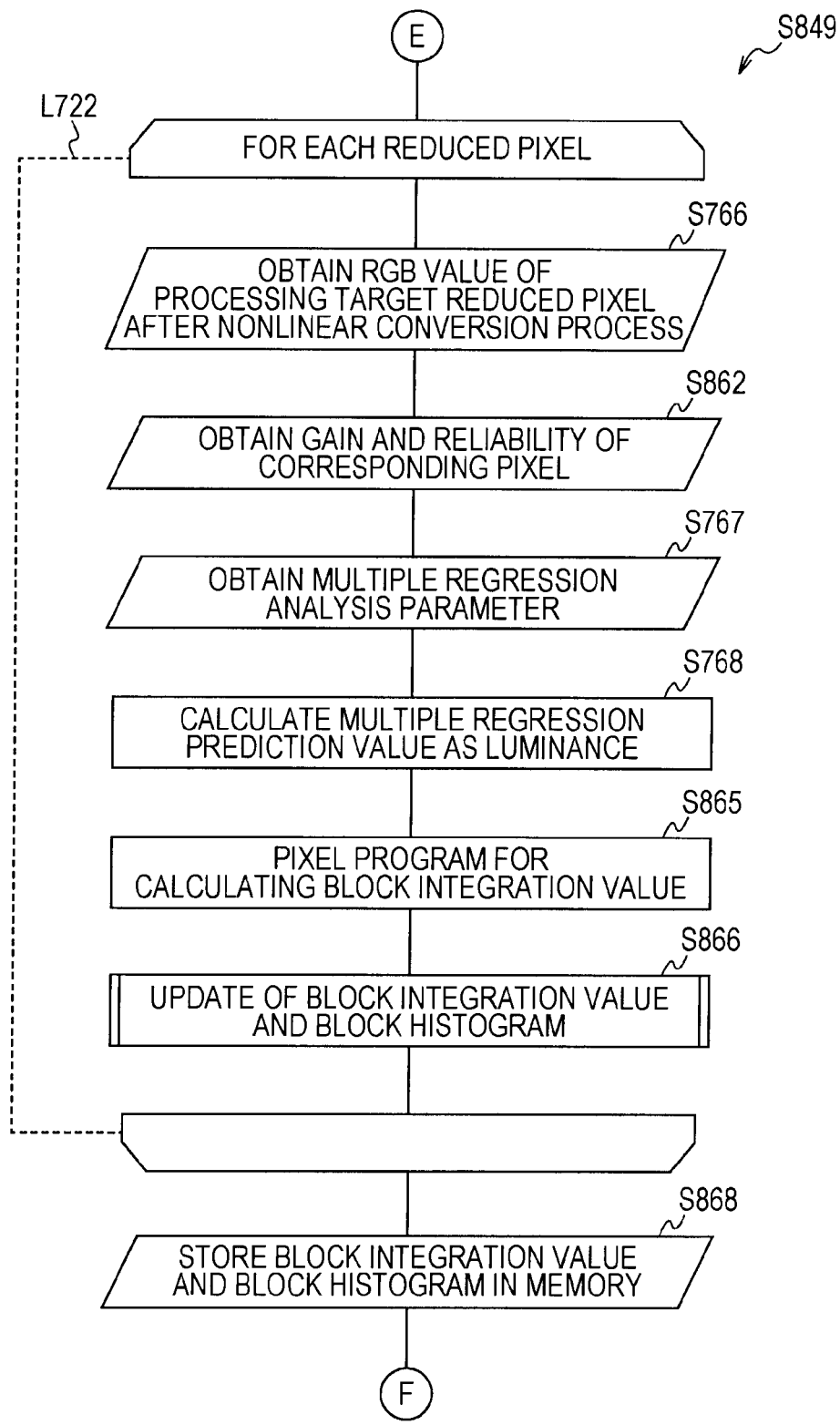
FIG. 53 illustrates a second example of the operation of the smoothing processing unit 480 in the ninth embodiment of the present invention, which corresponds to the example of the processing functions of FIG. 49.
Figure 54:
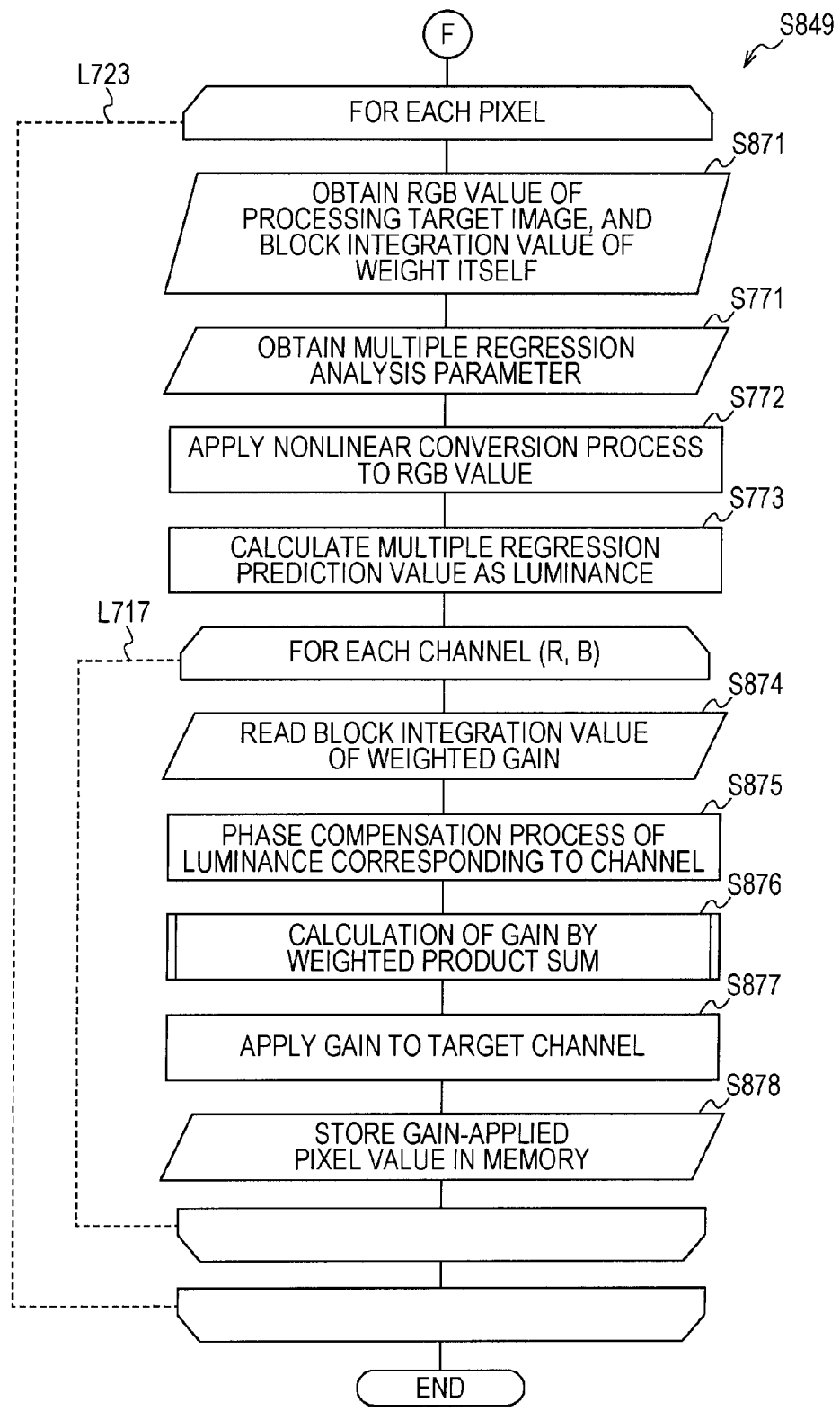
FIG. 54 illustrates a third example of the operation of the smoothing processing unit 480 in the ninth embodiment of the present invention, which corresponds to the example of the processing functions of FIG. 49.

FIGS. 52 to 54 illustrate an example of the operation of the smoothing processing unit 480 in the ninth embodiment of the present invention, which corresponds to the example of the processing functions of FIG. 49. The example of the operation is basically the same as the example of the operation corresponding to the example of processing functions of FIG. 48, which are described with reference to FIGS. 50 and 51. However, the image used for the calculation of the block integration value is a reduced image. That is, the gains $BFS_R(q)$ and $BFS_B(q)$ of the reduced image and the reliability $BFT(q)$ based on the reduced image are input to the multiplication units 511 and 512. Furthermore, the intensity ratio $BK_G(p)$ of the reduced image, and the reduced processing target images $BR_s(q)$, $BG_s(q)$, and $BB_s(q)$ are input to the nonlinear conversion units 612 and 641 to 643. Furthermore, the size of the processing target images that are weighted-summed are maintained as is.

Here, first, the processing of steps S761 to S763 is repeated by using each pixel of the reduced image as a target (loop L721). The processing content of steps S761 to S763 is the same as the processing of steps S751 to S753 described above and thus, the description thereof herein is omitted. Furthermore, the processing content of steps S764 and S765, which follow the above, is the same as the processing of steps S754 and S755 described above and thus, the description thereof is omitted.

When the multiple regression analysis parameters are obtained by the multiple regression analysis, the processing of steps S766 to S866 is repeated by using each pixel of the reduced image as a target (loop L722). Meanwhile, here, the same processes as those of FIG. 39 are designated with the same reference numerals. The processing content of steps S766 to S866 in the loop L722 is the same as the processing of steps S756 to S5966 described above and thus, the description thereof herein is omitted.

On the other hand, the image that is weighted-summed is not a reduced image but a processing target image. Therefore, in the loop L723, each process is repeated by using each pixel of the processing target image as a target. In the loop L723, the RGB values of the processing target image and the block integration value of the weight itself are obtained (step S871). In addition, the multiple regression analysis parameters held in the multiple regression analysis parameter holding unit 632 are obtained (step S771). The RGB values are nonlinearly converted in the nonlinear conversion units 621 to 623 (step S772). Then, in the multiple regression prediction value calculation unit 633, the multiple regression prediction value is calculated as a nonlinearly converted luminance value $L^{(nl)}(p)$ (step S773). Since the subsequent processing is the same as that described in FIG. 40, the description thereof herein is omitted.

As described above, according to the ninth embodiment of the present invention, when edge preservation type smoothing using a block integration value is to be performed, it is possible to perform smoothing in the luminance direction by using a luminance corresponding to an image.

Tenth Embodiment

In the above-mentioned third or fourth embodiment, when edge preservation smoothing is to be performed, smoothing is performed on the basis of a histogram of the surroundings of a position and a luminance. In the tenth embodiment of the present invention, it is assumed that smoothing is performed by using a rough gain itself for weighted product sum.

[Example of Processing Functions of Smoothing Processing Unit 480]

Figure 55:
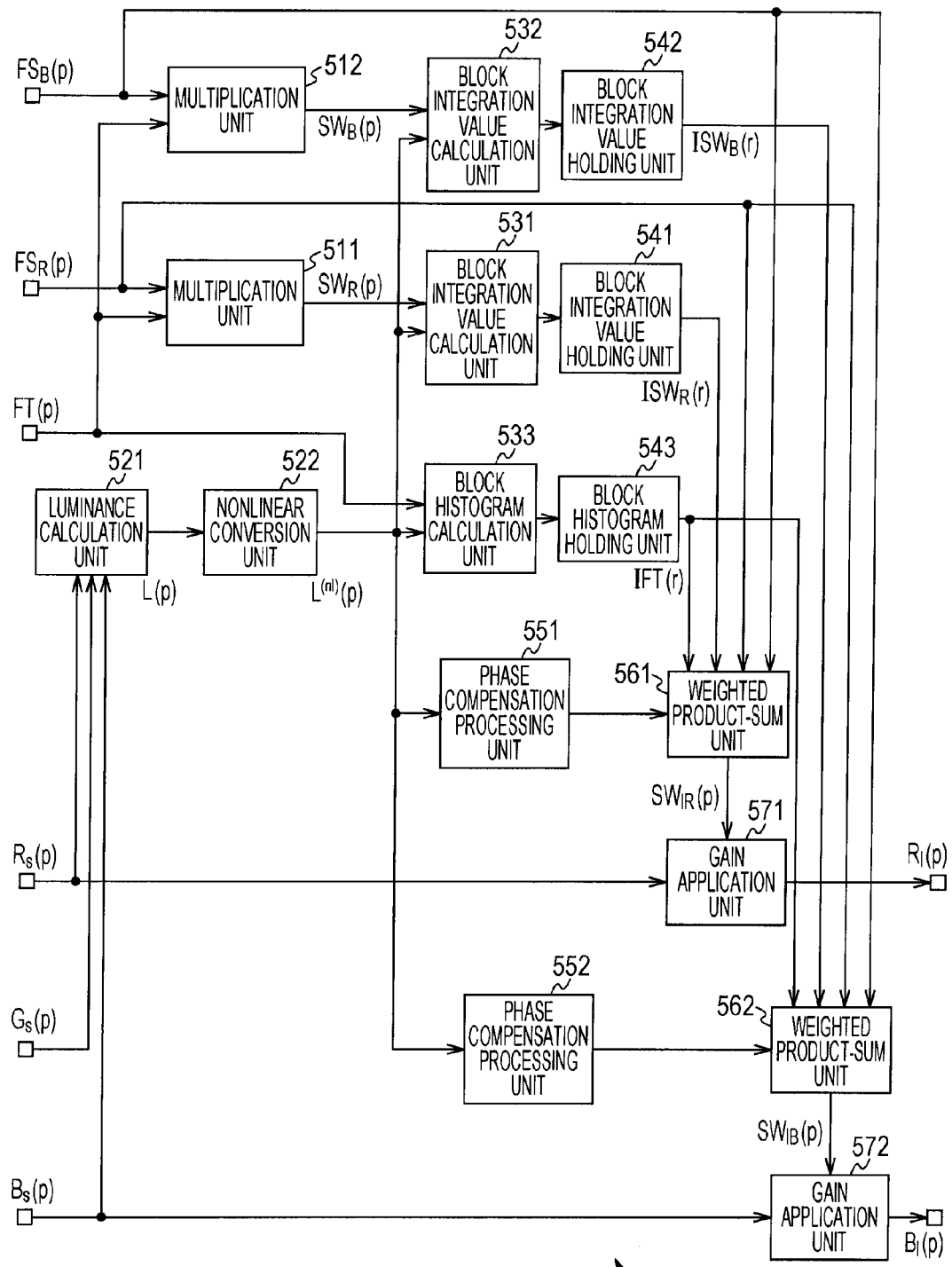
FIG. 55 illustrates an example of processing functions of the smoothing processing unit 480 in a tenth embodiment of the present invention.

FIG. 55 illustrates an example of processing functions of the smoothing processing unit 480 in the tenth embodiment of the present invention. In the example of the processing functions of the smoothing processing unit 480, furthermore, gains $FS_R(p)$ and $FS_B(p)$ are input to weighted product-sum units 561 and 562 in the third embodiment shown in FIG. 26. In the weighted product-sum units 561 and 562, by comparing the gains $FS_R(p)$ and $FS_B(p)$ at the position p with the average gains $HSW_R(r)$ and $HSW_B(r)$ of the coordinate r corresponding to the position p and the luminance value $L^{(nl)}(p)$, a weight for weighted product sum is calculated.

[Example of Configuration of Weighted Product-Sum Units 561 and 562]

Figure 56:
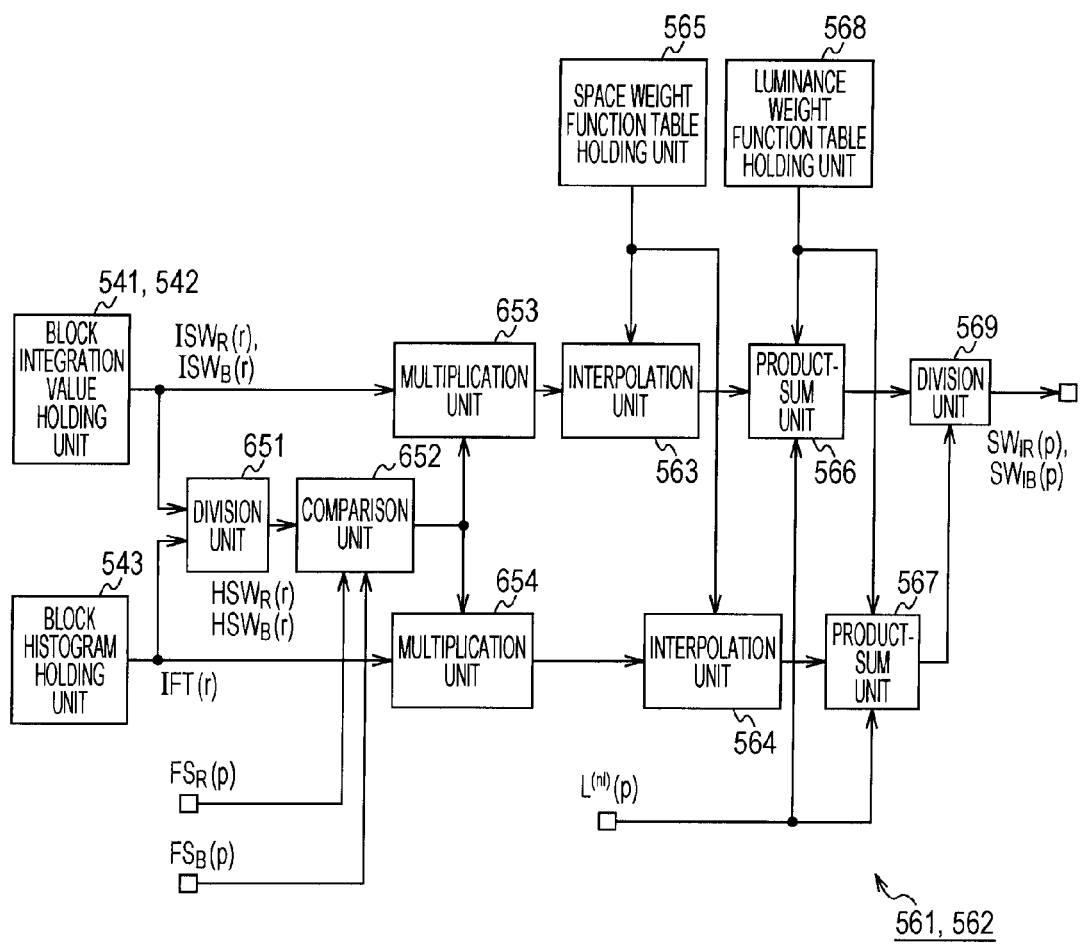
FIG. 56 illustrates an example of the configuration of weighted product-sum units 561 and 562 in the tenth embodiment of the present invention.

FIG. 56 illustrates an example of the configuration of the weighted product-sum units 561 and 562 in the tenth embodiment of the present invention. Each of the weighted product-sum units 561 and 562 includes a configuration in which a division unit 651, a comparison unit 652, and multiplication units 653 and 654 are provided at a stage preceding the interpolation units 563 and 564 in the third embodiment shown in FIG. 28.

The division unit 651 divides, for each coordinate r, the block integration values $ISW_R(r)$ and $ISW_B(r)$ held in the block integration value holding units 541 and 542 by the block histogram $IFT(r)$ held by the block histogram holding unit 543. As a result, the average white balance at the coordinate r is calculated. Meanwhile, the block integration value and the block histogram are discretized with respect to the spatial position and the luminance. The coordinate r indicates the three-dimensional coordinate $(i, j, \lambda)$ of the spatial position i, j and the luminance λ. $HSW_R(r)$ and $HSW_B(r)$ that are calculated by the division unit 651 are obtained in accordance with the following equation.

$$HSW_R(r)=ISW_R(r)/IFT(r)$$

$$HSW_B(r)=ISW_B(r)/IFT(r)$$

Meanwhile, the division unit 651 is an example of the first division unit described in the Claims.

The comparison unit 652 compares the gains $FS_R(p)$ and $FS_B(p)$ at the position p of the processing target image with the average gains $HSW_R(r)$ and $HSW_B(r)$ of the coordinate r of the block corresponding to the position p, thereby calculating the weight θ of weighted product sum. This weight θ indicates a value in the range of 1 to 0 in accordance with the value of ΔMax(r) as in FIG. 57. ΔMax(r) means the larger of absR and absB. Meanwhile, ABS is a function indicating an absolute value.

$$\Delta Max(r)=max(absR,absB)$$

$$absR=ABS(FS_R(p)-HSW_R(r))/SWUNIT_R$$

$$absB=ABS(FS_B(p)-HSW_B(r))/SWUNIT_B$$

Here, $SWUNIT_R$ and $SWUNIT_B$ are defined in accordance with the following equation.

$$SWUNIT_R=ABS(\text{gain upper limit value}_R-\text{gain lower limit value}_R)$$

$$SWUNIT_B=ABS(\text{gain upper limit value}_B-\text{gain lower limit value}_B)$$

The gain upper limit value and the gain lower limit value are the same as those shown in Math 5 and Math 6. By dividing the difference of the average gains by SWUNIT, the difference between the gain and the average gain is normalized to a range of 0.0 to 1.0. Since the gain of each pixel is clipped by the upper limit value and the lower limit value, the range of the absolute value of the difference is from the 0 to "upper limit value−lower limit value". Furthermore, as a result of this normalization, the difference between R and B can be compared so as to set the larger one as ΔMax(r).

Meanwhile, here, ΔMax(r) is set to the large one of absR and absB, and the weight θ is obtained as a weight common to the R channel and the B channel. Alternatively, absR and absB may be handled individually, and weights $θ_R$ and θB independent of the R channel and the B channel may be obtained. In this case, the weighted gain $SW_R(r)$ or $SW_B(r)$ of the block area is calculated for each of the R channel and the B channel.

Figure 57:
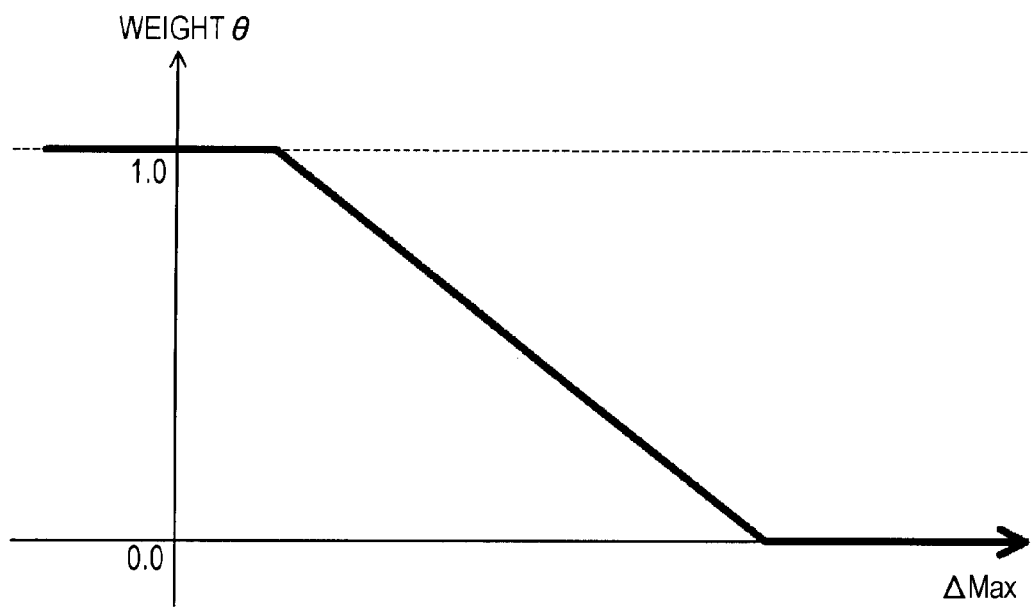
FIG. 57 illustrates an example of the calculation of a weight θ of weighted product sum in the tenth embodiment of the present invention.

Furthermore, in this example, the relationship between the weight θ and ΔMax(r) is assumed as in FIG. 57, but is not limited to this example. It is sufficient that the relationship has characteristics such that the weight θ monotonously decreases with an increase in ΔMax(r).

The multiplication unit 653 multiplies, for each coordinate r, the block integration values $ISW_R(r)$ and $ISW_R(r)$ held in the block integration value holding units 541 and 542 by the weight θ calculated by the comparison unit 652. Furthermore, the multiplication unit 654 multiplies, for each coordinate r, the block histogram IFT(r) held in the block histogram holding unit 543 by the weight θ calculated by the comparison unit 652. The multiplication result by the multiplication unit 653 is supplied to the interpolation unit 563, and the multiplication result by the multiplication unit 654 is supplied to the interpolation unit 564. Meanwhile, the multiplication unit 653 is an example of the first multiplication unit described in the Claims. Furthermore, multiplication unit described in the Claims.

Although the configuration subsequent to the interpolation units 563 and 564 is the same as that in FIG. 28, as a result of the weight θ being multiplied in the manner described above, the values obtained in the following manner differ. First, the interpolation unit 563 interpolates the input from the multiplication unit 653 in accordance with the value ω(r, p) of the space weight function table held in the space weight function table holding unit 565. As a result, the interpolation unit 563 outputs the following values.

$$\Sigma \omega(i,j,p) \cdot \theta(\Delta Max(i,j,\lambda)) \cdot ISW_R(i,j,\lambda)$$

$$\Sigma \omega(i,j,p) \cdot \theta(\Delta Max(i,j,\lambda)) \cdot ISW_B(i,j,\lambda)$$

Here, the coordinate r is developed to a three-dimensional coordinate (i, j, λ) of the spatial position i, j and the luminance λ. Furthermore, the computation Σ is assumed herein to perform the summation for the spatial position i, j.

The interpolation unit 564 interpolates input from the multiplication unit 654 in accordance with the value ω(r, p) of the space weight function table held in the space weight function table holding unit 565. As a result, the following value are output.

$$\Sigma \omega(i,j,p) \cdot \theta(\Delta Max(i,j,\lambda)) \cdot IFT(i,j,\lambda)$$

The computation Σ is assumed herein to perform the summation for the spatial position i, j.

The product-sum unit 566 calculates the result in which the luminance weighted values are weighted-summed with respect to the output of the interpolation unit 563. The luminance weighted value is calculated by using the value ψ(λ, $L^{(nl)}(p)$) of the table stored in the luminance weight function table holding unit 568. The product-sum unit 566 outputs the following values.

$$\Sigma(\psi(\lambda,L^{(nl)}(p)) \cdot \omega(i,j,p) \cdot \theta(\Delta Max(i,j,\lambda)) \cdot ISW_R(i,j,\lambda)$$

$$\Sigma(\psi(\lambda,L^{(nl)}(p)) \cdot \omega(i,j,p) \cdot \theta(\Delta Max(i,j,\lambda)) \cdot ISW_B(i,j,\lambda)$$

The computation Σ is assumed herein to perform summation for the spatial position i, j and the luminance λ.

The product-sum unit 567 calculates the result in which the luminance weighted value is weighted-summed with respect to the output of the interpolation unit 564. The luminance weighted value is calculated by using the value ψ(λ, $L^{(nl)}(p)$) of the table stored in the luminance weight function table holding unit 568. The product-sum unit 567 outputs the following value.

$$\Sigma(\psi(\lambda,L^{(nl)}(p)) \cdot \omega(i,j,p) \cdot \theta(\Delta Max(i,j,\lambda)) \cdot IFT(i,j,\lambda))$$

The computation Σ is assumed herein to perform the summation for the spatial position i, j and the luminance λ.

The division unit 569 divides the output of the product-sum unit 566 by the output of the product-sum unit 567. That is, the division unit 569 outputs the following values.

$$SW_{IR}(p) = \frac{\sum_{i,j,\lambda}(\psi(\lambda,L^{nl}(p)) \cdot \omega(i,j,p) \cdot \theta(\Delta Max(i,j,\lambda)) \cdot ISW_R(i,j,\lambda)}{\sum_{i,j,\lambda}(\psi(\lambda,L^{nl}(p)) \cdot \omega(i,j,p) \cdot \theta(\Delta Max(i,j,\lambda)) \cdot IFT_R(i,j,\lambda))} \quad \text{[Math 49]}$$

$$SW_{IB}(p) = \frac{\sum_{i,j,\lambda} (\psi(\lambda, L^{nl}(p)) \cdot \omega(i, j, p) \cdot \theta(\Delta \text{Max}(i, j, \lambda)) \cdot ISW_B(i, j, \lambda))}{\sum_{i,j,\lambda} (\psi(\lambda, L^{nl}(p)) \cdot \omega(i, j, p) \cdot \theta(\Delta \text{Max}(i, j, \lambda)) \cdot IFT(i, j, \lambda))}$$

Here, when a comparison with the third embodiment is performed, in the tenth embodiment, an equation corresponding to Math 25 is as in the following.

$$SW_{TLF}(p_c) = \frac{\sum_{p \in \Omega} [\omega(p - p_c) \cdot \psi(I(p) - (I(p_c)) \cdot \theta(FS(p) - FS(p_c)) \cdot \tau(p) \cdot S(p)]}{\sum_{p \in \Omega} [\omega(p - p_c) \cdot \psi(I(p) - (I(p_c)) \cdot \theta(FS(p) - FS(p_c)) \cdot \tau(p)]} \quad \text{[Math 50]}$$

When this is discretized and approximated, the following equation corresponding to Math 24 is obtained.

$$SW_{TLF}(p_c) = \frac{\sum_{i,j,\lambda} \left[\omega(i, j, p_c) \cdot \left(\psi(\lambda, I(p_c)) \cdot \theta\left[\frac{ISW(i, j, \lambda)}{IFT(i, j, \lambda))}, FS(p_c)\right] \cdot ISW(i, j, \lambda)\right)\right]}{\sum_{i,j,\lambda} \left[\omega(i, j, p_c) \cdot \left(\psi(\lambda, I(p_c)) \cdot \theta\left[\frac{ISW(i, j, \lambda)}{IFT(i, j, \lambda))}, FS(p_c)\right] \cdot IFT(i, j, \lambda)\right)\right]} \quad \text{[Math 51]}$$

That is, when the weighted addition average calculation of neighboring pixels is to be performed, whereas in the third embodiment, a weight is calculated on the basis of the spatial distance and the luminance difference, in the tenth embodiment, a weight is calculated with the further addition of the difference of the gain obtained for each pixel position. That is, in the tenth embodiment, a weight is calculated on the basis of the spatial distance, the luminance difference, and the difference of the gain obtained for each pixel position, and a weighted addition average of neighboring pixels is calculated. As a result, a more appropriate smoothing process can be realized.

[Another Example of Processing Functions of Smoothing Processing Unit 480]

Figure 58:
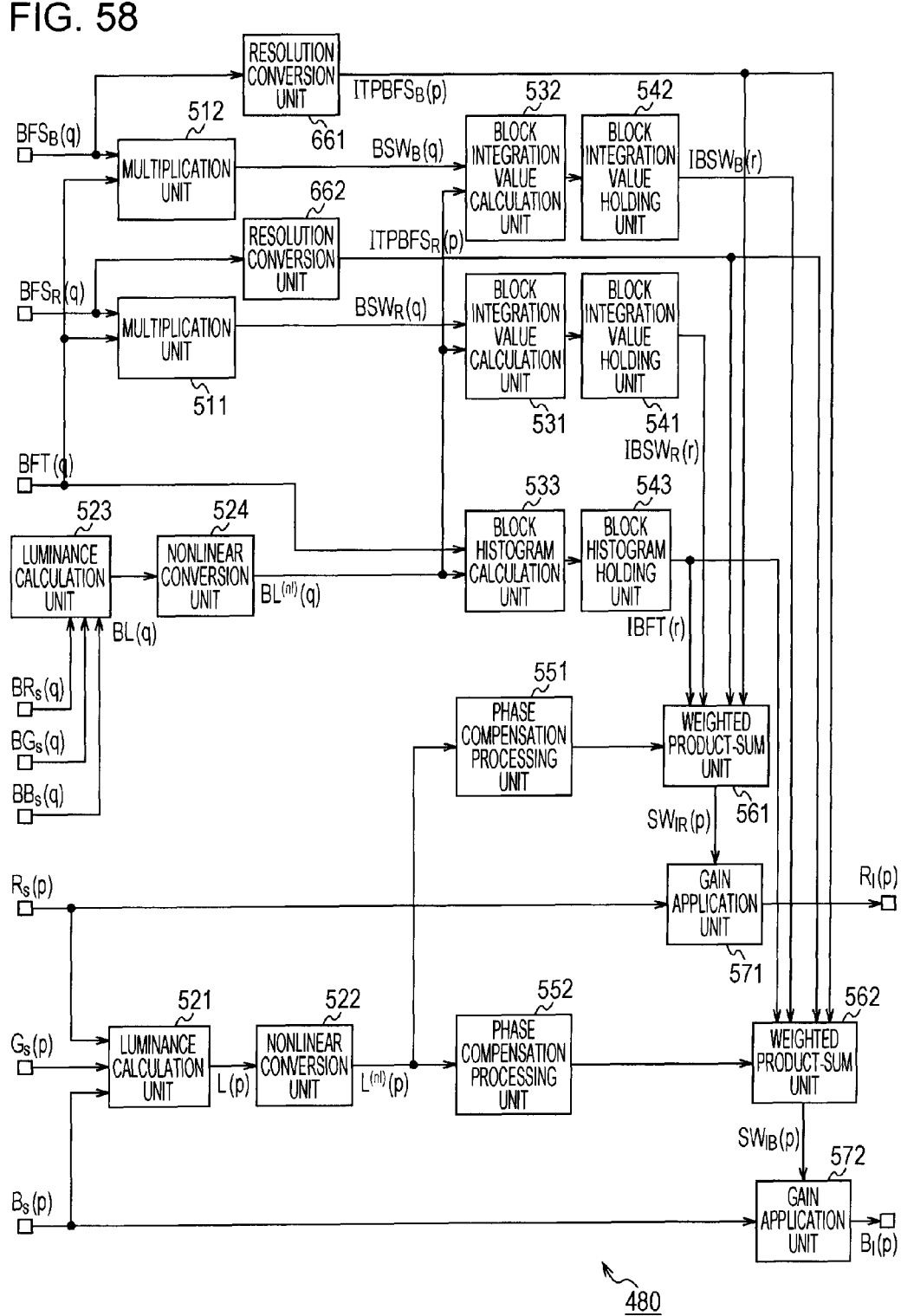
FIG. 58 illustrates another example of processing functions of the smoothing processing unit 480 in the tenth embodiment of the present invention.

FIG. 58 illustrates another example of processing functions of the smoothing processing unit 480 in the tenth embodiment of the present invention. The other example of the processing functions of the smoothing processing unit 480 further includes the resolution conversion units 661 and 662 in the fourth embodiment shown in FIG. 36. As described above, the fourth embodiment includes a process for performing resolution conversion on an input image and then making a comparison in the third embodiment, and also has the same relationship in the example of FIG. 55 and in the example of FIG. 58.

The resolution conversion unit 661 expands the resolution of the gain $BFS_B(q)$ of the reduced image so as to be converted into a gain $ITPBFS_B(p)$ of the same resolution as that of the processing target image. The resolution conversion unit 662 expands the resolution of the gain $BFS_R(q)$ of the reduced image so as to be converted into a gain $ITPBFS_R(p)$ of the same resolution as that of the processing target image. The resolution conversion in these can be realized by, for example, a simple linear interpolation. The accuracy of the gains $ITPBFS_R(p)$ and $ITPBFS_B(p)$ based on the reduced image becomes poor, but the gains are gains having high-frequency components when compared to the block integration value and the block histogram. The gains $ITPBFS_R(p)$ and $ITPBFS_B(p)$ based on the reduced image are supplied to the weighted product-sum units 561 and 562, respectively.

[Example of Configuration of Weighted Product-Sum Units 561 and 562]

Figure 59:
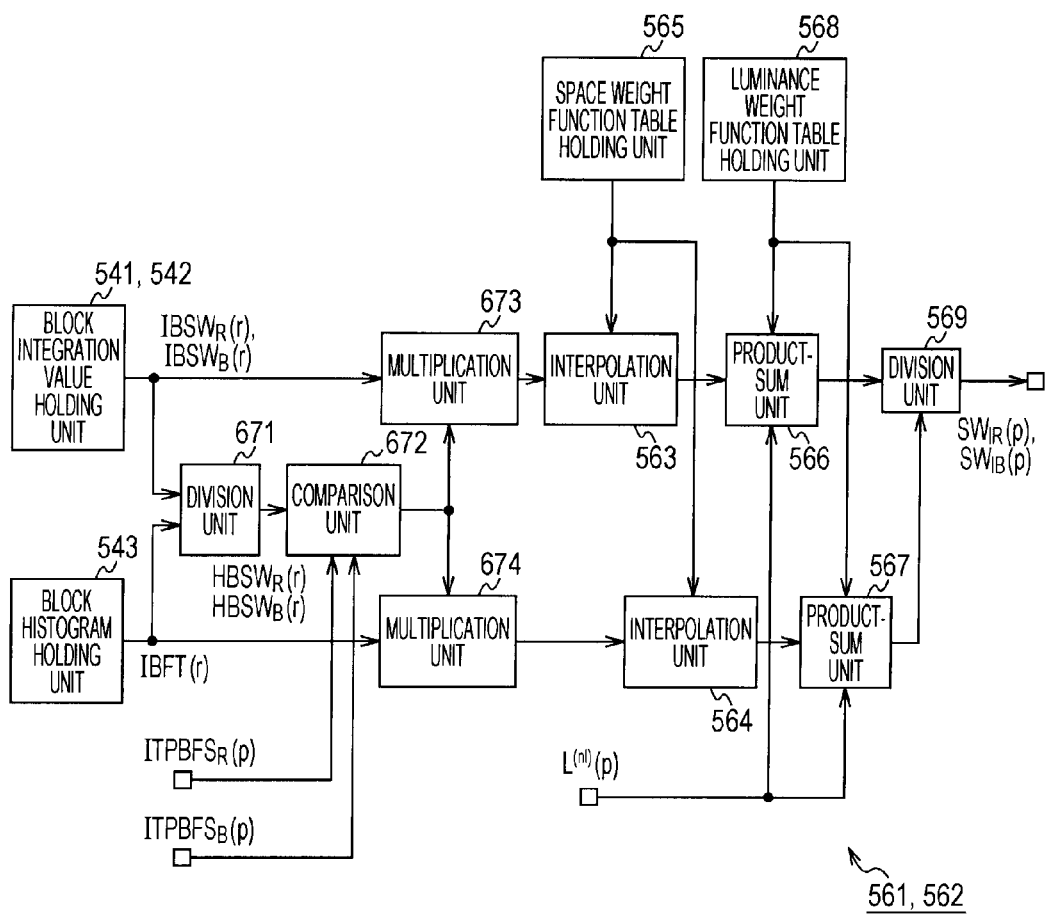
FIG. 59 illustrates an example of the configuration of weighted product-sum units 561 and 562 corresponding to the processing functions of FIG. 58 of the smoothing processing unit 480 in the tenth embodiment of the present invention.

FIG. 59 illustrates an example of the configuration of the weighted product-sum units 561 and 562 corresponding to the processing functions of FIG. 58 of the smoothing processing unit 480 in the tenth embodiment of the present invention. Similarly to FIG. 56, each of the weighted product-sum units 561 and 562 has a configuration including a division unit 671, a comparison unit 672, and multiplication units 673 and 674 at a stage preceding the interpolation units 563 and 564.

The example of the configuration of the smoothing processing unit 480 is basically the same as the configuration shown in FIG. 56. The difference is that, in place of the gains $FS_R(p)$ and $FS_B(p)$, which are input to the comparison unit 652 in FIG. 56, in this example, the gains $ITPBFS_R(p)$ and $ITPBFS_B(p)$ based on the reduced image are input to the comparison unit 672. The other points are the same as the example of FIG. 56 and thus, the description thereof is omitted herein.

[Example of Operation]

Figure 60:
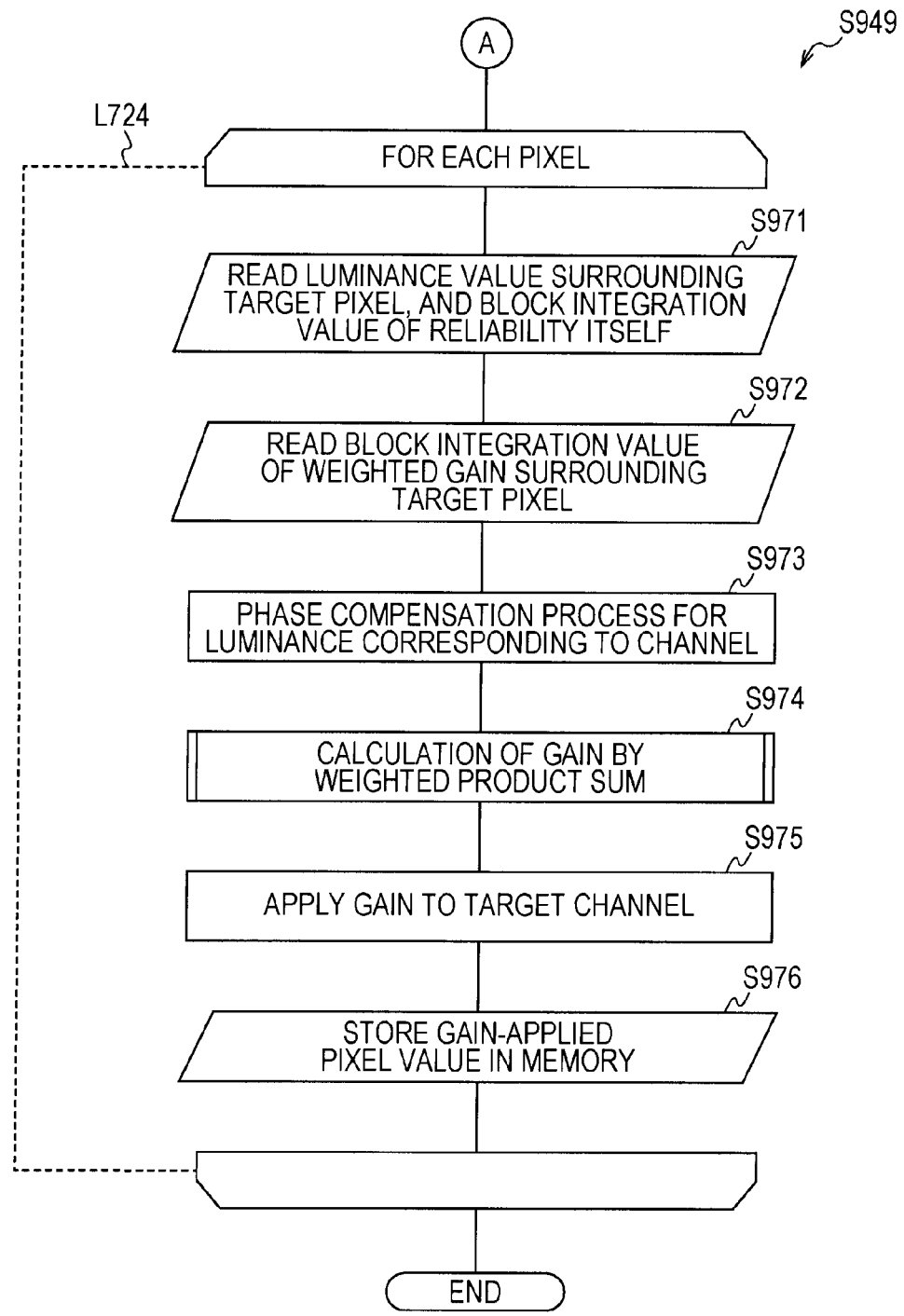
FIG. 60 illustrates an example of the operation corresponding to the example of the processing functions of FIG. 55 of the smoothing processing unit 480 in the tenth embodiment of the present invention.

FIG. 60 illustrates an example of the operation corresponding to the example of the processing functions of FIG. 55 of the smoothing processing unit 480 in the tenth embodiment of the present invention. Meanwhile, since the processing of the first half is the same as that in FIG. 30 in the third embodiment, it is omitted herein.

Here, following the processing of FIG. 30, the processing of steps S971 to S976 is repeated by using each pixel as a target (loop L724). The processing itself of steps S971 to S976 is the same as that described with reference to FIG. 31. The difference is that the repetition for each channel in FIG. 31 is omitted. The reason for this is that in the tenth embodiment, the values of the R channel and the B channel are simultaneously handled at the time of weight calculation. The other points are the same as those described with reference to FIG. 31 and thus, the description thereof herein is omitted.

Figure 61:
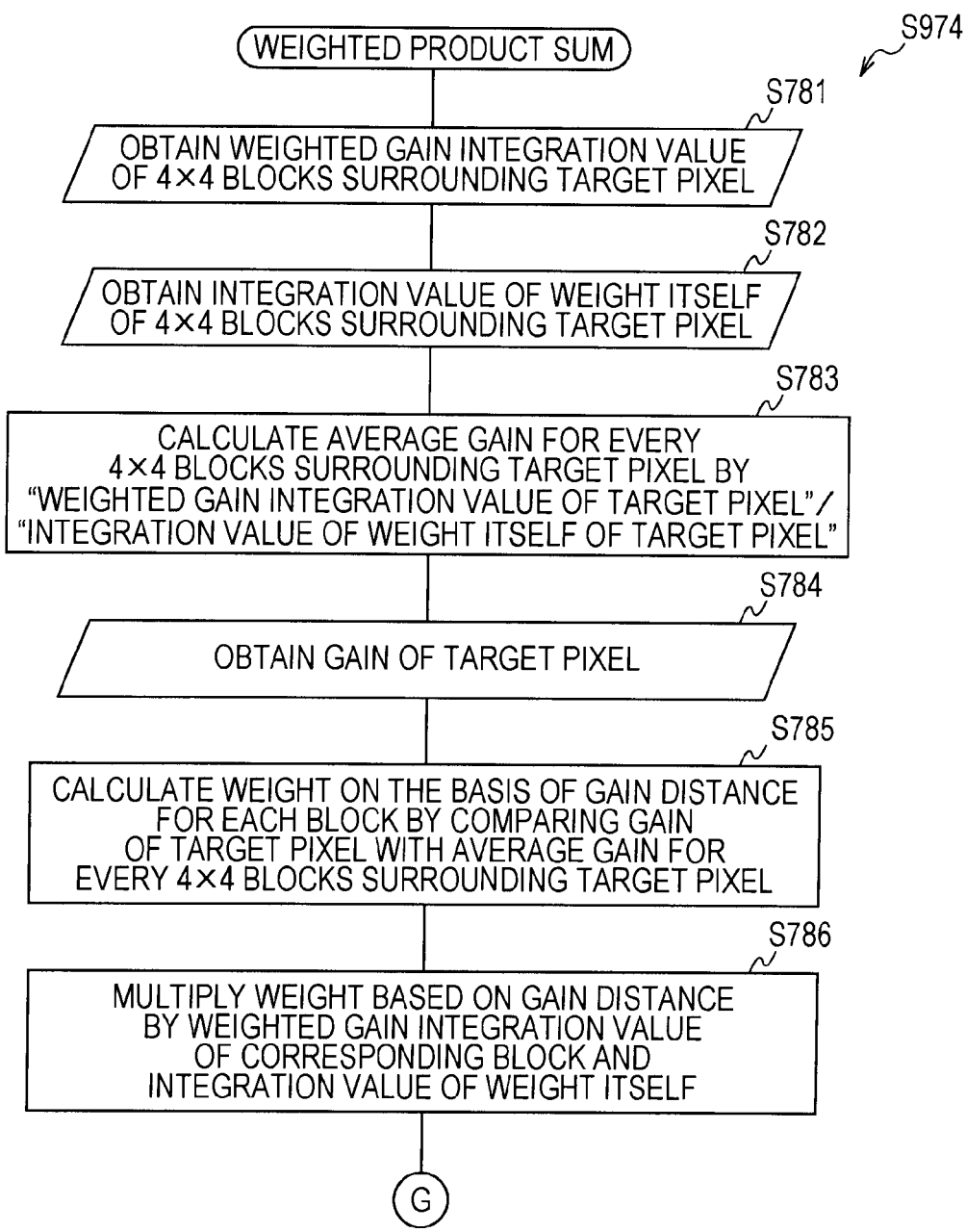
FIG. 61 illustrates a first half of an example of the operation of the weighted product-sum units 561 and 562 in the tenth embodiment of the present invention.
Figure 62:
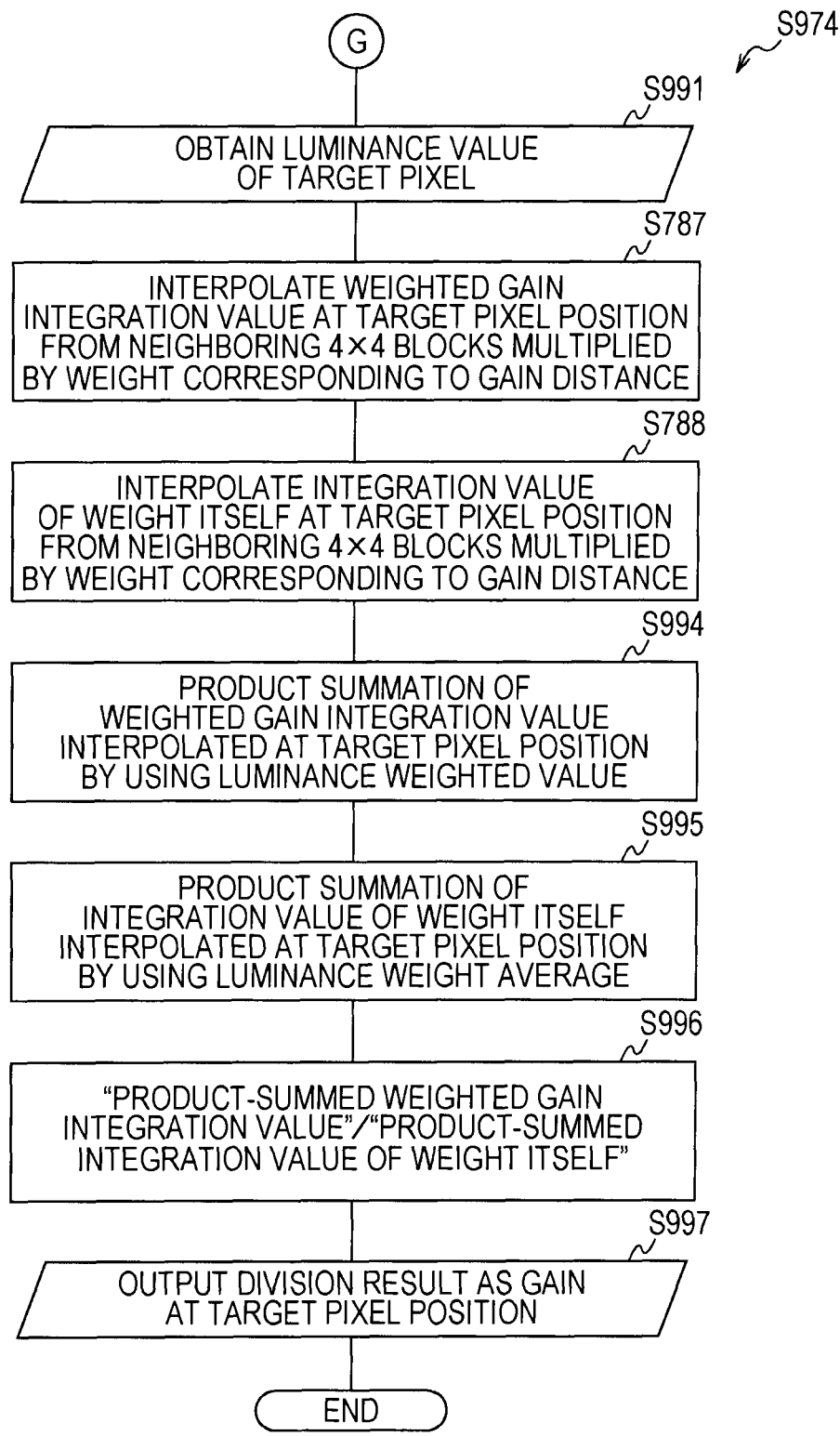
FIG. 62 illustrates a second half of the example of the operation of the weighted product-sum units 561 and 562 in the tenth embodiment of the present invention.

FIGS. 61 and 62 illustrates an example of the operation of the weighted product-sum units 561 and 562 in the tenth embodiment of the present invention. Meanwhile, here, the same processes as those in FIG. 33 are designated with the same reference numerals.

First, the weighted gain integration value of the neighboring 4×4 blocks of the target pixel are obtained from the block integration value holding units 541 and 542 (step S781). Furthermore, the integration value (block histogram) of the weight (reliability) itself of the neighboring 4×4 blocks of the target pixel are obtained from the block histogram holding unit 543 (step S782). Then, in the division unit 651, a process for dividing the weighted gain integration value by the integration value of the weight (reliability) itself is performed, and the average gain for each of the neighboring 4×4 blocks of the target pixel is calculated (step S783).

Next, the gains $FS_R(p)$ and $FS_B(p)$ of the target pixel are obtained (step S784). Then, in the comparison unit 652, the comparison of the gain of the target pixel with the average gain for each of neighboring 4×4 blocks of the target pixel is performed, and a weight based on the gain distance is calculated for each block (step S785). Furthermore, in the multiplication units 653 and 654, the weight based on the gain distance is multiplied by the weighted gain integration value of the corresponding block and the integration value of the weight (reliability) itself (step S786).

Then, the luminance value of the target pixel is obtained (step S991), and the interpolation of the neighboring 4×4 blocks in which the weighted gain integration value at the target pixel position is multiplied by the weight corresponding to the gain distance is performed in the interpolation unit 563 (step S787). Furthermore, an interpolation of neighboring 4×4 blocks in which the integration value of the weight (reliability) itself at the target pixel position is multiplied by the weight corresponding to the gain distance is performed in the interpolation unit 564 (step S788). The processes at and subsequent to step S994 are the same as those of FIG. 33 and thus, the description thereof herein is omitted.

Meanwhile, in FIGS. 61 and 62, a description is given by assuming the configuration of FIG. 56. In the configuration of FIG. 59, also, as the weighted product-sum process. The same processes are performed. Thus, the description thereof herein is omitted. However, in step S784, in place of the gains $FS_R(p)$ and $FS_B(p)$ of the target pixel, gains $ITPBFS_R(p)$ and $ITPBFS_B(p)$ based on the reduced image are obtained and used for a comparison.

Figure 63:
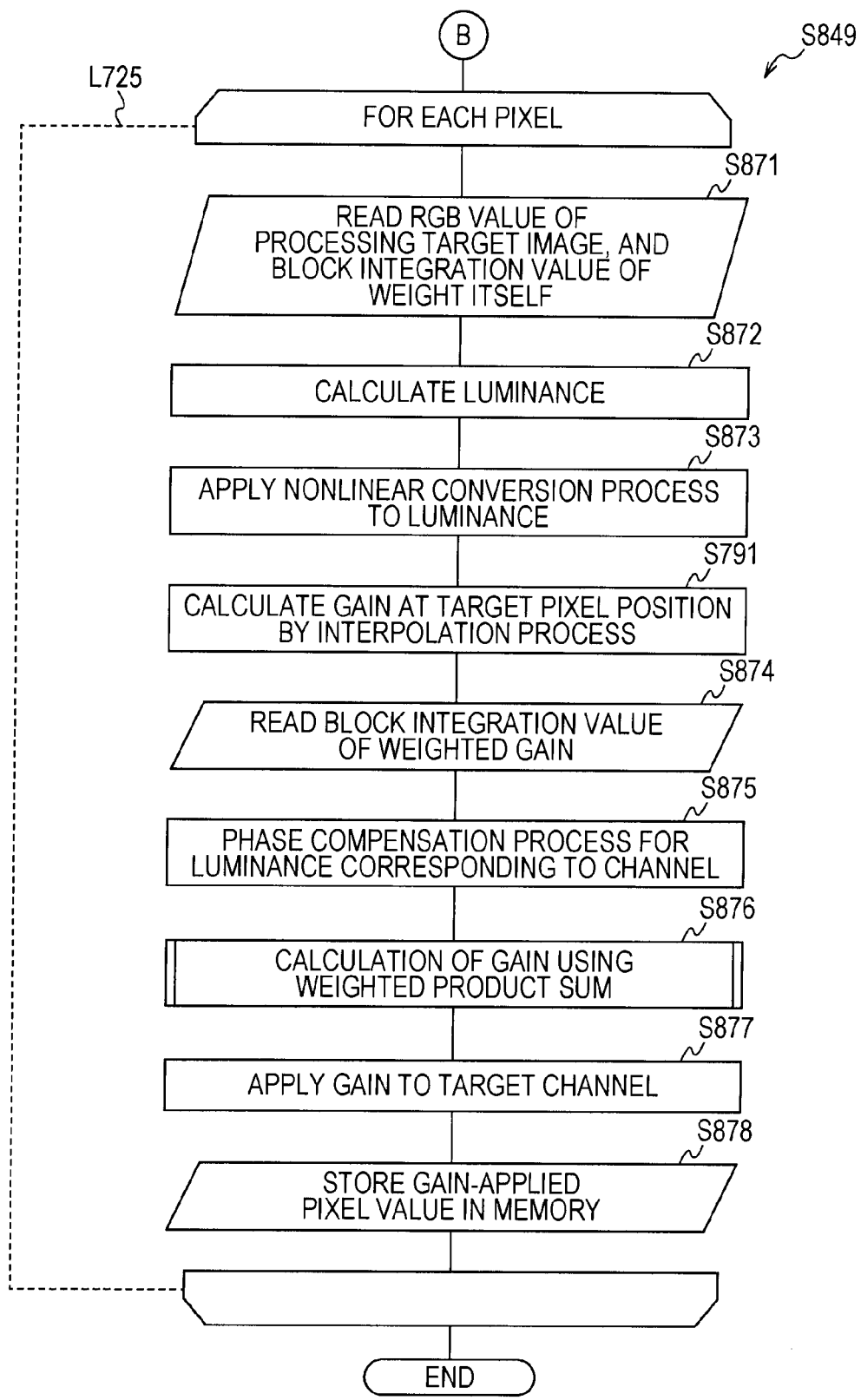
FIG. 63 illustrates an example of the operation of the smoothing processing unit 480 in the tenth embodiment of the present invention.

FIG. 63 illustrates an example of the operation of the smoothing processing unit 480 in the tenth embodiment of the present invention. Meanwhile, the processes of the first half are the same as those of FIG. 39 in the fourth embodiment and thus, the description thereof is omitted herein. Furthermore, here, the same processes as those of FIG. 40 are designated with the same reference numerals.

After the block integration value and the block histogram are updated, in the loop L725, the processes of steps S871 to S878 are repeated. Although the content of each process is the same as that of FIG. 40, the difference is that the process of step S791 is inserted between steps S873 and S874. In step S791, the gain at the target pixel position is calculated by the interpolation process of the interpolation units 563 and 564. Furthermore, another difference is that the repetition for each channel in FIG. 40 is omitted. The reason for this is that in the tenth embodiment, the values of the R channel and the B channel are simultaneously handled at the time of weight calculation. The other points are the same as those described with reference to FIG. 40 and thus, the description thereof herein is omitted.

As described above, according to the tenth embodiment of the present invention, at the time of weighted product summation for smoothing, by using not only histograms in the surroundings of a position and a luminance, but also a rough gain itself, it is possible to generate an image having high color reproducibility.

Meanwhile, the embodiments of the present invention show examples for embodying the present invention. As specified in the embodiments of the present invention, the items in the embodiments of the present invention and the invention specific items in the Claims have corresponding relationships. In a similar manner, the invention specific items in the Claims and the items designated with the same names as those in the embodiments of the present invention have corresponding relationships. However, the present invention is not limited to the embodiments, and various modifications can be made in a range not deviating from the spirit and scope of the present invention.

Furthermore, the processing procedures described in the embodiments of the present invention may be understood as a method having the series of procedures, and furthermore, may be understood as a program for causing a computer to perform the series of procedures and a recording medium for storing the program. As the recording medium, for example, a CD (Compact Disc), an MD (MiniDisc), a DVD (Digital Versatile Disk), a memory card, a Blue-ray disc (Blu-ray Disc (registered trademark)), and the like can be used.

REFERENCE SIGNS LIST 11 lens
12 aperture
13 image-capturing element
21 sampling circuit
22 A/D conversion circuit
23 image processing circuit
31 coder/decoder
32 memory
41 display driver
42 display unit
51 timing generator
52 operation input acceptance unit
53 driver
54 control unit
59 bus
61 flash emitting unit
62 flash control unit
111 reference mosaic image holding unit
112 processing target mosaic image holding unit
120 illumination component conversion processing unit
130, 131 white balance processing unit
133 inverse gamma correction processing unit
140 demosaic processing unit
150 gradation correction processing unit
160 gamma correction processing unit
170 YC conversion processing unit
181, 183 reference image white balance holding unit
182, 184 processing target image white balance holding unit
191 Y image holding unit
192 C image holding unit
213 new reference mosaic image holding unit
214 new processing target mosaic image holding unit
221, 222 demosaic processing unit
230 white balance calculation unit
240 reference image white balance holding unit
250 channel gain calculation unit
260 channel gain application unit
261, 262 multiplication unit
271 resolution conversion unit
280 frame addition unit
281, 282 addition unit
283 reference mosaic image holding unit
284 processing target mosaic image holding unit
285 control parameter determination unit
290 illumination component converted mosaic image holding unit
311, 312 color conversion gain calculation unit
321, 322 upper limit value clipping unit
323 gain upper limit value R holding unit
324 gain upper limit value B holding unit 331, 332 lower limit value clipping unit
333 gain lower limit value R holding unit
334 gain lower limit value B holding unit
341, 342 blackout condition compensation unit
343 blackout condition compensation value R holding unit
344 blackout condition compensation value B holding unit
345 blackout condition degree calculation unit
351, 352 saturation compensation unit
353 saturation compensation value R holding unit
354 saturation compensation value B holding unit
355 saturation degree calculation unit
421 to 423 division unit
431 to 433 exposure compensation unit
440 saturation reliability calculation unit
450 blackout condition reliability calculation unit
460 moving subject reliability calculation unit
461 ratio reverse degree calculation unit
462 ratio prediction unit
463 spectral reflectance change amount prediction unit
464 ambient light spectral color-balance value holding unit
465 flash light spectral color-balance value holding unit
466 minimum value selection unit
470 reliability selection unit
480 smoothing processing unit
511 multiplication unit
521, 523, 630 luminance calculation unit
522, 611, 612, 621 to 623, 641 to 643 nonlinear conversion unit
531 block integration value calculation unit
533 block histogram calculation unit
534 block selection unit
535 integrator
536 addition unit
537 register
538 block integration value holding unit
541, 542 block integration value holding unit
543 block histogram holding unit
551 phase compensation processing unit
561, 562 weighted product-sum unit
563, 564 interpolation unit
565 space weight function table holding unit
566, 567 product-sum unit
568 luminance weight function table holding unit
569 division unit
571, 572 gain application unit
631, 634 multiple regression analysis unit
632, 635 multiple regression analysis parameter holding unit
633, 636 multiple regression prediction value calculation unit
651, 671 division unit
652, 672 comparison unit
653, 654, 673, 674 multiplication unit
661, 662 resolution conversion unit

The invention claimed is:

1. An image processing apparatus comprising:
a channel gain calculation unit that calculates a gain for converting illumination components for each channel at each pixel position on the basis of a reference image and a processing target image that are captured under different illumination environments; and
a channel gain application unit that applies the gain to the processing target image,
wherein the channel gain calculation unit includes:
a saturation degree calculation unit that calculates a saturation degree of pixels on the basis of pixel values of the reference image, and
a saturation compensation unit that performs a process for compensating for the gain in accordance with the saturation degree.

2. An image processing apparatus comprising:
a channel gain calculation unit that calculates a gain for converting illumination components for each channel at each pixel position on the basis of a reference image and a processing target image that are captured under different illumination environments; and
a channel gain application unit that applies the gain to the processing target image,
wherein the channel gain calculation unit includes
a blackout condition degree calculation unit that calculates a blackout condition degree of pixels on the basis of pixel values of the reference image; and
a blackout condition compensation unit that performs the process for compensating for the gain in accordance with the blackout condition degree.

3. The image processing apparatus according to claim 2, wherein
the blackout condition degree calculation unit calculates the blackout condition degree of pixels on the basis of the pixel values of the reference image and an inter-channel ratio of the reference image to the processing target image.

4. An image processing method comprising:
calculating a gain for converting illumination components for each channel at each pixel position on the basis of a reference image and a processing target image that are captured under different illumination environments;
calculating a saturation degree of pixels on the basis of pixel values of the reference image;
performing a process for compensating for the gain in accordance with the saturation degree; and
applying the gain to the processing target image.

5. A non-transitory computer-readable storage medium storing a program for causing a computer to perform:
calculating a gain for converting illumination components for each channel at each pixel position on the basis of a reference image and a processing target image that are captured under different illumination environments;
calculating a saturation degree of pixels on the basis of pixel values of the reference image;
performing a process for compensating for the gain in accordance with the saturation degree; and
applying the gain to the processing target image.

6. An image processing method comprising:
calculating a gain for converting illumination components for each channel at each pixel position on the basis of a reference image and a processing target image that are captured under different illumination environments;
calculating a blackout condition degree of pixels on the basis of pixel values of the reference image; and
performing the process for compensating for the gain in accordance with the blackout condition degree; and
applying the gain to the processing target image.

7. A non-transitory computer-readable storage medium storing a program for causing a computer to perform:
calculating a gain for converting illumination components for each channel at each pixel position on the basis of a reference image and a processing target image that are captured under different illumination environments;
calculating a blackout condition degree of pixels on the basis of pixel values of the reference image; and
performing the process for compensating for the gain in accordance with the blackout condition degree; and
applying the gain to the processing target image.

* * * * *